United States Patent [19]

Mager et al.

[11] 4,137,565
[45] Jan. 30, 1979

[54] DIRECT MEMORY ACCESS MODULE FOR A CONTROLLER

[75] Inventors: George E. Mager, Manhattan Beach; Frank M. Nelson, Sherman Oaks; Kenneth Gillett, Redondo Beach; Charles P. Holt, Palos Verdes, all of Calif.; Edward L. Steiner, Macedon; John W. Daughton, Fairport, both of N.Y.; Kenton W. Fiske, Palos Verdes; Thomas Criswell, Venice, both of Calif.; Warren L. Hall, Fairport, N.Y.

[73] Assignee: Xerox Corporation, Stamford, Conn.

[21] Appl. No.: 758,117

[22] Filed: Jan. 10, 1977

[51] Int. Cl.² .............................................. C06F 13/00
[52] U.S. Cl. ............................................................ 364/200
[58] Field of Search ... 364/200 MS File, 900 MS File; 355/14

[56] References Cited

U.S. PATENT DOCUMENTS

| | | | |
|---|---|---|---|
| 3,445,822 | 5/1969 | Driscoll | 364/200 |
| 3,732,546 | 5/1973 | Ronkin et al. | 364/200 |
| 3,793,631 | 2/1974 | Silverstein et al. | 364/200 |
| 3,949,375 | 4/1976 | Ciarlo | 364/200 |
| 3,976,979 | 8/1976 | Parkinson et al. | 364/200 |
| 4,000,487 | 12/1976 | Patterson et al. | 364/200 |
| 4,016,541 | 4/1977 | Delagi et al. | 364/200 |
| 4,055,851 | 10/1977 | Jenkins et al. | 364/200 |
| 4,067,059 | 1/1978 | Derchak | 364/200 |
| 4,075,691 | 2/1978 | Davis et al. | 364/200 |

Primary Examiner—Melvin B. Chapnick
Attorney, Agent, or Firm—Ronald L. Taylor

[57] ABSTRACT

In a controller for a host machine such as an electrostatographic copier having a central processing unit module connected via a system bus to an input-output processing unit module, a direct memory access system functioning as part of the input-output processing unit module and operative to provide a high-speed means of refreshing and updating control registers in the host machine by direct accessing of memory in the central processing unit module. The direct memory access system may be programmed to synchronously refresh-update the host machine's control registers as in its normal mode and also asynchronously refresh-update the control registers as in the abnormal mode of a detected electrical disturbance in the electro-sensitive periphery surrounding the control registers, thus requiring restoring thereof. High-speed movement of data by the direct memory access system is achieved through dedicating a portion of random access memory in the central processing unit module for such accessing, and transferring control of the system bus from the central processing unit module to the direct memory access system. This enables data accessed through a fixed sequence of addresses from dedicated memory to be transferred directly to the host machine's control registers without incurring time constants that would otherwise be had if the data were to be manipulated by a central processor in the central processing unit module.

29 Claims, 35 Drawing Figures

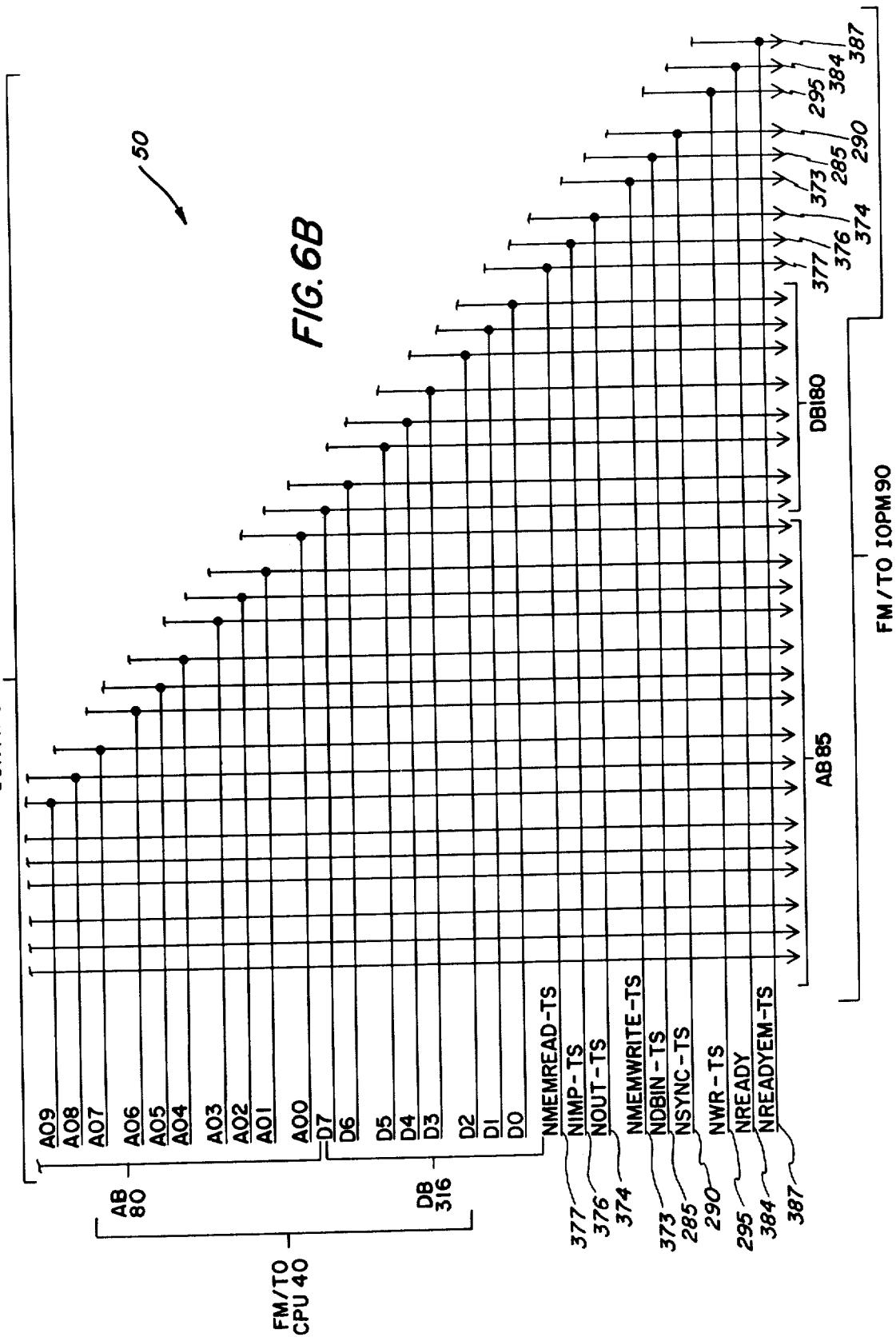

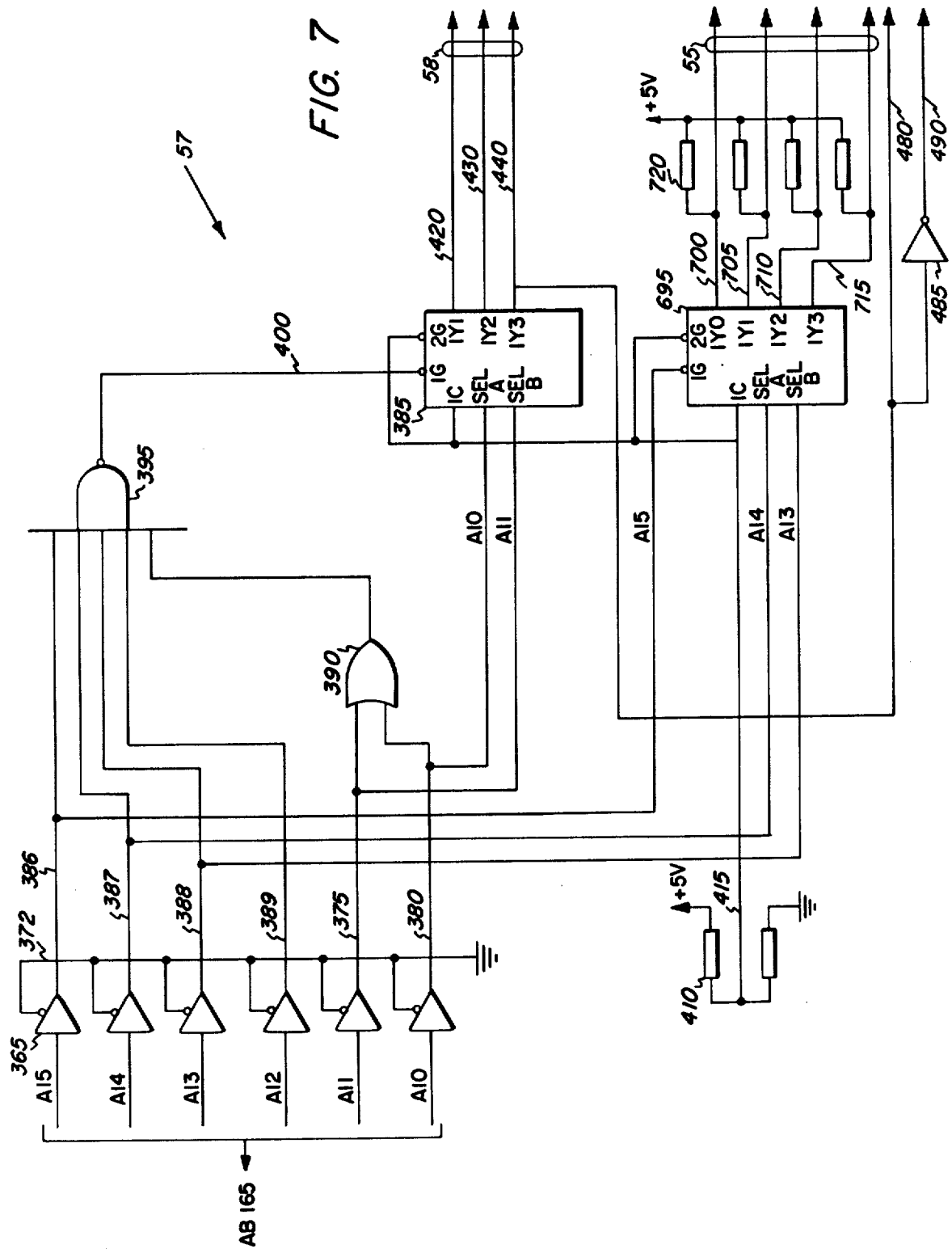

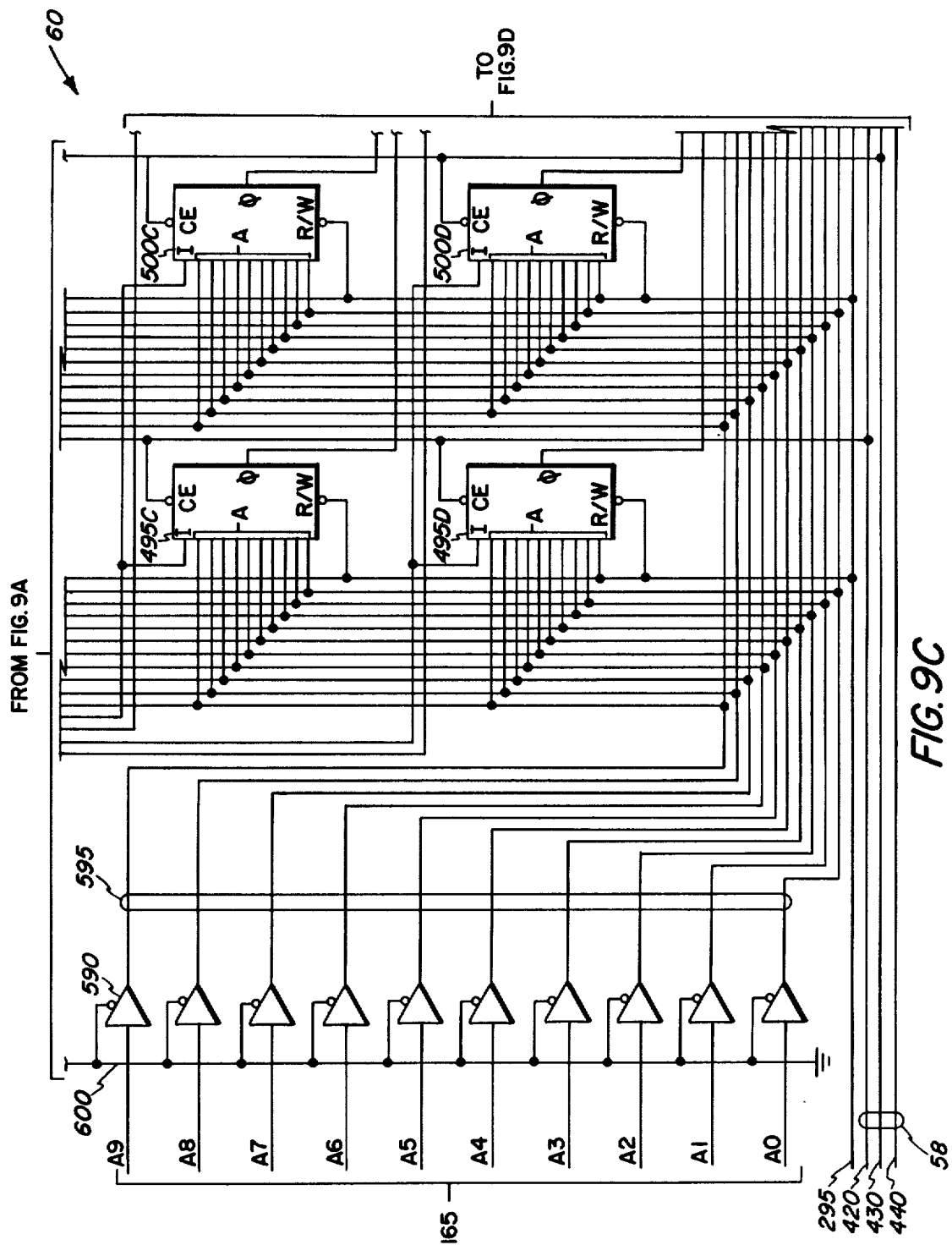

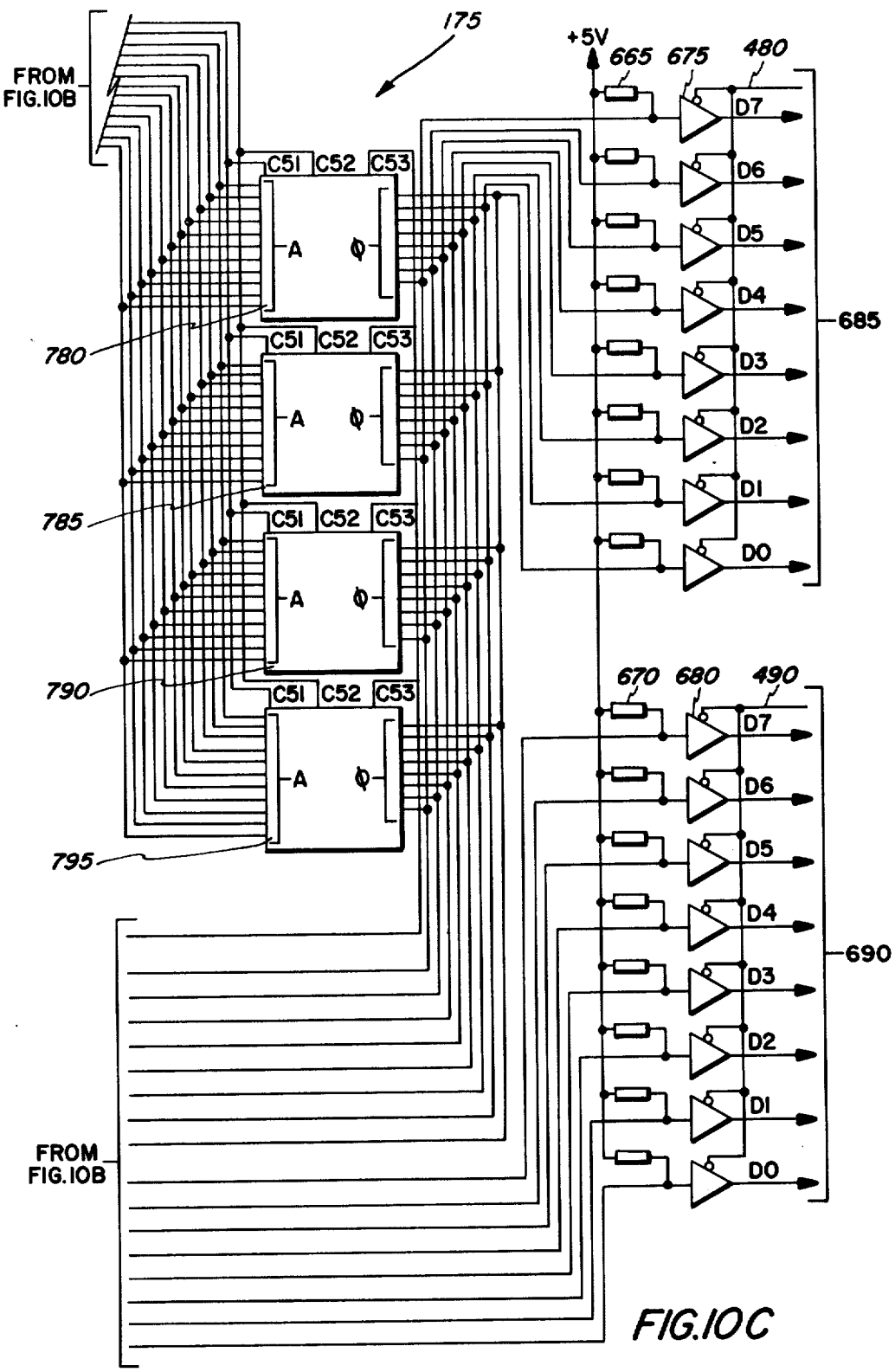

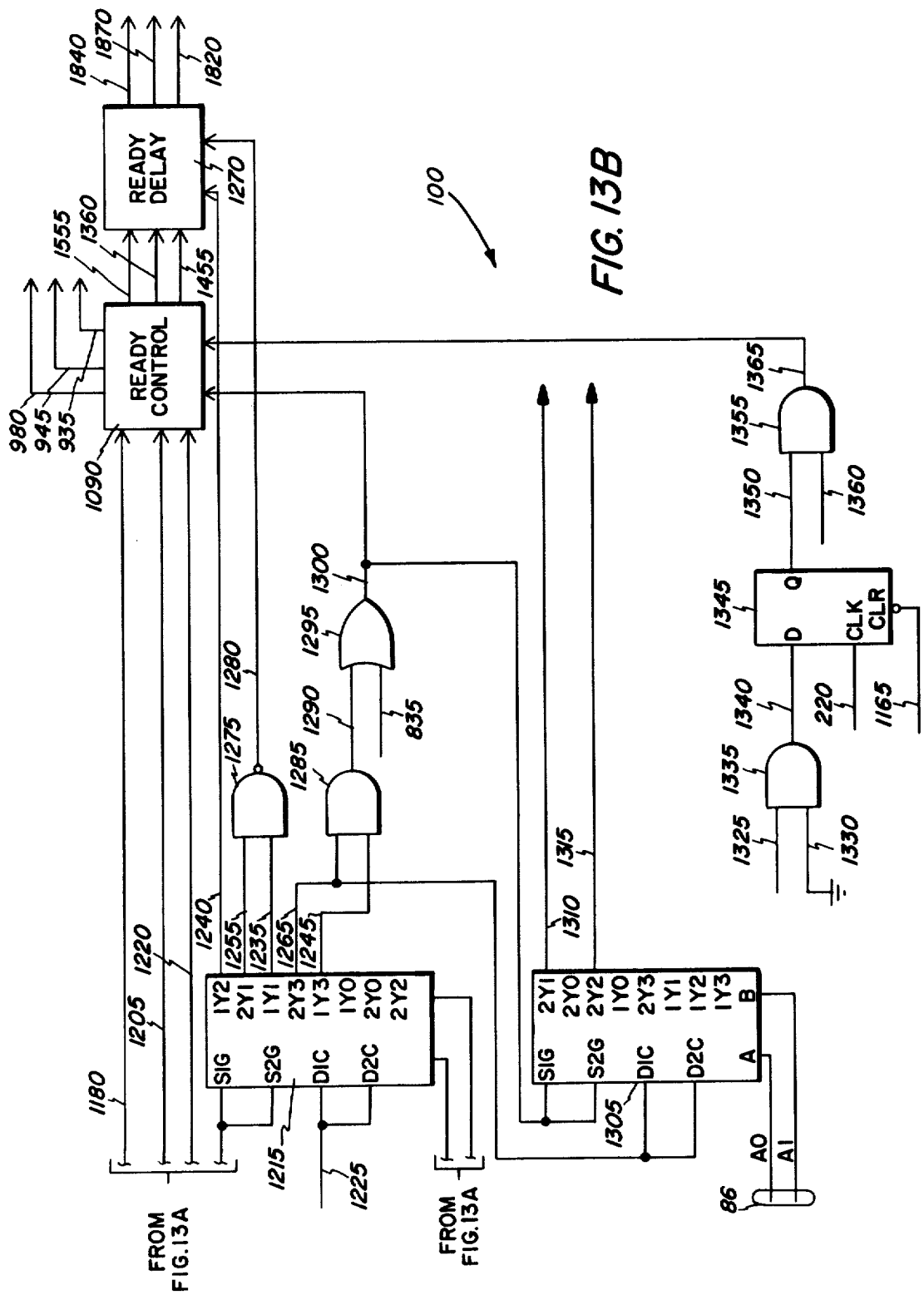

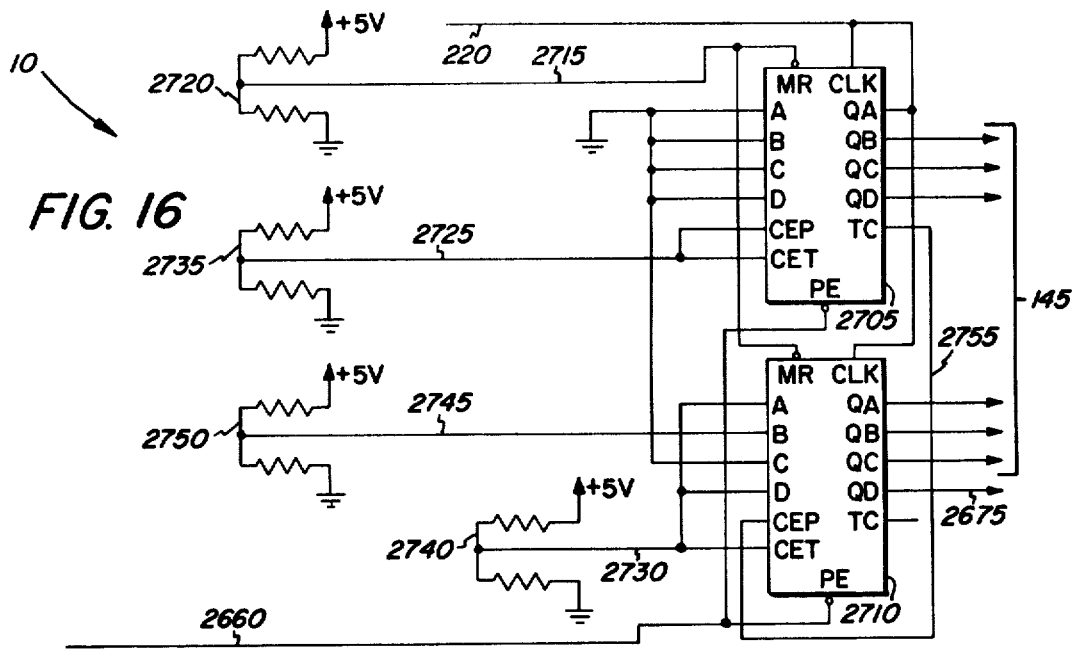
FIG. 16
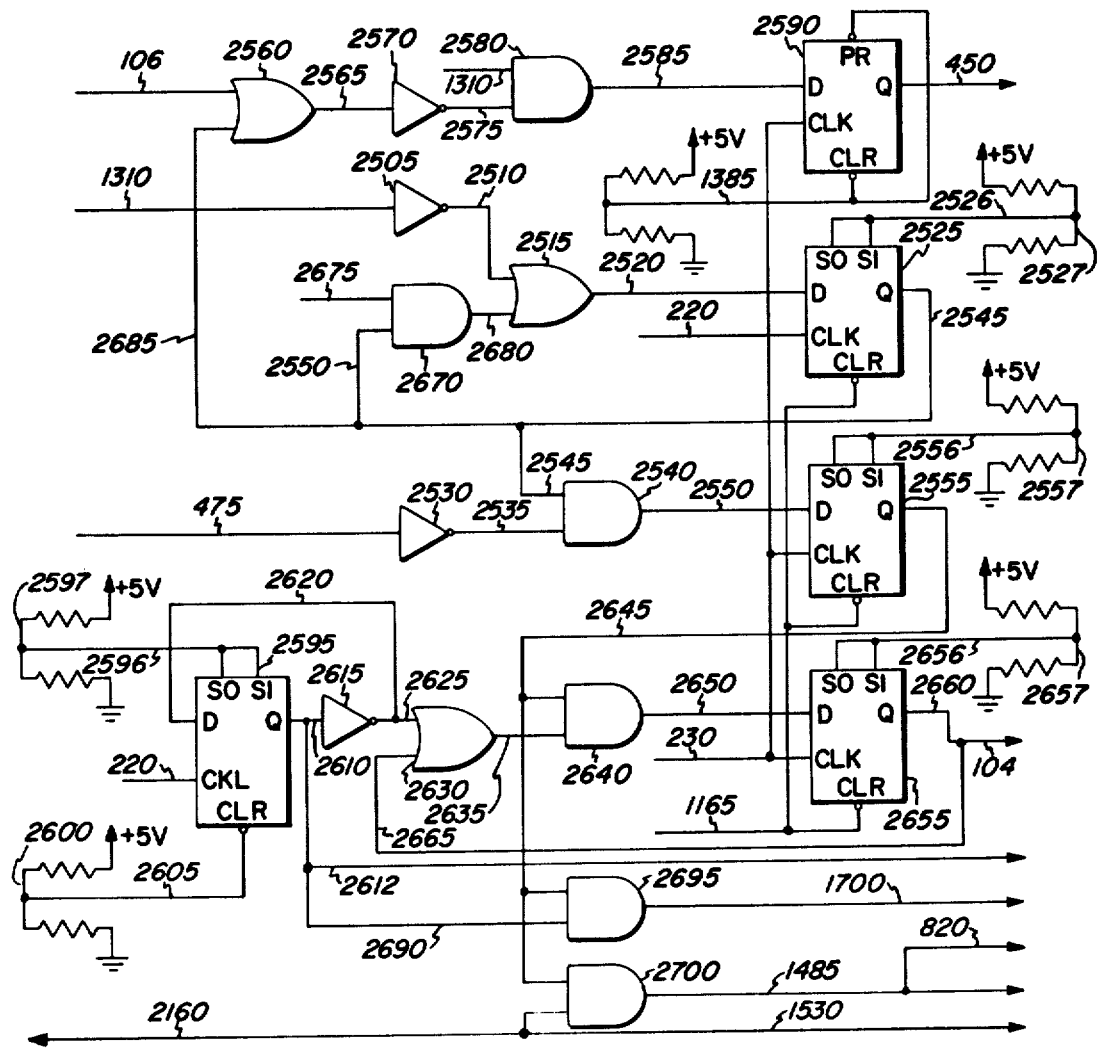

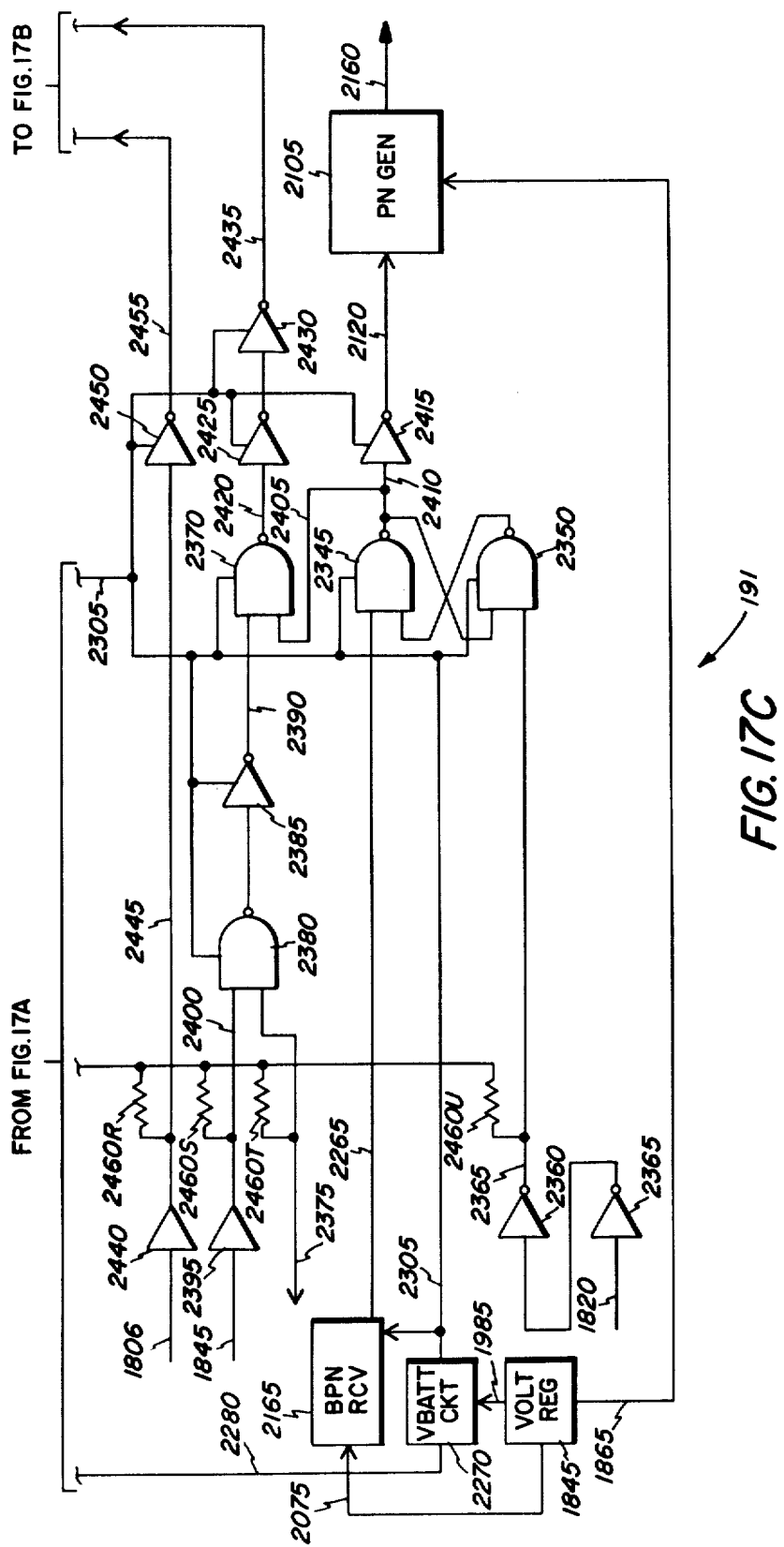

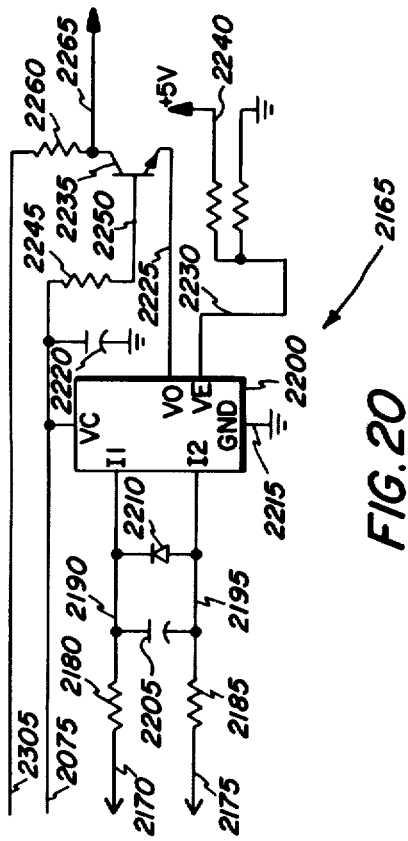
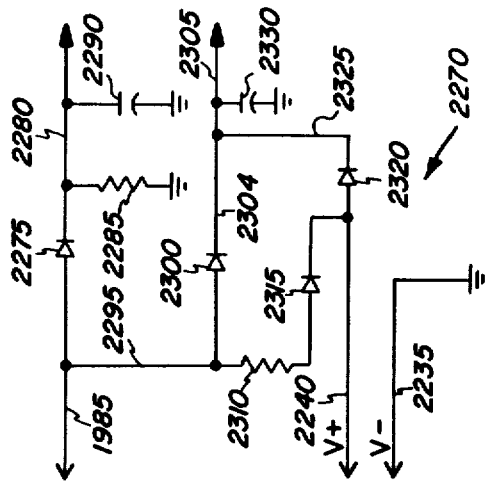
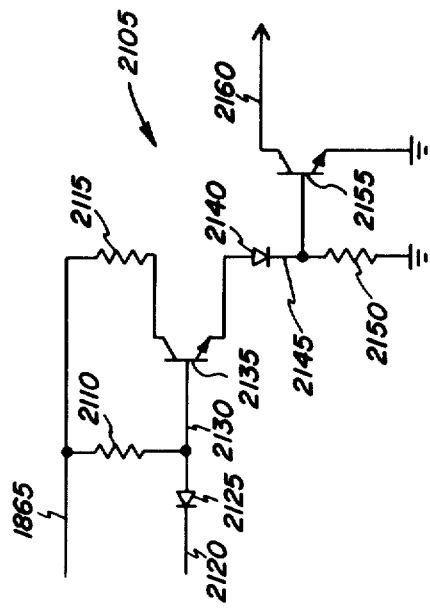
FIG.20
FIG.21
FIG.19

DIRECT MEMORY ACCESS MODULE FOR A CONTROLLER

CROSS-REFERENCE TO RELATED APPLICATIONS

A patent application entitled "Control System for Electrostatographic Machines" bearing Ser. No. 677,473 and filed on Apr. 15, 1976 by John W. Daughton et al and assigned to Xerox Corporation describes and claims a programmably controlled electrostatographic copier where such a copier may be the host machine in the preferred embodiment of the present case. The present invention also relates to an invention disclosed in copending application U.S. Ser. No. 758,111 to the inventors Kenneth Gillet et al entitled "Non-Volatile Storage Module For A Controller" which is assigned to the assignee of the present invention. The present invention also relates to inventions disclosed in copending application, U.S. Ser. No. 758,120, to the inventors Philip Richardson et al, entitled "Controller Watch Dog Timer" which is assigned to the assignee of the present invention disclosed in copending application, U.S. Ser. No. 758,892, to the inventors George Mager et al entitled "System Data Bus", which is assigned to the assignee of the present invention. The present invention also relates to an invention disclosed in copending application, U.S. Ser. No. 758,891, to the inventor Edward L. Steiner et al entitled "Controller Optical Coupler" which is assigned to the assignee of the present invention.

BACKGROUND OF THE INVENTION

A. Field of the Invention

This invention relates generally to computerized controllers of machine processes in a host machine such as an electrostatographic copies and particularly to controllers having capabilities for direct memory access of computer memory by the I/O device in the computer for output refresh and update of the host machine's control registers.

B. Prior Art

In the past, controllers having a computer would be able to access data in the computer memory only indirectly through the central processor which was relatively slow. The reason being that, the central processor would have control of the system bus thereby requiring the central processor to execute a program instruction for each access of data from computer memory thereby resulting in a relatively slow access rate of data from the computer memory to the control registers in the host machine. As the data being accessed from the computer memory used for refresh-update of the control registers is constantly being updated by the central processor to reflect the changing state of the ongoing machine processes, it is urgent that the updated control data be sent to the registers as soon as possible to reflect the current control state required of the machine process as perceived by the central processor and as recorded by the computer memory. Where the process to be controlled such as a machine process has many interrelated machine processes happening at a relatively high clock rate, then the problem of how to refresh and update the control registers in the host machine to reflect the state of the updated computer memory as quickly as possible to thereby guarantee accurate control of the ongoing process in the host machine becomes accordingly more acute. The particular embodiment described infra, a high-speed copying machine with critical parameters as the controlled process, is such an interrelated machine process having a need for accurate high-speed updating of its host machine's control registers.

SUMMARY OF THE INVENTION

It is an important object of the invention to provide a means for high-speed access of data from a controller to a host machine for control of the processes thereof.

It is a further object of the invention to provide a means for directly accessing the memory in a computerized controller for a host machine in order to insure a high-speed refresh-update of control modules in the host machine thereby allowing precise control of the ongoing processes in said host machine.

It is another object of the invention to provide a means for directly accessing memory in a controller having a microprocessor computer in order to insure high-speed refresh-update of control registers in an electrostatographic copier having interrelated machine processes.

It is yet another object of the invention to be able to dedicate a fixed portion of memory in the controller operative to be sequentially addressed during a direct memory access operation.

It is another further object of the invention to be able to provide direct memory access programatically either in a synchronous manner for normal mode updating or asynchronously for abnormal mode electrical distrubances.

It is yet another further object of the invention to be able to transfer control of the system bus from the central processing unit module to the input/output processing module during the direct memory access operation for high speed direct control thereof.

In carrying out the objects of the invention, a direct memory access system is utilized in a computerized controller for a host machine whereby a central processor in the central processing unit module will be operable to programmatically synchronously or asynchronously output a refresh-update initiation signal to a direct memory access system in the input-output processing module. Said initiation signal is generated whenever either the output of a master clock or a predeterminably significant electrical distrubance in the host machine is detected. The initiation signal, when received by the direct memory access system, is operative to activate the system to put the central processor in an indefinite hold state precedent to and concurrent with the direct memory access operation.

The direct memory access system, receiving an acknowledge signal from the central processor will then assume control of the system bus and sequentailly proceed through its operation. The system bus will then continue to function under the control of the direct memory access system for the duration of the direct memory access and only thereafter will control of the system bus return to the central processor. With the system bus under the control of the direct memory access system, a predetermined fixed sequence of addresses will be outputed by the system to edicated memory in the central processing unit module. The dedicated memory is a random access memory which is periodically updated by the central processor to reflect the current required control state for the host machine. As such, units of data from the dedicated random access memory are sequentially addressed by the direct memory access system through the system bus directly and necessarily at a high speed to control registers in the host machine. The control registers are operative to affect the machine processes of the host machine in such a manner as to reflect the current executed program step and also to ring the processes into line with predetermined parameters stored in the program used by the central processor whenever sensed feedback data from the host machine indicates a variance therewith. Upon execution of the final sequenced address by the direct memory access and output of respective data from dedicated memory to the host machine's control registers, system bus control will be returned to the central process thereby re-enabling normal update of the dedicated memory by the central processor until the next direct memory access is initiated.

BRIEF DESCRIPTION OF THE DRAWINGS

Various other objects, advantages and meritorious features of the invention will become more fully apparent from the following specification, appended claims and accompanying drawing sheets.

The features of a specific embodiment of the invention are illustrated in the drawings, in which:

FIGS. 6A-B is a logical diagram of the system bus terminus of FIG. 2;

FIG. 7 is a logical diagram of the memory address decoder of FIG. 2;

FIGS. 9A-D is a logical diagram of the Data Memory of FIG. 2;

FIGS. 10A-C is a logical diagram of the Program Memory of FIG. 2;

FIGS. 13A-B is a logical diagram of the Function Decoder of FIG. 3;

FIG. 16 is a logical diagram of the Direct Memory Access Apparatus of FIG. 3;

FIGS. 17A-C is a logical diagram of the Non-Volatile Memory of FIG. 3;

FIG. 19 is a schematic diagram of the PN Generator of FIG. 17;

FIG. 20 is a schematic diagram of the BPN Generator of FIG. 17;

FIG. 21 is a schematic diagram of the VBATT circuit of FIG. 17;

DETAILED DESCRIPTION OF THE PREFERRED EMBODIMENT

Figure 1:
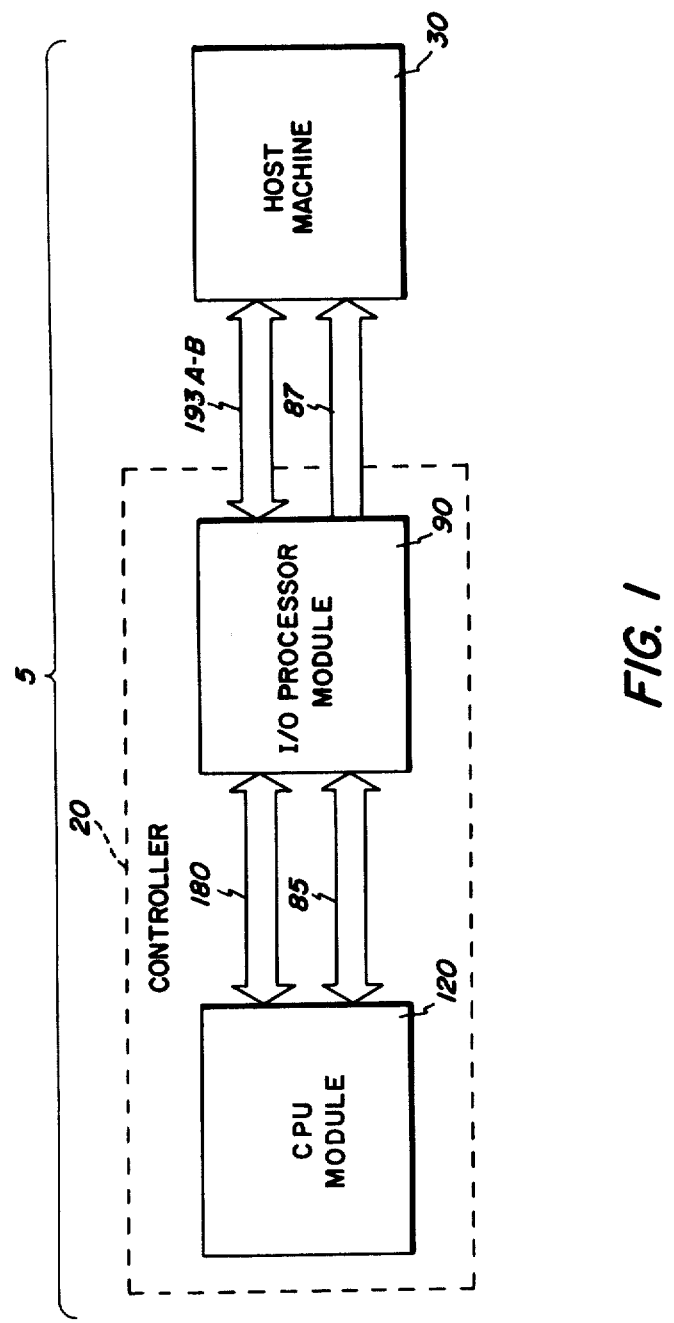
FIG. 1 is a block diagram of the programmably controlled system for directing a host machine.
Figure 2:
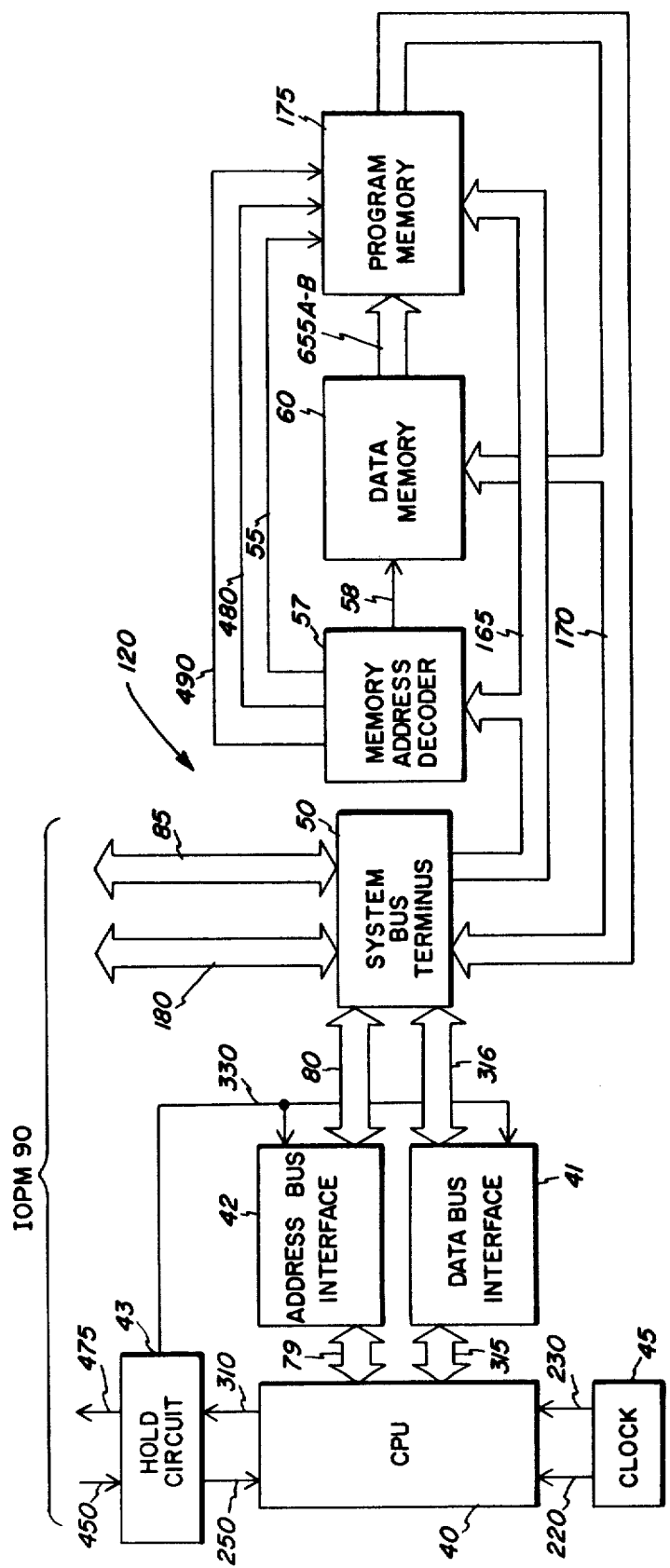
FIG. 2 is a block diagram of the central processor unit module of FIG. 1.
Figure 3:
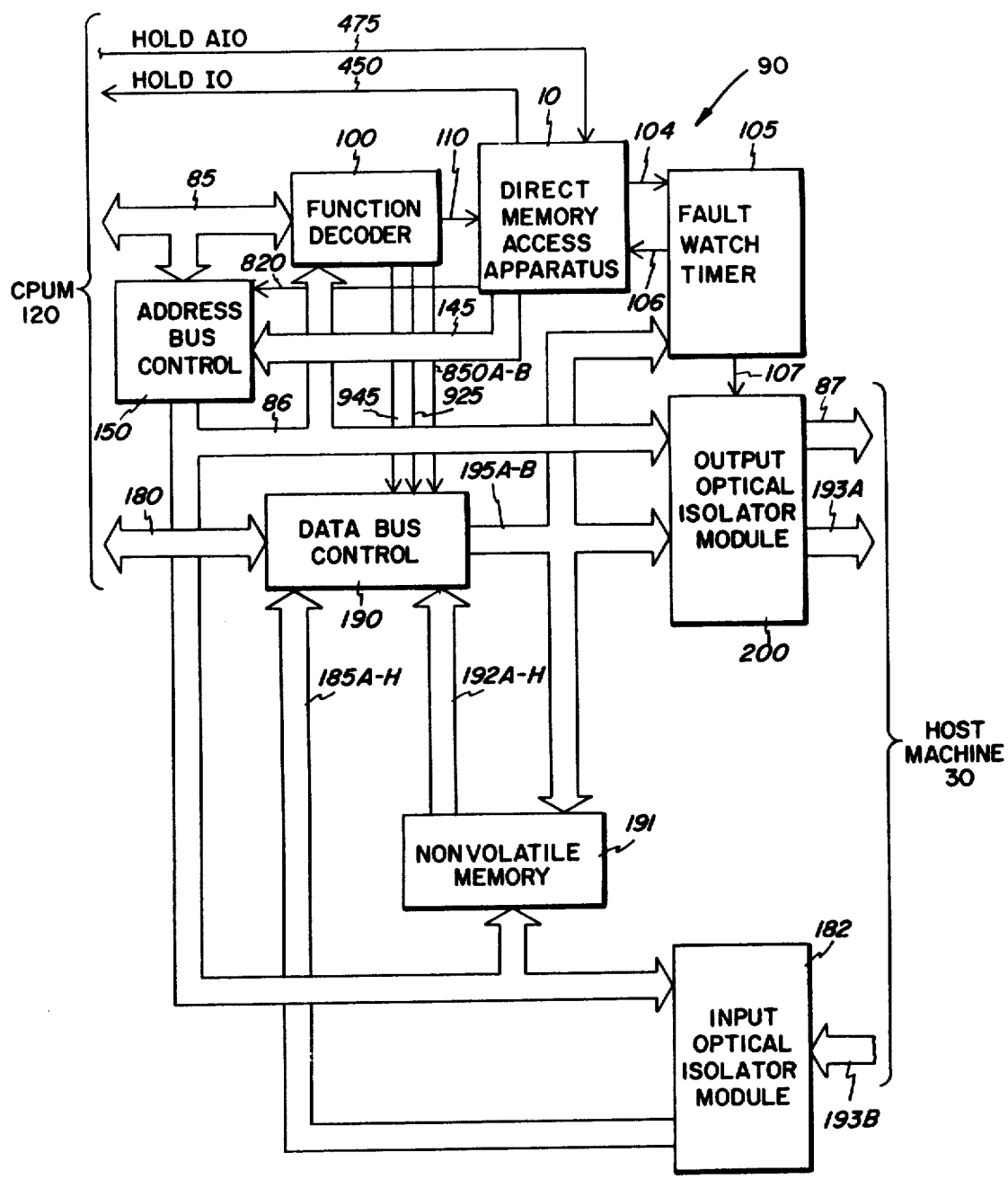
FIG. 3 is a block diagram of the input-output processor module of FIG. 1.

Referring particularly to FIGS. 1, 2, and 3 of the Drawings, there is shown, in schematic block outline, a programmatically controlled system 5 having a direct memory access refresh apparatus 10 as used in a controller 20 for directing a host machine such as an electrostatic reproduction system 30. Upon command from a central processing unit (CPU) 40, the direct memory access refresh apparatus 10 will assume control of the system terminus bus 50 including associated address, data and control lines, as will be explained infra. This will permit the direct memory access refresh apparatus 10 to transfer data from data memory 60 directly to a host machine 30 at a high speed without direct manipulation by the CPU 40. The data to be accessed by the direct memory access apparatus 10 is positioned according to a fixed sequential array of addresses in a dedicated portion of data memory 60 that has been updated periodically by the CPU 40 for the purpose of directably updating and refreshing control registers (not shown) in the host machine 30 which will, in turn, act to direct the host machine 30.

More particularly, as a CPU 40 in the central processor unit module 120 is pulsed through its given software program by clock 45, it will periodically read an instruction from program memory 175 to activate the direct memory access function. This is accomplished by the CPU 40 sending out through the address bus interface 42 a predetermined address on an address bus (SB) 80 through the system bus terminus 50 and again on an address bus 85 to the input-output processor module 90 where the direct memory refresh apparatus 10 is located. The address is then received by a function decode unit 100 in module 90 where the address is decoded into and sent as an initiation control signal on line 110 to the direct memory access apparatus 10.

Upon receipt of the initiation signal, the direct memory access apparatus 10 will in turn send out a "hold" signal on line 450 to the CPU 40, which will act to put the central processing unit 40 into a hold or suspended state. Once placed in such a state, the central processing unit 40 will, in turn, send a hold-acknowledge signal on line 475 back to the direct memory access refresh apparatus 10, indicating that it has now relinquished control of the system bus terminus 50 to the direct memory apparatus 10. The direct memory access (DMA) apparatus 10 will accordingly send out a fixed sequential array of address signals on address buffer lines 145, through its address bus control 150, to merge into address lines 85 described supra. The direct memory access (DMA) addresses on address lines 85 are then sequentially routed into the central processing unit module 120 to be received by the system bus terminus 50.

Upon receipt of predetermined addresses on lines 165 from the system bus 50, a memory address decoder 57 will output control signals on collective lines 55, 480 and 490 to enable data control circuits in the data memory 60 and a program memory 175 respectively. This will allow the fixed sequence of direct memory access addresses on lines 165 from system bus 50 to activate outputting of data from the data memory 60 on lines 655A-B to program memory 175. The data outputed from program memory 175 on line 170 is then received by the system bus terminus 50 to be outputed on data bus line 180 to data bus control 190 of the IOPM 90. The data outputed from the control 190 then proceeds on data bus 195 through an output optical isolator module 200 to the control register (not shown) in the host machine 30 for controlling the machine processes as mentioned supra. Other circuit modules in the controller 20 not directly related to the direct memory access function but interrelated therewith will be described separately infra.

To facilitate detailed description of the actual circuits in the controller 20 concerned with the direct memory access refresh function, the circuits have been separately grouped under the supra-mentioned central processor unit module (CPUM) 120 and the input-output processor module (IOPM) 90 where it is appreciated that such a separation is somewhat arbitrary. The CPUM 120 comprising the sub-modules central processor 40, data and address bus interfaces 41 and 42, hold circuit 43, system terminus bus 50, memory address decoder 57, data memory 60 and program memory 175 including associated address, data, and control bus lines. Likewise, as will be seen, the IOPM 90 which will, as indicated supra be described separately, comprises the function decode unit 100, input and output optical isolator modules 182, 200, the direct memory access 10, non-volatile memory 191, and address and data bus controls 150, 190 including various address data buffers and control lines associated therewith. As indicated supra, other circuit modules in the IOPM 90 only indirectly related to the DMA function will be described separately infra.

Figure 4:
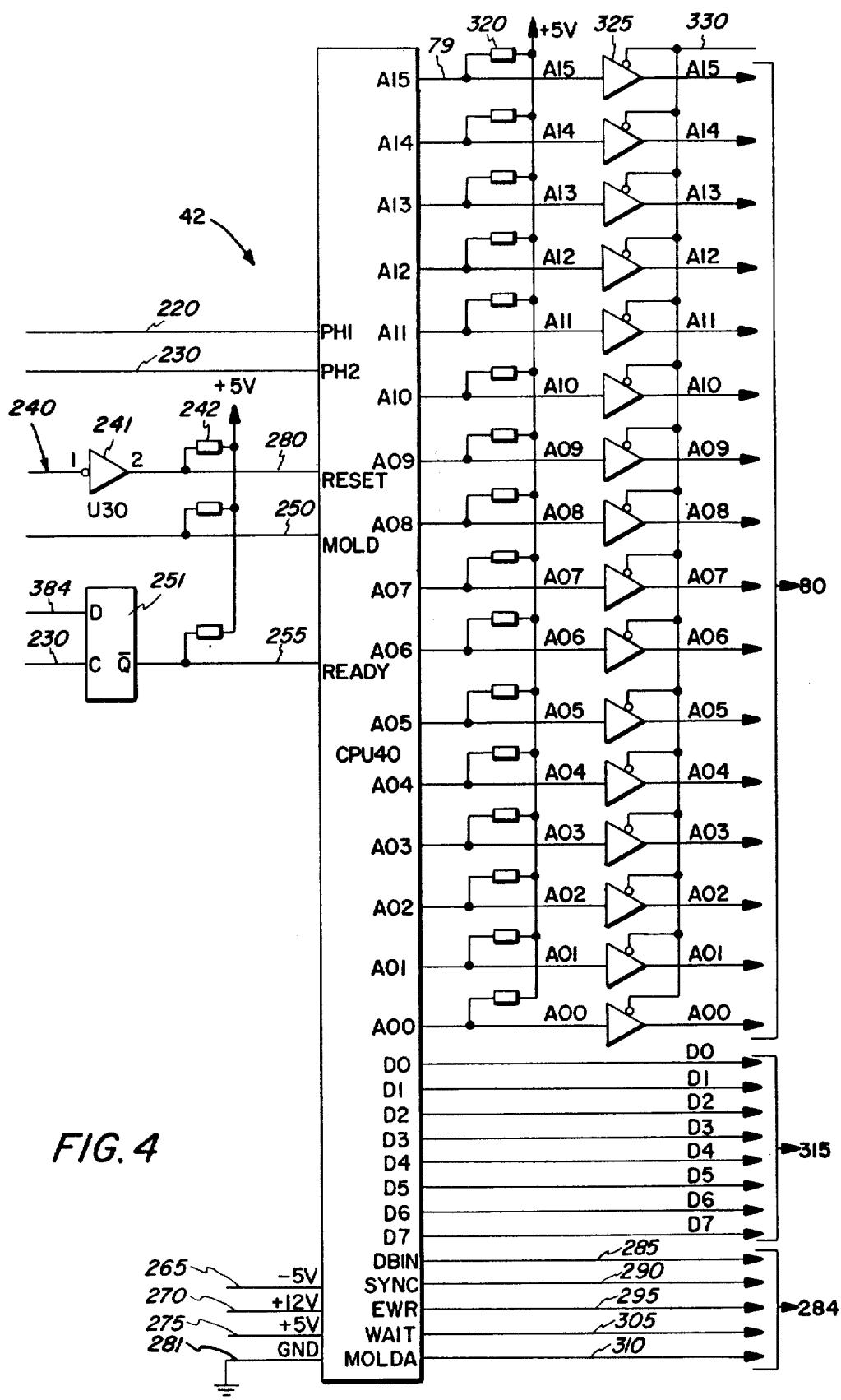
FIG. 4 is a logical diagram of the central processor address bus interface of FIG. 2.

In the central processor unit module 120, there is a central processor or microprocessor 40 used as the central computing or controlling element, as shown in the central processor address bus interface in FIG. 4. Although any of a number of microprocessors could be used to perform the desired function, in the particular embodiment described, an Intel 8080 microprocessor is used as described in Intel's 8080 Microcomputer Systems Users Manual, copyrighted 1976, Book No. 98-153C. As described in the Manual, the microprocessor or central processing unit 40 has Phase I (PH1 or 01) and Phase II (PH2 or 02) clock inputs at terminals 22 and 15 thereof wherein a 2mc cycle signal from a clock 45 is inputted as a two-phase function on lines 220 and 230 respectively.

In the central processor address bus interface 42 of FIG. 4, an input reset signal on line 240 from a control panel (not shown) is provided to the CPU 40 after inversion 241 and bias by a resistive network 242 having 1k ohm biased by +5v. When the reset signal on line 240 is activated, the sequential program address in the CPU 40 will be set to zero, thereby enabling a restart of the program at the relative beginning. A delayed hold signal on line 250 from Hold subcircuit 43, shown in FIG. 8 described infra, after biasing by network 242 may be inputted to CPU 40 to provide a means for an external device such as the DMA 10 to gain control of the address and data buses while the CPU 40 remains in a non-active or suspended state. Upon receiving a ready signal on line 377 indicating data available for input from tri-state (TS) driver 383, as explained infra, a D-type flip-flop 251 Model 74H74 will be set to output on line 255 to the ready input of CPU 40. It will be noted that the IOPM 90 will only respond with a steady signal after receiving an address from the CPU 40 indicating data input required. On lines 265, 270, 275, 281, biasing signal inputs of −5, +12, +5, and ground voltage, respectively, are provided thereon from a source (not shown) as bias for the CPU 40.

Control signals on a control bus 284 are outputed by the CPU 40 including the "DBIN" signal on line 285, wherein the "DBIN" signal indicates to external circuits that the data bus into the CPU 40 is in the input mode as to data. A "SYNC" signal on line 290 as outputed by the CPU 40 is provided to indicate the beginning of each machine cycle thereby syncing all peripheral circuits relative to the CPU 40 as will be seen infra. A "WR" signal on line 295 as outputed by the CPU 40 is provided for memory write indicating that the CPU 40 is in a write mode as to its data bus. A "wait" signal on line 305 is outputed by the CPU 40 to acknowledge that the CPU is in a "wait" state which will occur whenever an address has been outputed by the CPU 40, but a "Ready" signal has not been received in response thereto. A "HOLDA" signal is provided on line 310 as outputed by the CPU 40 to indicate that a "hold" signal has been acknowledged by the CPU 40 in response to a Hold request in that the data and address bus control may be assumed by the DMA apparatus 10 of the IOPM 90.

On each of the output address lines A00 through A15 of the address bus 79 from the CPU 40, there is a resistive network consisting of a 15k ohm resistor terminating at one end to each of the given address lines and at the other end to a +5v power supply wherein each of the resistive networks 320 is used for biasing the respective address lines. Subsequent to said supra biasing resistive network 320 on each address line is a tri-state (TS) HEX bus driver 325 such as Model 74367 used to drive each of the address lines to output as address bus 80. Unless otherwise stated, all model numbers for designated parts are to be found in the TTL data book for design engineers published by Texas Instruments Incorporated. Controlling each of the drivers 325 on line 330 is signal "DHOLDA" which is a fixed delayed derivative of the "HOLDA" signal on line 310 mentioned supra and as will be explained further infra.

Figure 5:
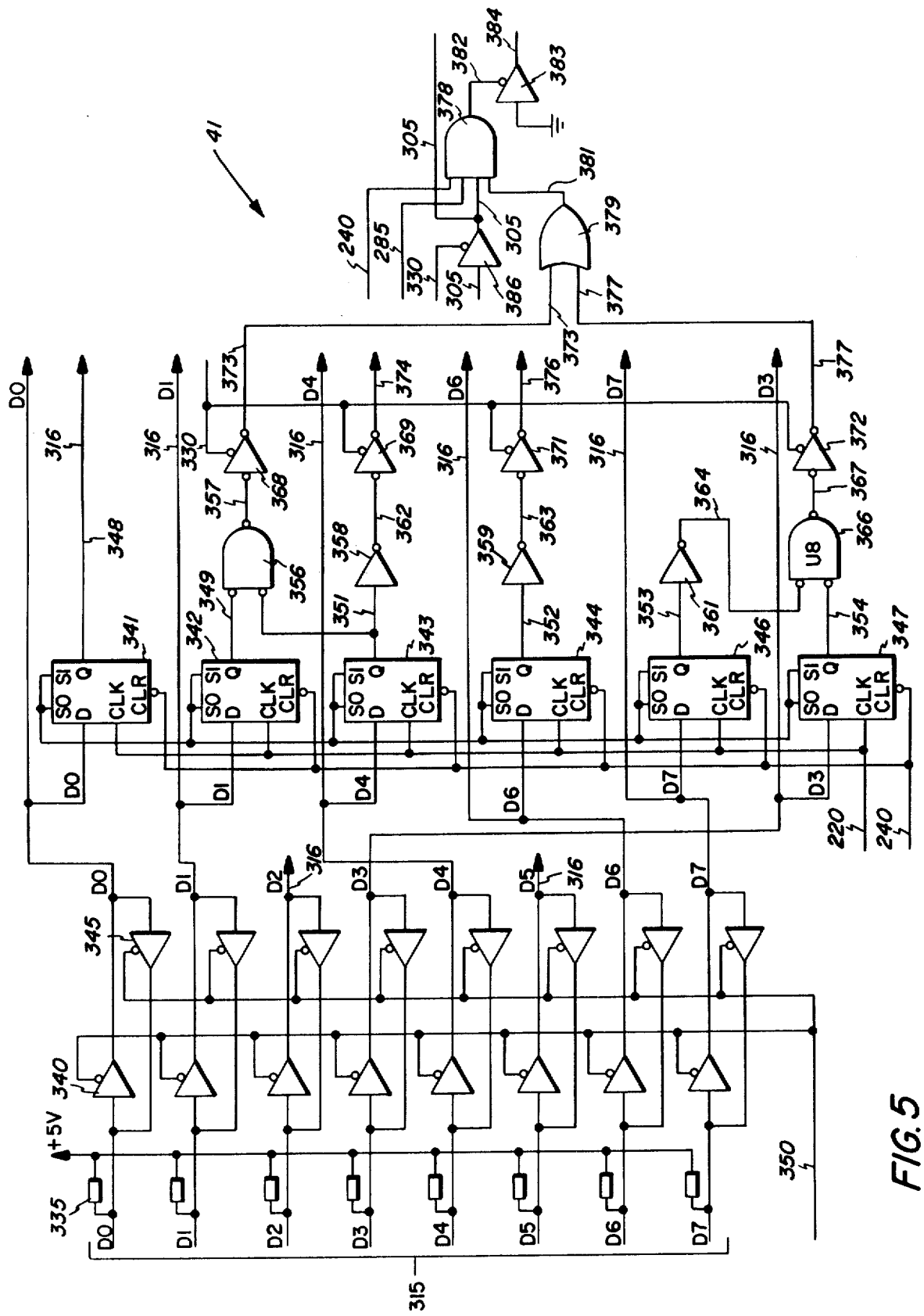
FIG. 5 is a logical diagram of the central processor data bus interface of FIG. 2.

In the central processor data bus interface 41 of FIG. 5, the output data lines on data bus 315 as outputed from CPU 40 are biased by a resistive network 335 comprising 15 ohm resistors which are terminated at one end on each of the data bus lines and at the other end by a positive 5v power supply. Immediately subsequent to the resistive network 335 on each of the data lines is a three-state HEX bus driver 340, Model 74367 for data outputed from CPU 40. Parallel to the tri-state driver 340 on each data bus line is an identical tri-state driver 345 for data being received by CPU 40. Each of the tri-state driver sets of 340 and 345 being controlled on line 350 by a delayed Hold-Acknowledge signal mentioned supra and described infra in detail which acts to turn off the data bus 315 relative to CPU 40 during the DMA function.

Also in the central processor data bus interface 41, there are delay circuits for selected data bus bits used as status information on various control lines comprising 4-bit shift registers that function as D-type flip-flops in a parallel mode such as 341, 342, 343, 344, 346, and 347. Each is operative to receive clock PH1 signals of 2mc on line 220 at terminal CLK, reset clock signals on line 240 at terminal CLR, and sync signals on 290 at terminals 50 and 51 for setting parallel mode. D-type flip-flops 341, 342, 343, 344, 346 and 347 each output from terminal Q on lines 348, 349, 351 352, 353, and 354 respectively. NAND gate 356 with inverted inputs receive signals on lines 349 and 351 to output upon concurrent receipt of inputs to line 357. Inverters 358, 359 and 361 are operative to reverse the polarity of signals on lines 362 and 363 and 364 respectively. NAND gate 366 with inverted inputs will upon concurrent receipt of signals on lines 354 and 364 output on line 367. Tri-state (TS) Drivers 368, 369, 371 and 372 with inverted inputs will upon receipt of a central "Hold" signal on line 330 output on lines 373, 374, 376 and 377 respectively.

The "Ready" signal that is ultimately used for enabling the ready control 1090 of function decode 100 of the IOPM 90 is generated by inputs to an AND gate 378 including the "Reset" signal from the control panel (not shown) as mentioned supra on line 240, the supra "DBIN" signal on line 285, the second "Ready" signal to be described infra on line 305, and the alternative result from OR gate 379 on line 381. OR gate 379 is operative to receive inputs from either the "MEMWRITE" signal on line 373 or the "MEMREND" signal on line 377. Upon concurrent receipt thereof by AND gate 378, it will output on line 382 as a control line to a TS-Driver 383 having its input grounded and its output the signal "READY" on line 384 to the CPU 40. A second "Ready" signal is obtained from the wait signal on line 305 being inputed to TS-Driver 386 having a control signal "DHOLDA" on line 330 and operative to output on line 305 as a "Ready" derivative of the wait signal.

Figure 6A:
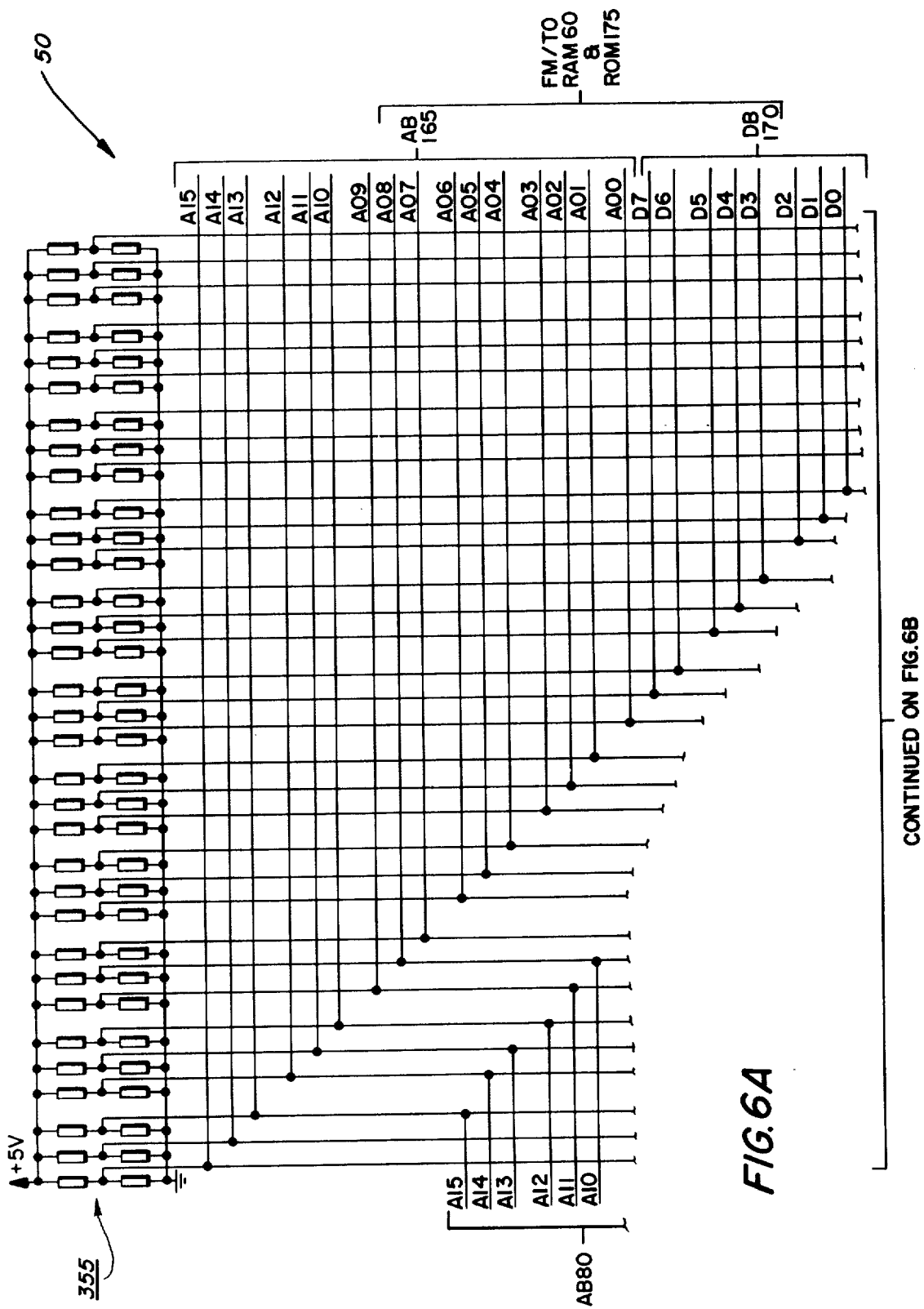

At the system bus or system bus terminus therefore 50, as shown in FIG. 6, the address bus (AB) lines 80 have a common termination with lines proceeding to a resistive network 355 having a grounded resistor of 492 ohms at one end of the terminus and a +5v biased resistor of 2.5k ohms at the other end of the terminus therewith.

The address bus lines 80 are also terminated by a set of address lines on address bus 165 going to the data and program memories 60 and 175 respectively. A final set of address lines 85 for the system bus terminus 50 received on lone 80 is used for address signals inputed and outputed from the IOPM 90.

Data bus lines 316, as outputed from CPU 40, also are biased by the resistive network 355 which has a resistor of 492 ohms biased by 5v on its non-terminus side and also a separate 2.5k ohm resistor grounded on its non-terminus side. Each of the data bus lines 316 at the terminus point of the system bus 50 is connected to a respective data bus line 170 going to data memory 60. Likewise, data bus lines 316 also have point of connectable terminus with data bus lines 180 proceeding to IOPM 90.

In regards to the Memory Address Decode 57 as shown in FIG. 7, a portion of the address bus lines 165 including address lines A10 through A15 is A11 to Tri-State Drivers 365 each having their control lines grounded on line 372. The outputs from the Tri-State Drivers 265 for address lines A12–A15 on lines 386 to 389, respectively, are adapted to go to a NAND gate 395. Address lines A10 and A11 as outputed by their respective Tri-State Drivers 365 are adapted to output on lines 375 and 380 to OR gate 390 and from there to the NAND gate 395. The outputs from the Tri-State Drivers 365 for address lines A10 and A11 on line 375 and 380 are also adapted to input to a dual decoder 385, Model 74155 where said address lines A10 and A11 are adapted to be received by the input terminals for Select A and Select B of the dual decoder 385. The strobe 2G terminal of the dual decoder 385 is simply biased on line 415 by a resistive network 410 having a first commonly terminated resistor of 492 ohms biased by a +5v and a second of 2.5k ohms biased by ground insomuch as the second set of outputs of the decoder 385 is never used in this case.

The output from NAND gate 395 is used to input to strobe 1G terminal of the dual decoder 385. The terminal for data input for the dual decoder 385 also receives a bias on line 415 from network 410 thereby leaving it in a continuous "on" condition. NAND gate 395, by receiving inputs from address lines A10–A15 on lines 375, 380 and 386-389 respectively, operates to direvatively dictate a global range of addresses for chip enable (CE) for data memory 60. In addition, a subset of the supra addresses A10 and A11 on lines 375 and 380 respectively, determine a local range of addresses for chip enable (CE) for activating predetermined areas of the data memory 60. The designated chip enable (CE) address will be outputed from terminals 1Y1, 1Y2 and 1Y3 of the decoder 385 collectively as bus 58 or individually as lines 420, 430, and 440 respectively.

When strobe 1G of decoder 695 receives an enabling signal on line 386 from TS drivers 365, it will indicate a general address condition for chip select (CS) for the program memory 175. Consequentially, allowing A14 or A13 on lines 387 and 388 to be high will dictate a local range of addresses for chip select (CS) thereby enabling a particular area of the program memory 175. The designated chip select (CS) address will be outputed from terminals 1Y0, 1Y1, 1Y2 and 1Y3 of the decoder 695 collectively on bus 55 or individually as lines 700, 705, 710 and 715 respectively. Each of the supra output lines being biased by a resistive network having 680 ohms biased by a +5v. Chip enable address line 440 is operative to bifurcate first as line 480 and secondly through inverter 485 as line 490 to designate either a respective first or a second global portion of program or data memory 60, 175 as will be detailed infra.

Figure 8:
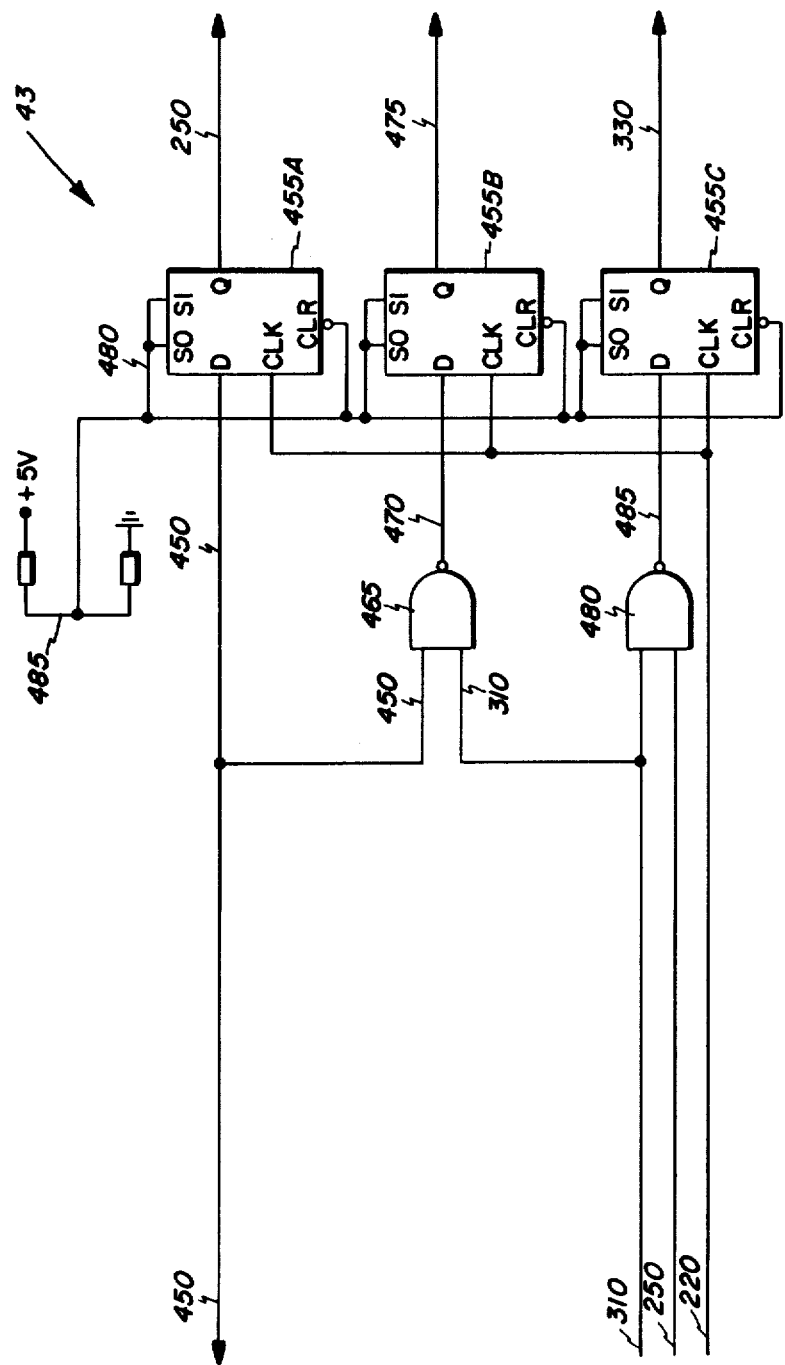
FIG. 8 is a logical diagram of the Hold circuit of FIG. 2.

In the Hold circuit 43 of FIG. 8, on line 450 a DMA "hold" signal may be received from the DMA refresh apparatus 10 as will be described infra to be relayed to a set of 4-bit bidirectional shift registers 455A-C, Model 74194 which in this embodiment is segmentally used as a D-type flip-flop. Each of the flip-flops 455A-C have a S0 and S1 terminal commonly tied to give parallel select inputs, a clock input terminal (CLK), a clear input terminal (CLR), a data input terminal (I) and an output terminal (0). The DMA "hold" signal on 450 being adapted to proceed to the terminal input of the flip-flop 455A for clock set at its output terminal thereby giving a set delayed "hold" signal on line 250 that syncably anticipates time constants inherent in the system. Line 450 having signal DMA "hold" also is gated with line 310 having a "Hold-Acknowledge" signal from the CPU 40 at NAND gate 465. Receipt of true signals by gate 465 enables it to output on line 470 to the input terminal of D-type flip-flop 455B and accordingly develop a signal on output terminal of same flip-flop 455B on line 375 to the DMA refresh apparatus 10 as a set delayed "Hold-Acknowledge" signal similarly as discussed supra.

The "Hold-Acknowledge" signal from the CPU 40 on line 310 is also gated with the delayed hold signal on line 250 at NAND gate 480 which outputs, upon concurrent true signal input receipt thereof, on line 485 to terminal input of D-type flip-flop 455C and outputs on terminal output as line 330 to the Tri-State Drivers 325 of the address bus interface 42 mentioned supra. It will be noted that the shift register 455A-C acting as a D-type flip-flop is placed in its parallel mode by biasing both the terminals S0 and S1 corresponding to "shift left" and "shift right" modes through a line 480 received from resistive network 485 comprising a resistor of 492 ohms biased by +5v at one end and terminating at the line 480, and a resistor of 2.5k ohms grounded at one end and terminated at the other end also with the line 480. Shift register 455A-C is clocked by the 2mc signal Phase I portion of the 2mc clock 45 on line 220.

Figure 9A:
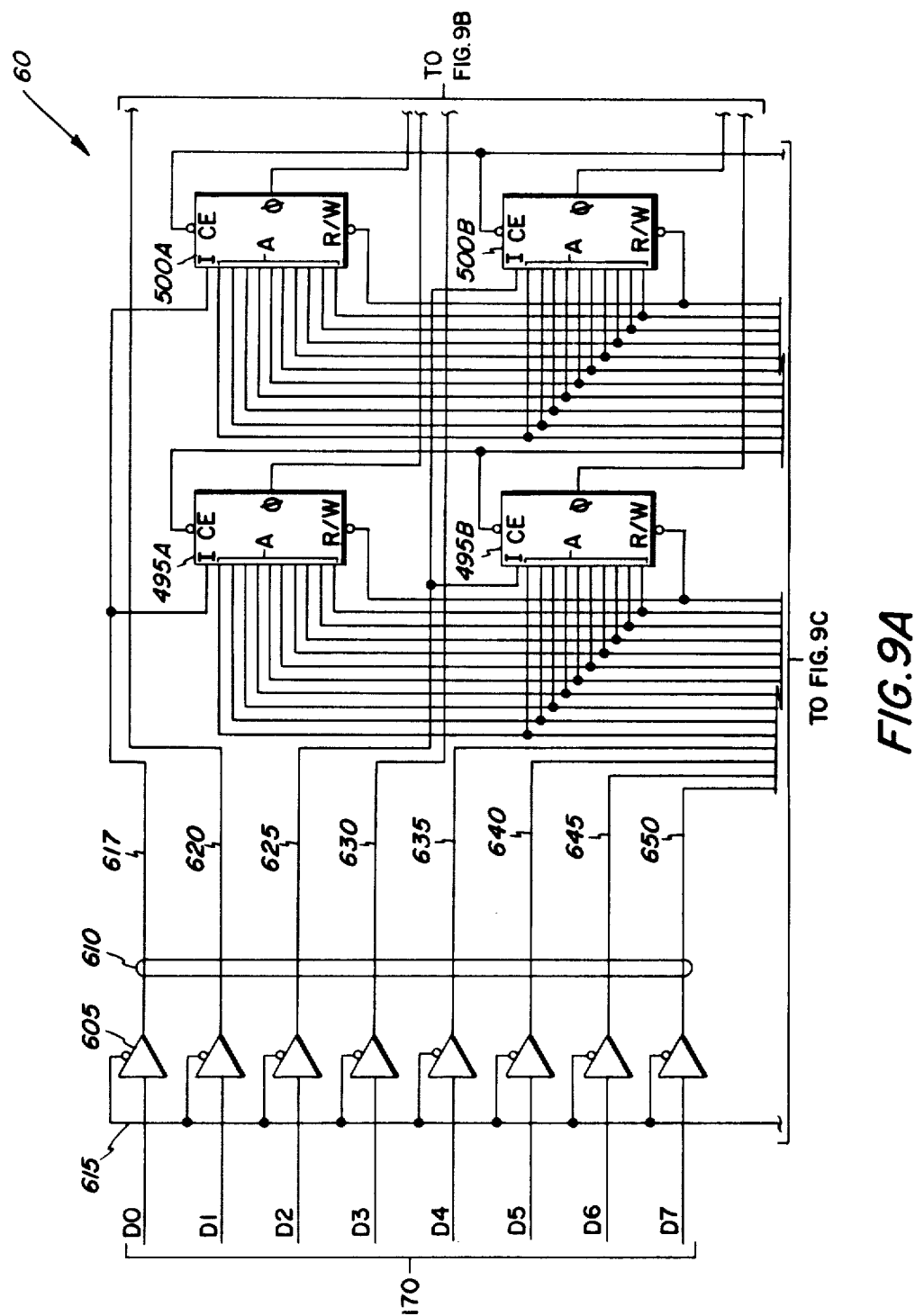
Figure 9B:
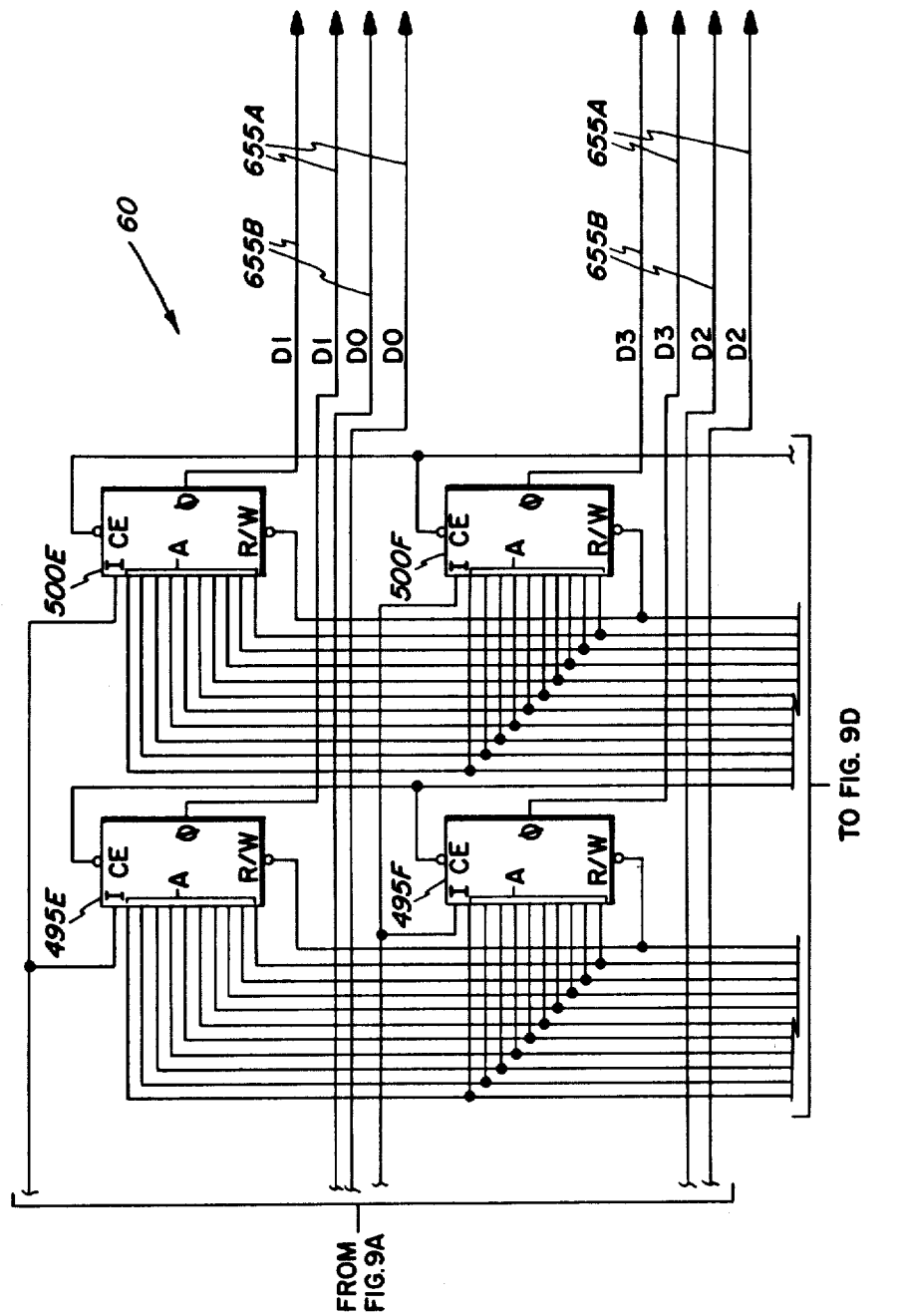
Figure 9D:
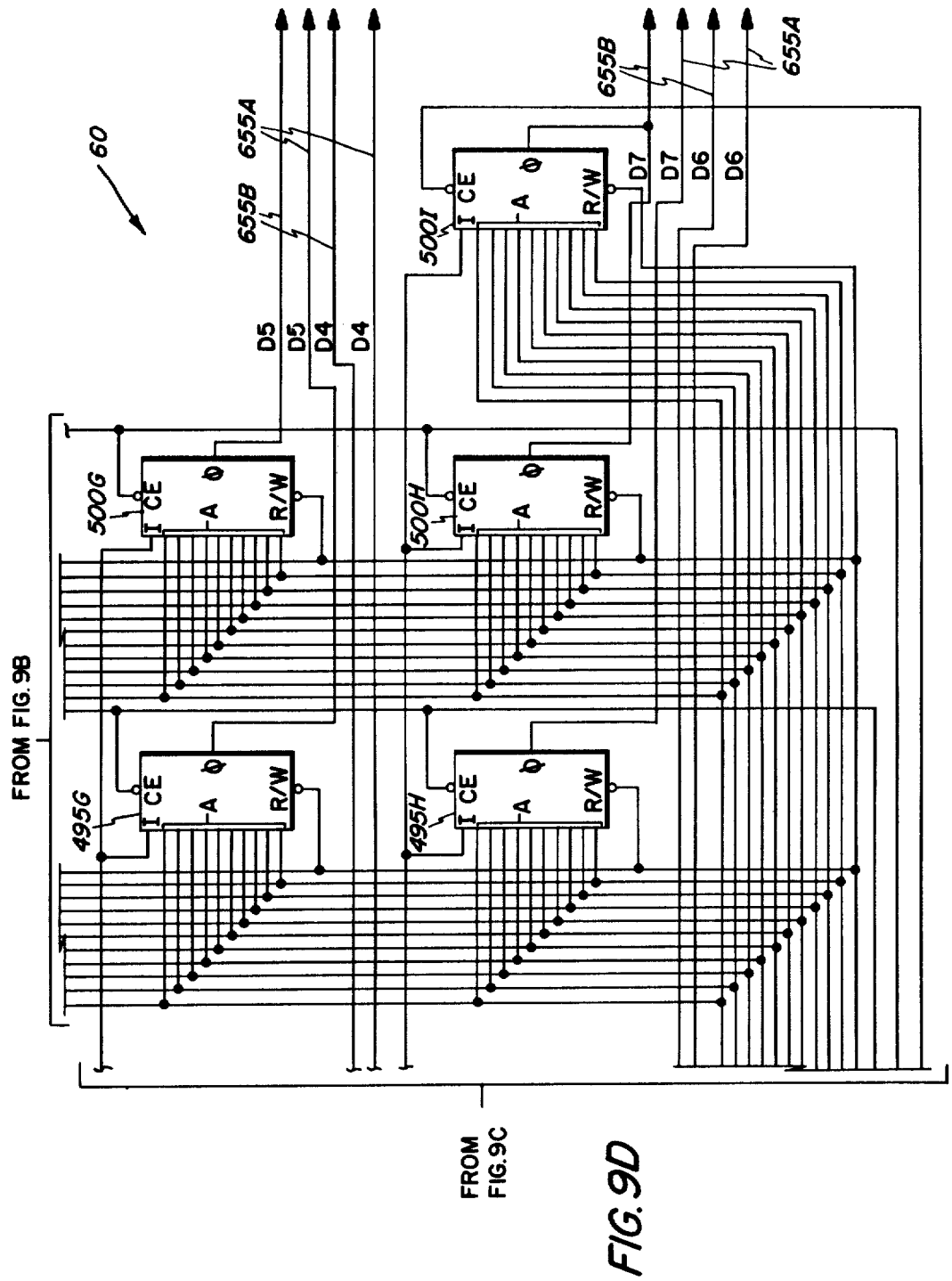

In data memory 60 of FIG. 9, there exist 17 RAMs (Random Access Memories) subdivided into a first portion and a second portion: RAMs 495A, 495B, 495C, 495D, 495E, 495F, 495G, and 495H comprising the first portion of data or RAM memory 60; RAMs 500A, 500B, 500C, 500D, 500E, 500F, 500G, 500H, and 500I comprising the second portion of RAM memory 60. Each of the RAMs are a Model No. 2102 having a 1024 × 1-bit configuration, of the static RAM type. Each of the RAMs in the first portion and the second portion have address inputs or "A" terminals for the address lines A0 - A9. In addition, an enable input is provided at the "CE" terminal, a data input at the "I" terminal, a Read/Write input at terminal "R/W" and a data output at terminal "O".

Address bus lines A0 - A9 165 from the system bus 50 are operative to input each to its own Tri-State Driver 590 and from there to be outputed on address lines 595 in parallel to all the supra-described RAMs of the data memory 60. Each of the Tri-State Drivers 590 has its control line 600 grounded for continuous driving whenever signals are present at the input thereof.

Data bus lines (D0-D7) 170 from system bus 50 are inputed each to their own set of Tri-State Drivers 605 and from there to be outputed on data bus lines 610. The Tri-State Drivers 605 for the data bus 170 are grounded on control line 615 in a manner similar to that described supra. The Data Zero signal on line 617 of the data bus 610 is operative to be sent to the data input terminal "I" of RAM 495A of the first portion and also to the data input terminal of RAM 500A of the second portion of data memory 60. The Data One signal on line 620 of data bus 610 is operative to be sent to the data input terminal of RAM 495E of the first portion and RAM 500E of the second portion of data memory 60. The Data Two signal on line 625 of data bus 610 is operative to be received at the data input terminal of RAM 495B of the first portion and the data input terminal of RAM 500B of the second portion of data memory 60. The Data Three Signal on line 630 of the data bus 610 is operative to be sent to the data input terminal of RAM 495F of the first portion and RAM 500F of the second portion of data memory 60. The Data Four signal on line 635 of data bus 610 is operative to be sent to data input terminal of RAM 495C of the first portion and RAM 500C of the second portion of data memory 60. The Data Five signal on line 640 of bus 610 is sent to the data input terminal of RAM 495G of the first portion of data memory 60 and also to RAM 500G of the second portion of data memory 60. The Data Six signal on line 645 of data bus 610 is sent to the data input terminal of RAM 495D of the first portion and to RAM 500D of the second portion of data memory 60. The Data Seven signal on line 650 of data bus 610 is sent to the data input terminal of RAM 495H of the first portion and RAM 500H of the second portion, and RAM 500I of the second portion of data memory 60.

A Read/Write enable input at terminal R/W of all RAMs in data memory 60 is operative to receive a signal indicative of the need for reading or writing depending on the presence or absence thereof, respectively, on line 295 from the CPU 40 output control line for the reading writing. The chip enable terminal (CE) for each of the RAMs of data memory 60 receives their respective inputs from the memory address decoder 57 described supra. Signals on line 420 will enable RAMs 495A-4 located in the first portion of data memory 60. A signal on line 430 will enable RAMs 500A-H located in the second portion of data memory 60. A signal on line 440 will enable RAM 500I of second portion of data memory 60. Data output lines for the RAMs located in the first and second portions of data memory 60 are separately outputed from the "0" terminal of each of the RAMs such that lines 655A indicate output data lines for the first portion and lines 655B indicate output data lines for the second portion 500 of data memory 60 as outputed by the RAMs in memory 60. It should be noted that the division between the first portion having RAMs 495A-H and the second portion having RAMs 500A-I of data memory 60 is arbitrary in that particular components used having limited input-output capabilities may constrain the given design, but should not be construed as a limitation of the present invention as conceived.

From data memory 60, the first portion comprising RAMs 495A-H is outputed on the data bus lines 655A representing first portion and the data bus lines 655B representing second portion of data memory 60 to biasing networks 665 and 670 respectively. Each of the biasing networks 665 and 670 are terminated on each of the data bus lines with a 10k ohm resistor, which is terminated at its opposite end by a +5v for biasing its respective data bus line. Downstream from the biasing resistive networks 665 and 670 are sets of Tri-State Drivers 675 and 680 for the data bus lines 655A and 655B respectively.

Control lines 480 and 490 from the memory address decode (57) described supra act to alternatively drive their respective sets of Tri-State Drivers 675 and 680 respectively depending on which control line is programmatically activated thereby enabling either the first or second portion of data memory 60. Tri-State Drivers 675 and 680 are operative to output on the sets of data bus lines 685 and 690 respectively. Each of the data bus lines of set 685 are conventionally "OR" hardwired (not shown) to their equivalent in set 690 to form a single set of data bus lines 170 as received by system bus terminus 50. As such, either a signal from set 685 or 690 will be present on any given line of the data bus line 170 representing merged data bus lines 685 and 690 at any given time where, as indicated supra, the data system bus 170 is connected to the system bus terminus 50.

Figure 10A:
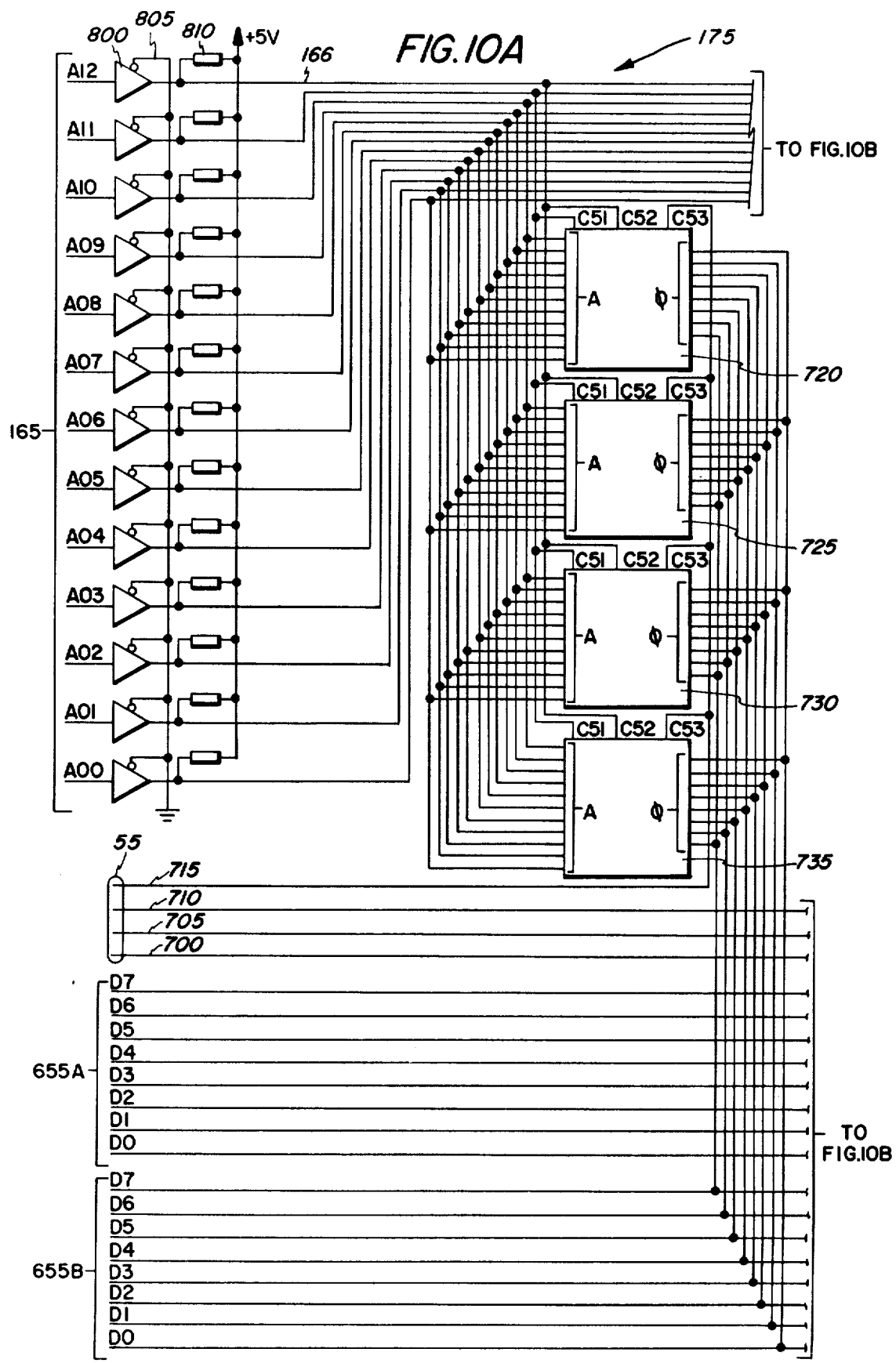
Figure 10B:
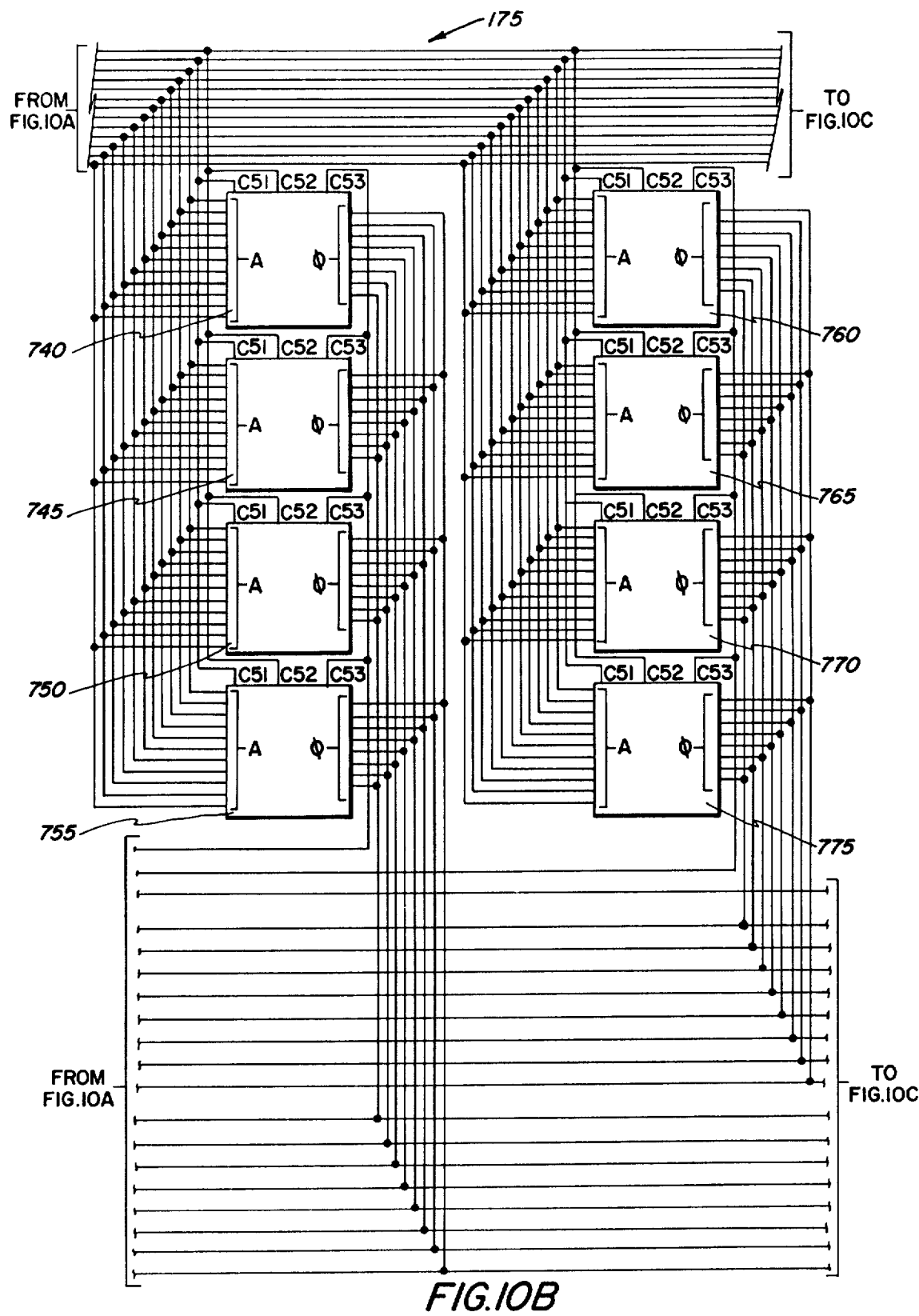

In the program memory 175 of FIG. 10, address line 165 from the system bus 50 are presented to Tri-State Drivers 800 having their control lines 805 grounded for continuous operation. Downstream to said Tri-State Drivers 800, a biasing resistive network of 680 ohms is terminated along each of the lines with the opposite end of said resistive network 810 being biased by a 5v supply for biasing of each of the address lines. The address lines on address bus 166 are operative when outputed by TS Drivers 800 to be sent in parallel to the respective downstream address input terminals "A" for the ROMs of 175 described infra.

Also, in the program memory 175 of FIG. 10, there are a plurality or read-only memory (ROM) units 720, 725, 730, 735, 740, 745, 750, 755, 760, 765, 770, 775, 780, 785, 790, and 795. Each of the ROMs mentioned supra is a Model 8316A having input address terminals "A" for address lines A0 - A9.

The chip select-1 line of each of the ROMs in memory 175, which is the same as the address eleven (A11) line, is inputed on terminal CS1. Likewise, chip select-2 which is the same as the address twelve (A12) is inputed on terminal CS-2. Chip select-3 signal, as inputed to terminal CS-3, is the same as control line 715 from memory address decode 57 for terminal CS-3 for ROMs 720, 725, 730 and 735; control line 710 from memory address decode 57 for ROMs 740, 745, 750, and 755; control line 705 from memory address decode 57 for ROMs 760, 765, 770 and 775; and control line 700 from memory address decode 57 for ROMs 780, 785, 790, and 795. Output lines "0" originate from their respective ROMs of memory 175 so as to parallelly terminate and merge into data bus lines 600 for ROMs 750, 725, 730, 735, 740, 745, 750, and 755, and also to parallelly terminate on data bus lines 655 for ROMs 760, 765, 770, 775, 780, 785, 790 and 795. The output data lines from the ROMs of memory 175 after being terminated with the data bus lines 655A and 655B, will proceed to the resistive networks 665 for termination therewith, as mentioned supra, for eventual distribution to the system bus terminus 50.

Figure 11:
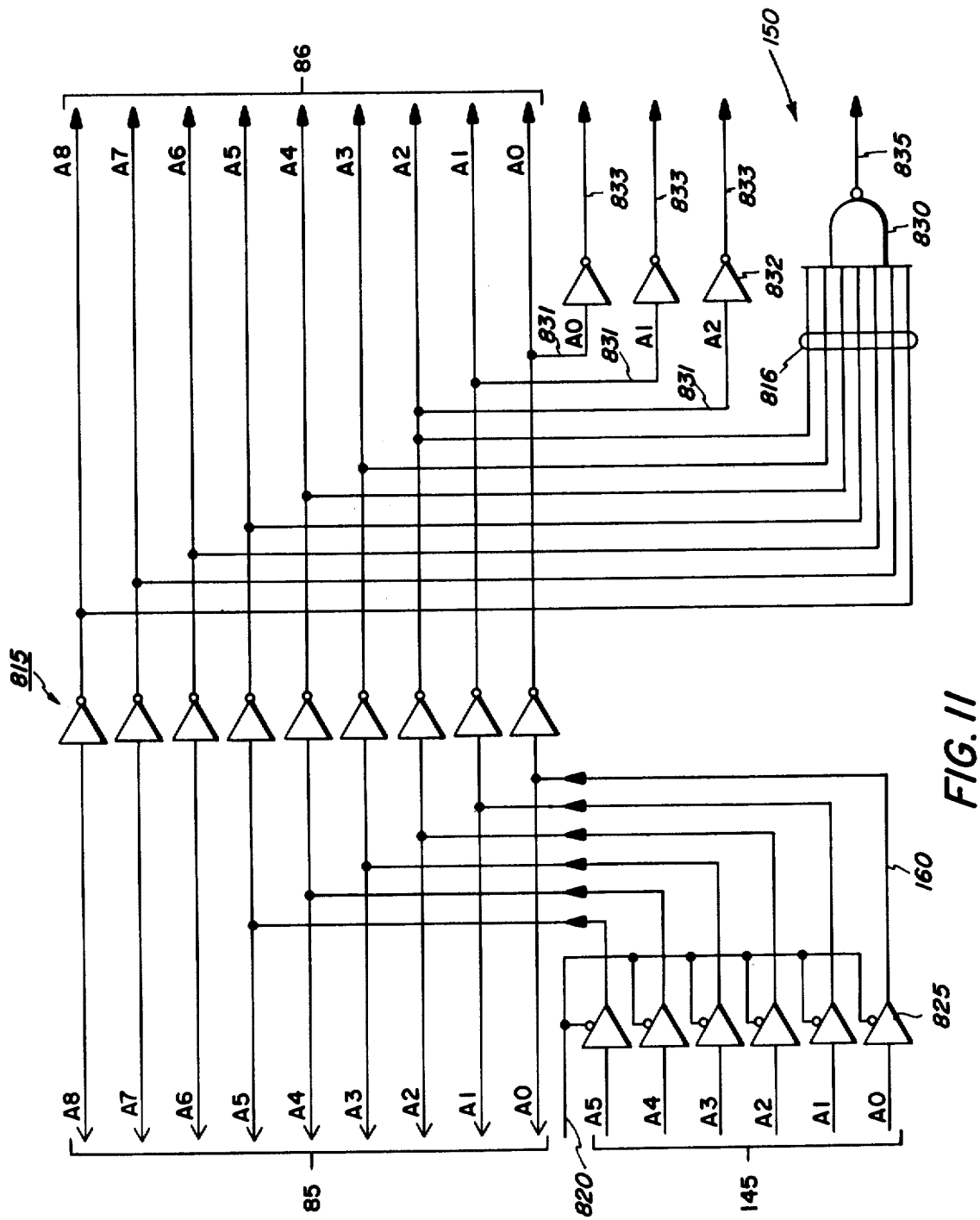
FIG. 11 is a logical diagram of the Address Bus Control of FIG. 3.

In the address bus control 150 of the input-output processing module 90, as shown in FIG. 11 mentioned supra, there is received address line A00 - A08 representing the addressing a subset of address lines 85 from the CPU 40 of the CPUM 120. Each of the address lines A00 - A08 inputs into its own respective HEX inverter 815. Prior to inputing to said inverter 815, each of the address lines A00 - A05 is terminated by a corresponding address lines 145 from the DMA refresh apparatus 10. Signals on lines 160 from the DMA refresh address lines 145 will only enter their respective address lines on address bus 85 upon receipt of a control signal on line 820 to Tri-State Drivers 825 acting as a buffer. Operation of such a control signal on line 820 will be explained infra. Each of the address lines 86 subsequent to the output of inverters 815 is terminated collectively on lines 816 to a NAND gate 830 to output a signal on line 835 to the function Decode unit 100 as will be explained infra. For address bus signals A0 - A2, address lines 86 are bifurcated to lines 831 to be received by inverters 832 for outputing negations thereof respectively on lines 833 to IOIM 182 as described infra. Address bus lines 86 from the Address Bus Control 150 are additionally directed to output optical isolator module (OOIM) 200 to be outputed on lines 87 for accessing of auxiliary ROM or RAM memory (not shown).

Figure 12A:
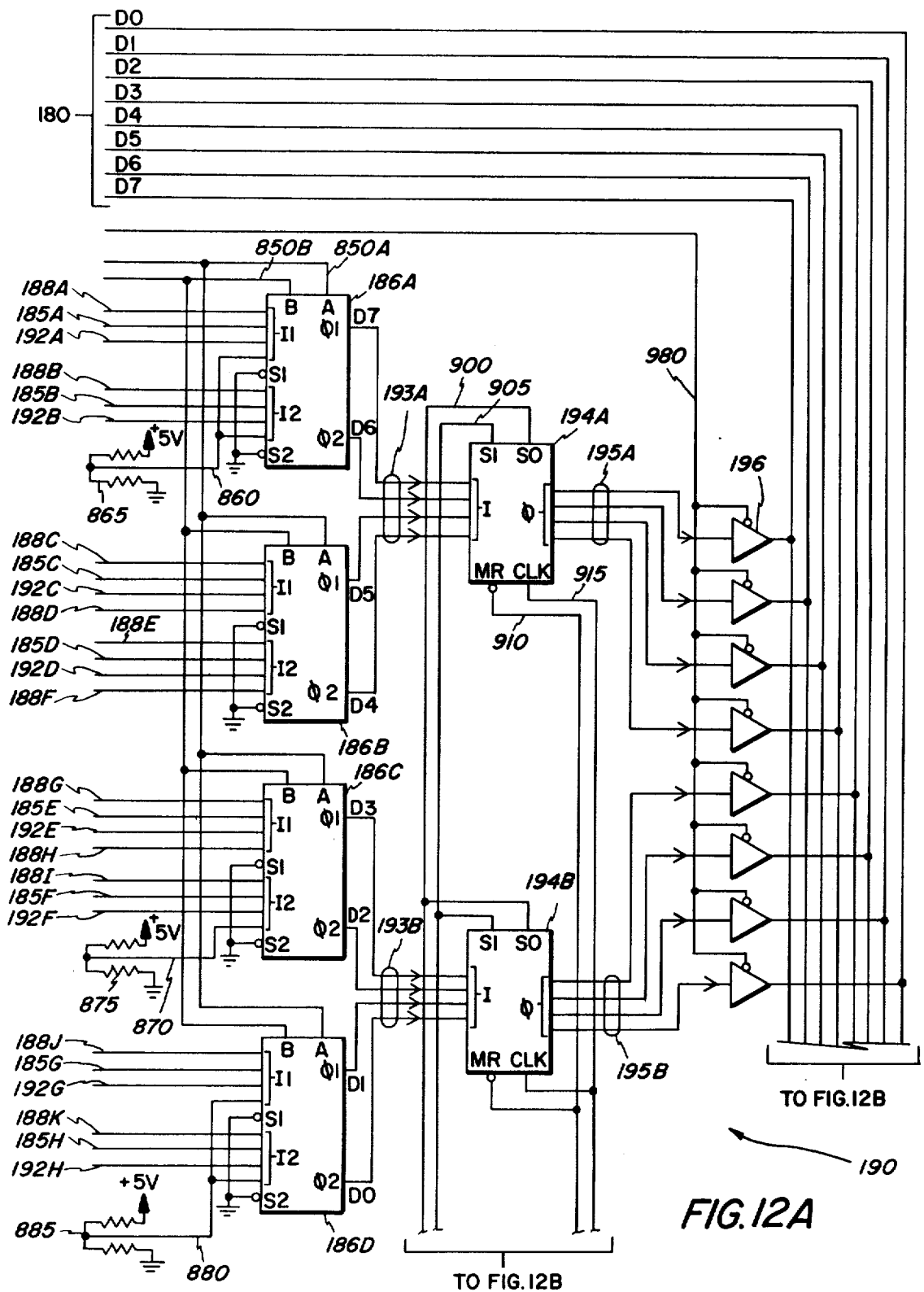
FIGS. 12A-B is a logical diagram of the Data Bus Control of FIG. 3.
Figure 12B:
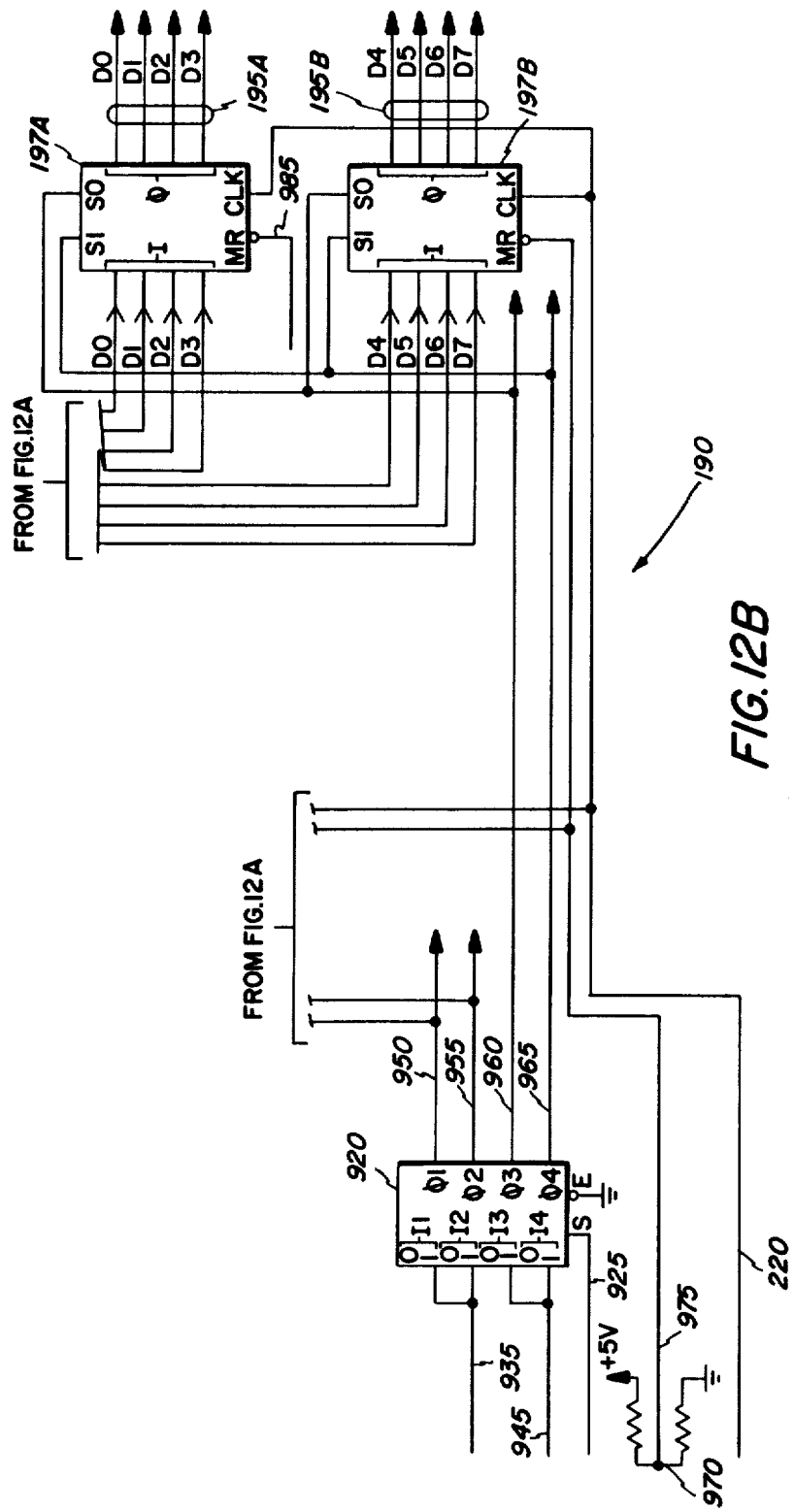

In the data bus control 190 of IOPM 90 as shown in FIG. 12, data bus 180 from the CPUM 120 is received as inputs on data zero through data seven (D0 - D7) lines. Converging indirectly on the data bus line 180 are data lines 185A-H from the input optical isolator module 182 mentioned supra; data lines 192A-H from the non-volatile memory 191 mentioned supra, and the data lines 188A-I from an interrupt module (not shown). All of the supra data lines 188A-I, 185A-H, 192A-H being inputed to a set of multiplexers 186A-D having Model No. 74153 being of a type which is a 4 to 1 dual multiplexer operative to direct one line of a parallel data set into a serial data stream. Each of the multiplexers 186A-D have a first Select control on terminal "A" and a second Select control on terminal "B" inputs receiving signals on lines 850A and 850B respectively from the function decode module 100 described infra. Each of the multiplexers have a strobe 1 input on terminal S1 and a strobe 2 input on terminal S2 where each is grounded for continuous strobe. Each of the multiplexers 186A-D has a first set of four data inputs I1 and a second set of four data inputs I2.

Received on the first set of four data inputs I1 of multiplexer 186A, are data lines (D7) 188A from interrupt module (not shown) 185A from the input optical isolator module (IOIM) 182, 192A from non-volatile memory 191, and 860 from resistive network 865 having common terminations with a resistor of 492 ohms +5v positively biased and a resistor of 2.2k ohms grounded. Received on the second set of four data inputs I2 of multiplexer 186A, are data lines (D6) 188B from interrupt 185B from IOIM 182, 192B from non-volatile memory 191 and 860 again from biasing resistive network 860. Received on the first set of four data inputs of multiplexer 186B are data lines (D5) 188C from interrupt 185C from IOIM 182, 192G from nonvolatile memory 191, and 188D from interrupt. Received on the second set of four data inputs of multiplexer 186B are data lines (D4) 188E from interrupt 185D from IOIM 182, 192D from non-volatile memory 191 and 188F also from interrupt.

Received on the first set of four data inputs of multiplexer 186C are data lines (D3) 188G from interrupt 185E from IOIM 182, 192E from non-volatile memory 191, and also 188H from interrupt. Received on the second set of four data inputs of multiplexer 186C are data lines (D2) 188I from interrupt, 185F from IOIM 182, 192F from non-volatile memory 191 and a biasing line 870 from a commonly terminated resistive network 875 having a first resistive component of 492 ohms positively biased by +5v and a second resistive element of 2.2k ohms grounded. Received on the first set of four data inputs of multiplexer 186D are data lines (D1) 188J from interrupt, 185G from IOIM 182, 192G from non-volatile memory 191, and biasing line 880 from respective network 885 having a pair of resistors commonly terminated to said biasing line 880 with a first resistor of 492 ohms positively biased by +5v and a second resistor of 2.2k ohms grounded.

Received on the second set of four data inputs of multiplexer 186D are data lines (D0) 188K from interrupt 187, 185H from matrix read 184, 192H from non-volatile memory 191, and a biasing line 880 from supra-described resistive network 885.

Each of the multiplexers 186A-D has a first output on terminal (01) corresponding to the first set of data input lines on terminals (I1) and a second output on terminal (02), corresponding to the second set of data input lines on terminals (I2). For multiplexer 186A, terminal (01) outputs a line corresponding to data bus line 7 (D7), terminal 02 of multiplexer 186A outputs a signal corresponding to data bus line (D6), terminal 01 of multiplexer 186B outputs a signal corresponding to data bus line 5 (D5), and terminal (02) of multiplexer 186B outputs a signal corresponding to data bus line 4 (D4) where data bus lines D4-7 collectively are grouped as 193A. Terminal (01) of multiplexer 186C outputs a signal corresponding to data bus line 3 (D3), terminal (02) of multiplexer 186C outputs a signal corresponding to data bus line 2 (D2), terminal (01) of multiplexer 186D outputs a signal corresponding to data bus line 1 (D1), and terminal 02 of multiplexer 186D outputs a signal corresponding to data bus 0 (D0) where data bus lines (D0–D3) collectively are grouped as 193B.

Buffers 194 (A–B) in the data bus control 190 provide a predetermined latching and sync delay function for data bus lines 193A and B through the medium of a 4-bit bidirectional shift register, Model 74194. Each of the shift registers 194A and B have a shift/left and shift/right mode input on terminals S1 and S0, respectively, which, when a signal is applied on lines 900 and 905 to both said terminals simultaneously, will provide a parallel shift as required in the present case. Additionally, each of the shift registers 194A and B is operative to be reset on terminal (MR) upon receiving signals from line 910, and to be clocked on terminal (CLK) upon receiving signals on line 915. Both of the shift registers 194A and B, after being reset on line 910 and upon having simultaneous signals on select mode terminals S0 and S1 will proceed, after receiving a clock signal on 915, to parallelly shift the input data on lines 193A and B into terminals (I) and out through the shift register onto output lines 195A and B on terminals (O), thereby giving a synced latched signal effect.

To effect the parallel shift through inputs of buffer latches 194A-B, there is provided a quad 2 to 1 multiplexer 920 such as a Model 74157. The enabling input of multiplexer 920 is at terminal (E) where it receives a grounded input for a permanent "on" condition. The common selected input at terminal (S) is received on line 925 from the functional decode 100 which is used to always select a "1" input as explained infra. Input terminals for the multiplexer 920 are categorized as paired "zero" inputs (0) and "one" inputs (1) (I1-4) where only "one" inputs (1) are used in the present embodiment.

Terminal 1 for inputs I1 and I2 receive common inputs from line 935 of said functional decode 100. Terminals 1 for inputs I3 and I4 receive common inputs from line 945 of said functional decode 100. A signal will output on terminal 01 of multiplexer 920 on line 950 whenever terminal 1 of input I1 receives a signal on line 935. A signal will output on terminal 02 of multiplexer 920 on line 955 whenever terminal 1 of input I2 receives a signal on line 935. A signal will output on terminal 03 of multiplexer 920 on line 960 whenever terminal 1 of input I3 receives a signal on line 945. A signal will output on terminal 04 of multiplexer 920 on line 965 whenever terminal 1 of input I4 receives a signal on line 945. Lines 950 and 955 proceed in parallel to terminals S0 and S1, respectively, of buffer latches 194A and B for providing the supra-mentioned parallel shift mode.

Resistive network 970 of the data bus control 190 having common terminations with a grounded resistor of 2.2k ohms and a resistor of 492 ohms having +5v of bias proceeds on line 975 from the common termination to provide the supra-mentioned reset at terminal (MR) of both buffer latches 194A and B. Line 220 from clock 45 provides a Phase I, 2mc clock pulse to terminal (CLK) of both buffer latches 194A and B. Output lines 195A and 195B from buffer latches 194A and B output terminals (0) proceed to the supra-described Tri-State buffers 196 having a common control line 980 from functional decode 100. A false signal on control line 980 will be had whenever CPUM 120 is outputing on data bus 180. Outputs from the Tri-State buffers 196 are mergably terminated to the respective lines on the data bus 180 precedent to said downstream buffer latches 197A and B. Buffer latches 197A and B are identical to buffer latches 194A and B in configuration insomuch as they also use Model 74194 shift register. Both buffer latches 197A and B receive clock inputs to terminal CLK from line 220. As indicated supra, buffer latches 197A and B receive shift-left and right signals at terminals S0 and S1 on lines 965 and 960 from multiplexer 920. Buffer latches 197A and B are reset on terminals (MR) on system reset line 985 from functional decode 100 and on line 975 from biasing resistive network 970 having commonly terminated 495 ohm resistor +5v biased and 2.2k ohm resistor grounded respectively. At input terminals "I" of buffer latch 197A, there is received D0 – D3 data lines on data bus 180, and at the input terminals "I" of buffer latch 197B, there is received D4 – D7 data lines also on data bus 180. On terminals "0" of both buffer latches 197A and B, there are latchably outputed data bus lines D0 – D7 on data bus 195A and B to the non-volatile memory 191 and fault watch timer 105, and also through output optical isolator module 200 on lines 193A to the Host machine 30.

Figure 13A:
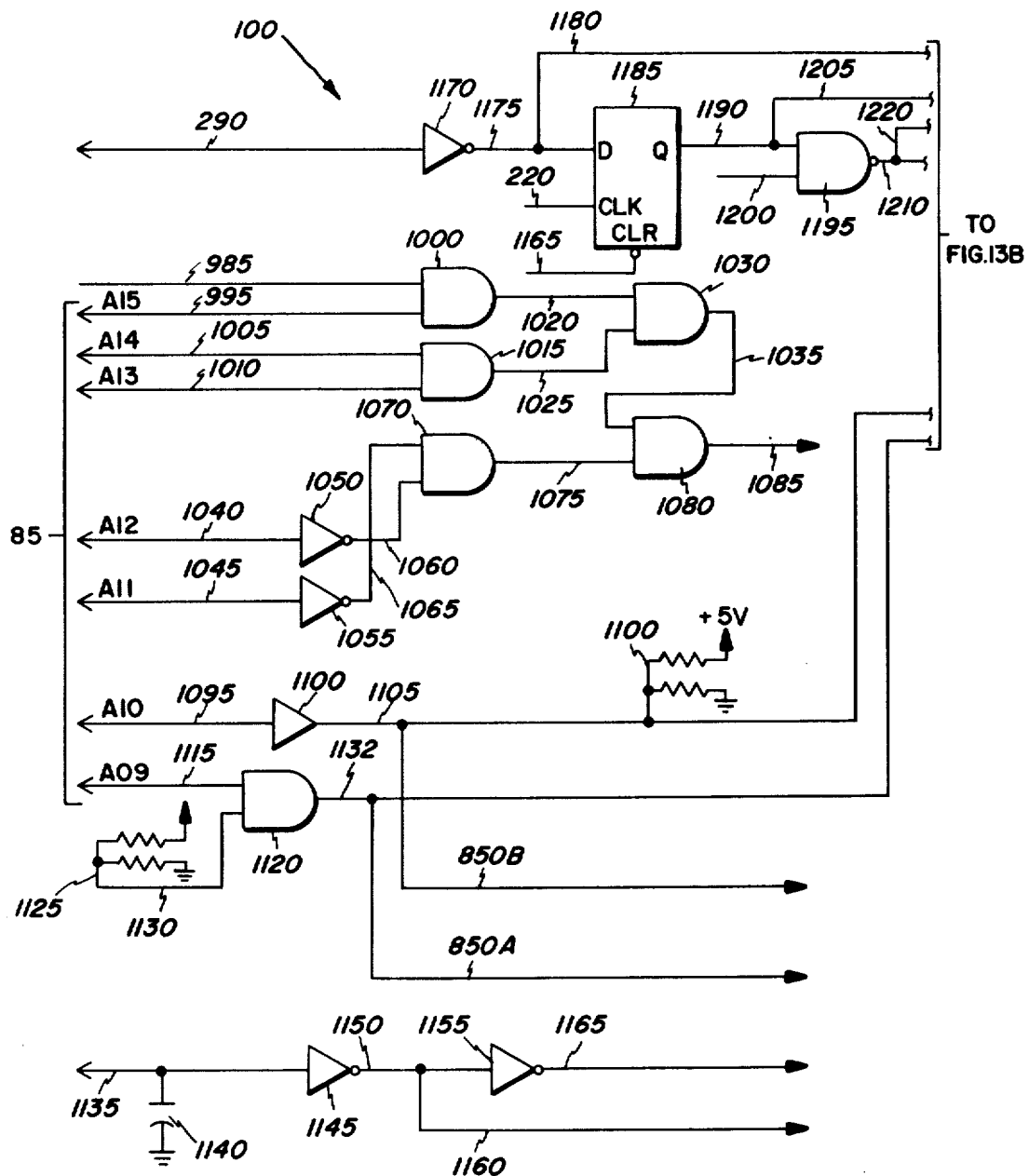

In the function decoder 100 for recognition and decode of addresses for functional activation as shown in FIG. 13, address line signals are received from the address bus control 150 as outputed from the inverted 815 on the address bus 85. Specifically, a subset of the address bus lines 85, mainly A9 – A15, are presented as lines 985, 995, 1005, 1010, 1040, 1045, 1095 and 1115 respectively to be decoded for use as control signals as described infra. Address line A15 on line 995 is presented to AND gate 1000. Line 985 inputs also to AND gate 1000 as a reset signal as will be seen infra. Address lines A14 and A13, 1005, 1010, respectively, from the address bus 85 input to AND gate 1015. Upon concurrent receipt of true signals on AND gates 1000 and 1015, each will output on lines 1020, 1025, respectively, to AND gate 1030, whereupon receipt of said same lines will output on line 1035. Address lines A12 and A11 on line 1040 and 1045 of the address bus 85 are both polarity-reversed on inverters 1050 and 1055 to be outputed on lines 1060 and 1065, respectively, for inputing to AND gate 1070.

AND gate 1070, upon concurrent receipt of inputs, is operative to output on line 1075 to AND gate 1080, which also receives an input on line 1035 mentioned supra. Upon concurrent receipt of signals on AND gate 1080, output is made on line 1085 which is used in the ready module 1090 described infra to synchronize the "ready" signal received by the CPU 40.

Address line 10 on line 1095 of address bus 85 is inputed to inverter 1100 which, in turn, outputs on line 1105 and is biased on output line 1105 by a resistive network 1110 having common terminations in the network for a +5v biased resistor of 492 ohms and a 2.2k ohm grounded resistor. Address line 9 on line 1115 of address bus 85 is inputed to AND gate 120 which also receives an input on line 1130 from resistive network 1125 having common terminating resistors of a +5v biased resistance of 492 ohms and 2.2k ohms of grounded resistance. Upon concurrent input receipt thereof on AND gate 1120, an output signal is sent on line 1132 which bifurcates off on line 850A to the Select A input terminal "A" of the multiplexers 186A-D enabling the first set of outputs thereon. Line 1105 bifurcates off onto line 850B to the B Select terminal "B" of multiplexers 186A-D for enabling the second set of outputs thereon. On line 1135, a reset signal from a control panel (not shown) may be sent to re-enable the system to the beginning of a controller program run or "0" address of a given sequence of instructions in the program memory 175 in the CPUM 120. Grounded capacitor 1140 is provided to eliminate transients that may occur through the receipt of spurious environmental noise on the lines. Signals on line 1035 thereafter proceed to an inverter 1145 which outputs on line 1150 to bifurcate first to an inverter 1155 on one leg and on the other leg to line 1160. Inverter 1155 outputs on line 1165 which, subsequent to a double logical negation, provides the same signal as line 1135. Line 1160 provides the simple logical negation of line 1135.

A synchronizing signal on line 290 from the CPU 40 is provided to inverter 1170 to be outputed on line 1175 where it is bifurcated on its secondary leg to line 1180 and on its primary leg to the input of a 4-bit bidirectional shift register 1185, Model 74194, used here as a D-type flip-flop. D-type flip-flop 1185 uses terminal D for data input and terminal CLK as the clock input receiving a signal from the 2mc Phase I, line 220, of clock 45. Terminal CLR of the D-type flip-flop 1185 is a clear input receiving a signal on line 1165 which is the master or system reset signal for the controller 20. Terminal Q outputs a signal on line 1190 which is a delayed version of the synchronization (SYNC) signal 290 from the CPU 40. This delayed SYNC signal is sent on line 1190 to NAND gate 1195 which also receives an input signal on line 1200 from the ready control apparatus 1090 described infra.

Line 1190 also bifurcates onto line 1205 which proceeds directly also to the ready control apparatus 1190. NAND gate 1195 upon concurrent receipt of true signals, outputs on line 1210 to the strobe 1G of terminal and the strobe 2G terminal inputs of the demultiplexer 1215. Demultiplexer 1215 is used here as a decoder for translation of addresses to control signals. Line 1210 also bifurcates onto line 1220 to be received by ready control apparatus 1090 for decode initiation control. Data 1C and data 2C terminals are the data inputs for the decoder 1215 as received on line 1225 from the ready control apparatus 1090 which indicate that CPU 40 is in a ready state for memory read.

In the function decode 100, if the Select A terminal of the decoder 1215 is selected by a signal on address line 1132 corresponding to address line 9 (A9), then output line set 1Y is activated thereon from terminals 1Y0, 1Y1, 1Y2, and 1Y3 corresponding to lines 1230, 1235, 1240, and 1245 respectively. Outputs 2Y are selected when the signal from 1105 corresponding to address line A0 is received at terminal B. The 2Y outputs may be had from terminals 2Y0, 2Y1, 2Y2, and 2Y3 on lines 1250, 1255, 1260, and 1265, respectively.

Line 1240 from terminal 1Y2 proceeds to the ready delay 1270 for purposes of generating a ready control signal for address outputing in the supra-mentioned DDIM 200. Terminal signals 2Y1 and 1Y1 on lines 1255 and 1235 proceed to NAND gate 1275 to output on line 1280 to ready delay 1270 upon concurrent receipt of the input signals for generating a read-ready enabling signal for nonvolatile memory 191. Terminal signals 2Y3 and 1Y3 on lines 1265 and 1245 will proceed to AND gate 1285 for outputing, upon concurrent receipt of said input signals, on line 1290 which, in turn, inputs on line 1290 to OR gate 1295. OR gate 1295 will output on line 1300 upon alternative receipt of input signals from line 1290 or line 835 from the address bus control 150.

On demultiplexer 1305 here used as a decoder in a manner identical to decoder 1215, line 1300 from OR gate 1295 will be enabled to input to terminals 516 and 526 corresponding to strobe 1 and stobe 2, respectively, of decoder 1305 thereby enabling parallel operation of the decoder. Line 1265 is operative to input to the data 1 and data 2 of terminals D1C and D2C respectively. Terminals D1C and D2C are commonly connected for immediate operation on either of both sets of outputs of said decoder 1305, as selected. Lines A0 and A1 of the address bus 86 from the address bus control 150 are used to select either terminal A and B of decoder 1305 for outputing on either the 1Y or 2Y sets of outputs respectively. Upon selection of terminal B for 2Y outputs, terminals 2Y1 and 2Y2 output on lines 1310 and 1315 respectively. Decoded signals on line 1310 are operative to start the direct memory access operative in the module 10. Signals on line 1315 set the status of a watch dog timer circuit 105 thereby re-enabling it.

Upon concurrent receipt of the supra-described SYNC signals 1325 and a grounded signal on line 1330, an AND gate 1335 will output on line 1340 to a four-bit bidirectional shift register 1345. Shift register 1345 is identical to shift register 1185 and is used here as a D-type flip-flop. A 2mc Phase 1 clock signal on line 220 is operative to be inputed to the clock input terminal CLK of shift register 1280. A clear signal on terminal (CLR) receives an input from the reset signal 1165 described supra. Output for the flip-flop 1345 is made from terminal "Q" which is operative to output on line 1350 to an AND gate 1355. Concurrent receipt of signals from supra line 1350 and from the memory read-write enabling signal on line 1360 from the ready control module 1090 will allow outputing on line 1365 as a data bus control derivative signal for ready control 1090.

Figure 14:
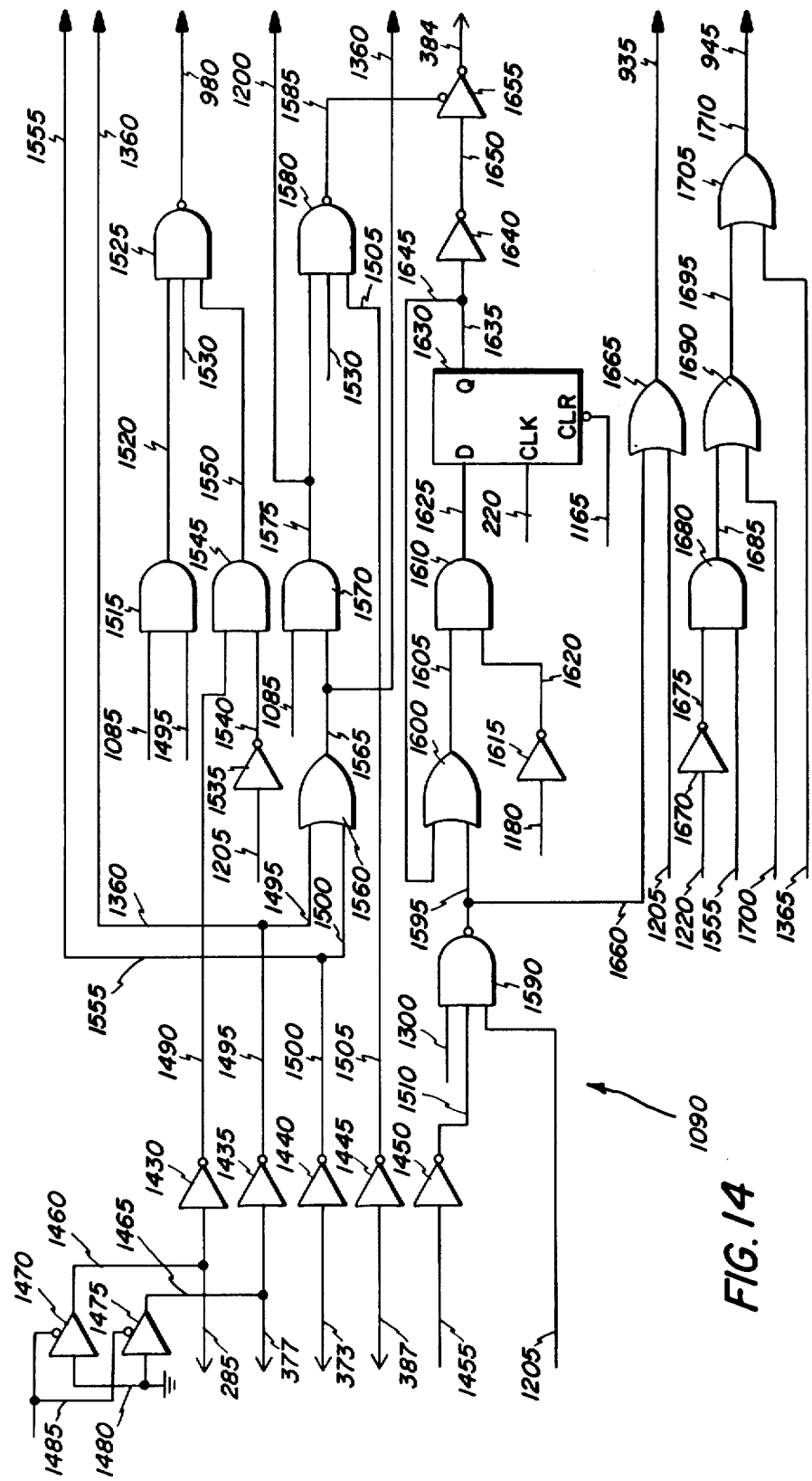
FIG. 14 is a logical diagram of the Ready Control submodule of FIG. 13.

In FIGS. 13 and 14, there is shown a ready control 1090 which is a subcircuit of the function decode 100 operative to generate timed control signals indicating a data ready state to the function decode 100 itself and also to the data bus control 190 and the CPU 40. Inverters 1430, 1435, 1440, 1445 and 1450 are operative to receive input signals "DBIN" on line 285 indicating CPU 40 is ready to accept data, "MEMREAD" on line 377 indicating a CPU 40 Read State, "MEMWRITE" on line 373, indicating a CPU 40 write state, "READYENB" on line 387 indicating a CPU 40 ready state has been enabled, and "DELRDY" signal on line 1455 indicating a timed ready delay state from the ready delay module 1270 respectively. Inverters 1430 and 1435 for DBIN and MEMREAD are also operative to receive DMA suppression inputs on lines 1460 and 1465 from Tri-State Drivers 1470 and 1475 respectively. Tri-State Drivers 1470 and 1475 each being operative to have grounded inputs on line 1480 and a control line 1485 from the direct memory access (DMA) module 10 for indicating that the DMA operation has been activated. Inverters 1430, 1435, 1440, 1445 and 1450 upon receiving their respective inputs are operative to output a polarity reversed signal on lines 1490, 1495, 1500 and 1505 and 1510 respectively.

An AND gate 1515 is operative to receive inputs from the input-output address recognition signal from the main function decode circuit 100 on line 1085, and a memory ready enable signal on the line 1495 from the ready control 1090. Upon concurrent receipt of inputs by AND gate 1515, an output on line 1520 will be had to travel to a NAND gate 1525. NAND gate 1525 is also operative to receive a power normal (PN) input on line 1530 through the DMA apparatus 10 from the infra PN generator 2105. An inverter 1535 is operative to receive the SYNC delay signal on line 1203 from the function decode 100 and reverse polarity it to become an output signal on 1540 to AND gate 1545. AND gate 1545 also is operative to receive the "DBIN" signal mentioned supra on line 1490 and upon concurrent receipt of input signals, will output on line 1550 to said NAND gate 1525. NAND gate 1525 upon concurrent receipt of all inputs, will output on line 980 a signal control to TS-Drivers 196 in the data bus control 150 operative to disallow data input from multiplexers 186A-D during DMA. Output lines 1495 and 1450 from inverters 1435 and 1440 also are operative to bifurcate off to lines 1555 and 1360 as memory write and read enabling signals, respectively, to the ready delay 1270.

Lines 1495 and 1500 are primarily operative to input to OR gate 1560 which, upon alternative receipt thereof, will output on line 1565 to AND gate 1570. Line 1565 is also operative to bifurcate off to line 1360 to serve as alternative read or write enabling signals to the function decode 100 per se. AND gate 1570 upon concurrent receipt of line 1565 and the input-output address recognition of line 1085 from the function decode 100, will output on line 1575. Line 1575 also being operative to bifurcate off to line 1200 for control of SYNC signal line 1190 in the function decode 100. A NAND gate 1580 is operative to receive inputs on line 1575, the power normal line 1530 from DMA 10 mentioned infra, and the ready enable line 1505 from inverter 1445. Upon concurrent receipts therefrom, NAND gate 1580 will output on line 1585 as a ready control signal to a TS-Driver 1655 described infra. NAND gate 1590 is operative to receive inputs on line 1300 from the function decode indicating the presence of a control address to be decoded, line 1510 from inverter 1450 indicating the presence of a delayed ready signal, and line 1205 from function decode 100 indicating a delayed SYNC signal. Upon concurrent receipt therefrom, NAND gate 1590 will output on line 1595 to OR gate 1600. Accordingly, OR gate 1600 will output on line 1605 to AND gate 1610. In addition, inverter 1615 is operative to receive a SYNC input on line 1180 from function decode 100 for output of a polarity inverse signal on line 1620 also to AND gate 1610.

Upon concurrent receipt therefrom, NAND gate 1610 outputs on line 1625 to a shift register 1630 used here as a D-type flip-flop, flip-flop 1630 being a bidirectional shift register Model 74194. Flip-flop 1630 is operative to have a clock input received at terminal CLK on line 220, which is a Phase 1, 2mc signal, and a clear reset signal at terminal CLR on line 1165 from the function decode 100. Upon receipt of an enabling signal on line 1625 at its input at terminal "D", the flip-flop 1630 will be delayably set as a latch at clock time 1630 to output at terminal "Q" a ready signal on line 1635 to inverter 1640. Line 1635 is also operative to bifurcate to line 1645 to input to supra OR gate 1600. Upon receipt of a signal from flip-flop 1630, inverter 1640 will output on line 1650 to supra-mentioned Tri-State Driver 1655. Tri-State Driver 1655 is operative to receive a control signal from line 1585 emulating from NAND gate 1580. Upon being so enabled, Tri-State Driver 1655 will output on line 384 as the ready signal to CPU 40. Line 1595 from NAND gate 1590 is positioned to be bifurcated off on line 1660 to OR gate 1665. When OR gate 1665 alternatively receives a signal from either line 1660 or a delayed SYNC signal on line 1205, it will output on line 935 to the data bus control 150 as an input signal to multiplexer 920.

Inverter 1670 is operative to receive a derivative of the delayed SYNC signal from the function decode 100 on line 1220 for polarity-reversed output on line 1675 to AND gate 1680. AND gate 1680, upon concurrent receipt of signals from supra line 1675 and supra memory write signal line 1555, will output a logical true signal on line 1685 to OR gate 1690. OR gate 1690 is operative, in turn, to output a signal on line 1695 upon alternative receipt of a signal either from supra line 1685 or a latch counter signal on line 1700 from the infradescribed toggle D-type flip-flop 2595 in DMA 10 at a 1mc rate. OR gate 1705 is operative to receive, alternatively, signals on supra line 1695 or a memory read/write signal that has been delayed SYNC on line 1365 from function decode 100 for outputing on line 1710 as input to multiplexer 920 in the data bus control 150.

Figure 15:
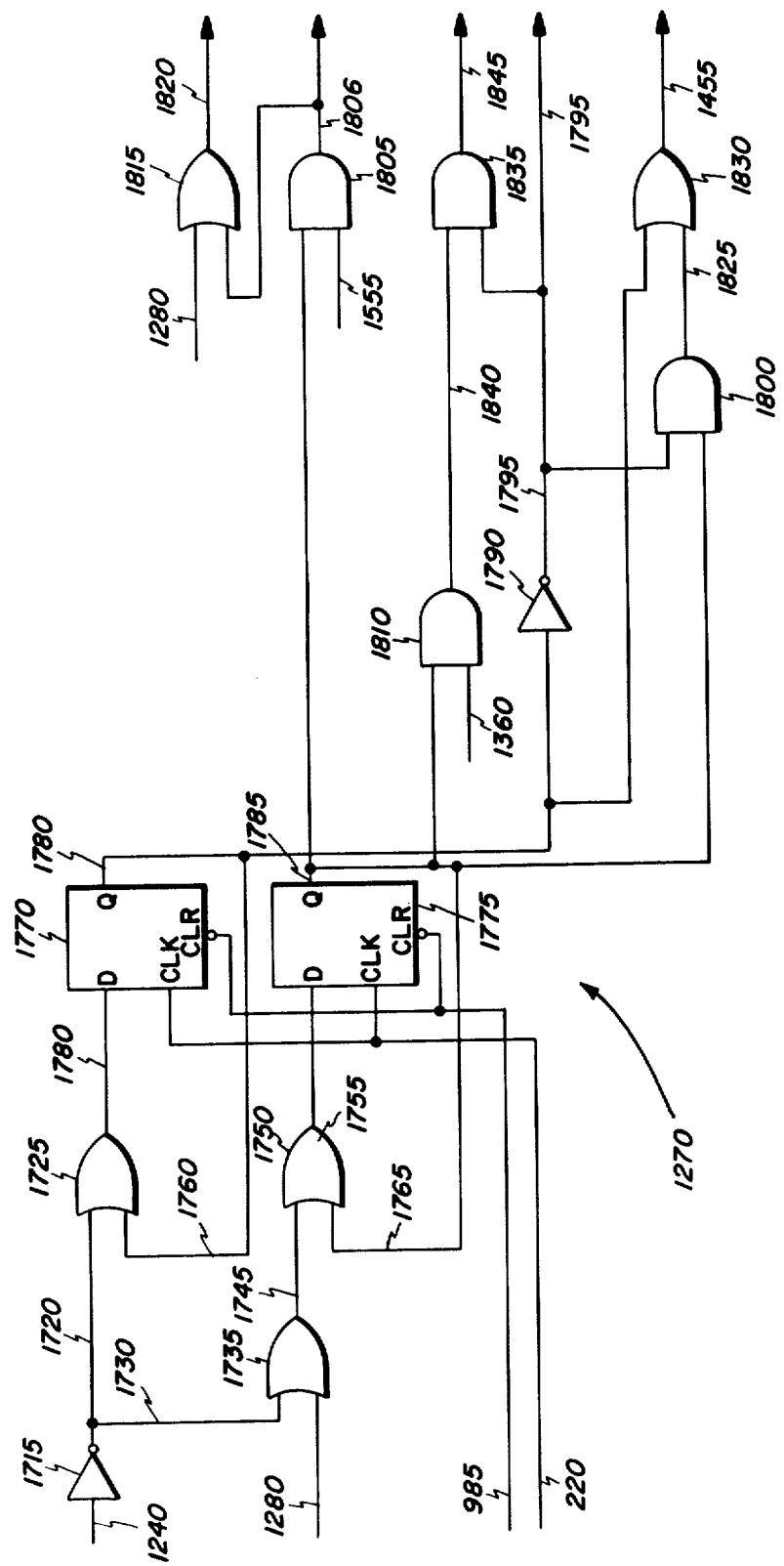
FIG. 15 is a logical diagram of the Ready Delay submodule of FIG. 13.

An additional subcircuit of the main function decode circuit 100 is the ready delay module 1270 as shown in FIGS. 13 and 15 for providing delayed versions of the ready for providing a delayed subset of several of the function decode 100 and ready control 1090 signals to the non-volatile memory 191 and OOIM 200. Inverter 1715 is adapted to receive a start matrix read signal from the function decode 100 on line 1240 for the matrix read module (not shown) for outputting in a reversed polarity manner on line 1720 to OR gate 1725 and also on line 1730 to OR gate 1735. OR gate 1735 also being adapted to receive a start non-volatile memory signal input from function decode 100 on line 1280. Upon alternative receipt at either of their inputs, OR gates 1725 and 1735 are adapted to output on line 1740 and 1745 respectively. OR gate 1750 is functionally operative to receive a signal from line 1745 and throughput it onto line 1755. OR gate 1725 and 1750 also receive inputs on lines 1760 and 1765 respectively. Lines 1740 and 1755 are each received through their respective input terminal "D" on a pair of identical 4-bit directional shift registers 1770 and 1775, each being Model 740194 here used as a D-type flip-flop. Each of the flip-flops 1770 and 1775 are clocked at terminal CLK by a 2mc, Phase 1 signal on line 220, and reset cleared at terminal CLR by a master system reset signal from the main function decode circuit 100 on line 985. The flip-flops 1770 and 1775 act to latchably set data as outputed from terminal "Q" on lines 1780 and 1785 respectively. Line 1780 and 1785 are adapted to bifurcate to line 1760 and 1765 to OR gate 1725 and 1750 respectively.

Line 1780 is also adapted to proceed to inverter 1790 which, upon receipt, will output a polarity-reversed signal on line 1795 to OOIM 200 and also input to AND gate 1800. Line 1785 is adapted to also proceed to AND gate 1805, AND gate 1810, and AND gate 1800 all mentioned supra. AND gate 1805 is also operative to output on line 1800, upon concurrent receipt of signals from line 1785 and memory write signal line 1555 from the ready control submodule 1090. Line 1806 is adapted to proceed to the OR gate 815 which, in turn, outputs on line 1820 as a reset enable signal to the non-volatile memory 191. OR gate 1815 is further adapted to receive a start non-volatile memory signal input on line 1280 from function decode 100. AND gate 1800 upon concurrent receipt of signals from supra line 1785 and line 1795 will output on line 1825 to OR gate 1830. OR gate 1830 will then output on line 1455 as a delay ready signal to supra ready control sub-module 1090. OR gate 1830 is also further adapted to alternatively receive an input from line 1780 from the latched output of the supra D-type flip-flop 1770. NAND gate 1835 is operative to receive inputs on line 1840 from AND gate 1810, and line 1795 from inverter 1790. AND gate 1835 upon concurrent receipt of inputs, will proceed to output on line 1845 to the non-volatile memory 191.

In the Direct Memory Access (DMA) Apparatus 10 of FIG. 16, a start-refresh signal is supplied on line 1310 from the function decode 100 and is operative to input to inverter 2505. Inverter 2505 in turn outputs a polarity-reversed signal on line 2510 to OR gate 2515. Signals from 2510 are operative to pass through OR gate 2515 to be outputed on line 2520 to a shift register 2525 acting as a D-type flip-flop. Shift register 2525 is a 4-bit, bidirectional shift register, Model 74194. A Hold-Acknowledge signal from the CPUM 120 is sent via line 475 to an inverter 2530. Inverter 2530, in turn, outputs a polarity-reversed signal on line 2535 to an AND gate 2540. AND gate 2540, upon concurrent receipt of signal on line 2535 and also line 2545, as will be described infra, will output on line 2550 to a shift register 2555. Said shift register 2550 is identical to shift register 2525 and is also operative to act as a D-type flip-flop. OR gate 2560 is operative to receive a hold initiation signal on line 106 from the watchdog timer 105 for passage therethrough to output line 2565. Inverter 2570, upon receipt of signals from line 2565, will output on line 2575 to AND gate 2580. AND gate 2580 is operative, upon concurrent receipt of signals from line 2575 and from line 1310 from function decode 100, to output on line 2585 to a flip-flop 2590 where said flip-flop is a dual-D type flip-flop, Model 74H74. A shift register 2595, identical to supra shift register 2525 is used here as a D-type flip-flop to be operative clocked by a 2mc, Phase 1 signal on line 220 at terminal CLK. The clear signal at terminal CLR for this D-type flip-flop is received on line 2605 from a resistive network 2600. Said resistive network 2600 has a pair of commonly terminated resistors as to line 2605 with the first resistor of 492 ohms being positively biased by +5v and the second resistor of 2.5k ohms being grounded. D-type flip-flop 2595 is operative to output from terminal Q on lone 2610 to an inverter 2615. The inverter is operative to give a polarity-reversed signal on line 2620 which feeds back to the input terminal D of flip-flop 2595. Inverter 2615, as outputed on line 2620, also bifurcates to line 2625 as an input to an OR gate 2630. OR gate 2630, in turn, outputs on line 2635 to an AND gate 2640. The AND gate 2640 is operative, upon concurrent receipt of signals from lines 2635 and 2645, to output on line 2650 to a shift register 2655 acting as a D-type flip-flop---flip-flop 2525 being identical to supra-described shift register 2525. Output signals of the flip-flop 2655 are directed on line 2660 to diverge off as line 104 to the watch dog timer 105 and the OOIM 200 as an indication of a normal DMA operation occurrence.

Line 2660 also bifurcates on line 2665 to be one of the alternative inputs to the OR gate 2630, mentioned supra. Flip-flops 2525, 2555, and 2655 are all operative to have their clear signals at terminal CLR generated on master system reset line 1165 from the function decode 100 described supra. Flip-flops 2590, 2555, and 2655 also are adapted to be clocked at terminal CLK by the supra 2mc, Phase 2 signal on line 230. Flip-flop 2525 is further operative to be clocked by the supra Phase 1 signal of 2mc on line 220. Additionally, flip-flop 2525 is operative to output from terminal Q on line 2545 to input of AND gate 2540, as mentioned supra. Line 2545 also is operative to bifurcate on line 2550 to an AND gate 2670. AND gate 2670 is also operative to receive an end of refresh signal on line 2675 as will be described infra. Upon concurrent receipt of said input signals, AND gate 2670 will output on line 2680 to OR gate 2515, as mentioned supra. Line 2545 further bifurcates on line 2685 to supra-mentioned OR gate 2560.

D-type flip-flop 2595, as described supra, outputs on line 2610, but is also operative to trifurcate on line 2690 to an AND gate 2695, and on line 2612 to the 00IM 200. Gate 2695 also receives a signal from the D-type flip-flop 2555 on line 2645 as alluded to above. Upon concurrent receipt from signals on lines 2690 and 2645, AND gate 2595 will output on line 1700 to the ready control sub-module 1090 for purposes of assuming control of the data bus control 150 during the direct memory access operation. A NAND gate 2700 is operative to receive inputs from line 2645 as received from D-type flip-flop 2555, and also from line 2610 as outputed by the PN generator subcircuit 2105 in non-volatile memory 191. Upon concurrent receipt of signals from 2116 and 2645, NAND gate 2700 is operative to output on line 1485 to the ready control 1090 as psuedo "DBIN" and memory read signals as described above. Line 1485 is also operative to bifurcate to line 820 which is inputed to the address bus control sub-circuit 150. PN signal on line 2160, as outputed by PN generator 2105 and as received by the DMA apparatus 10, is also outputed as line 1530 to the ready control sub-module 1090 for purposes of assuming control of the address bus control 150 during the DMA operation.

Provided in the DMA apparatus 10 for generating addresses for the DMA refresh operation are a pair of identical binary counters 2705 and 2710 that are serially connected. Each of the supra-mentioned binary counters is a 4-bit, high-speed synchronous binary counter, Model 74161. In addition, each of the counters 2705 and 2710 has its master reset signal received at terminal MR on line 2715 from a resistive network 2720. Said resistive network 2715 comprises a pair of commonly terminated resistors with said first resistor of 492 ohms being positively biased by a +5v and the second resistor of 2.2k ohms being grounded. Both counters 2705 and 2710 receive a clock input at terminal CLK from line 220 comprising a 2mc, Phase 1 clock signal. Parallel enable terminal PE inputs for both counters 2705 and 2710 are received from line 2660 as outputed by D-type flip-flop 2655 mentioned supra. Both count enable trickle (CET) input terminals for the counters 2705 and 2710 are received on lines 2725 and 2730 on resistive networks 2735 and 2740 respectively. Each resistive network 2725 and 2730 has a pair of commonly terminated resistors, the first resistor being a 492 ohm resistor with +5v bias and a second resistor of 2.2k ohms being grounded.

Identical shift registers acting as D-type flip-flops 2525, 2555, 2655, 2595 all have identical resistive networks 2527, 2557, 2657, and 2600 biasing on lines 2526, 2556, 2656, 2605 both shift-left and right terminals S0 and S1, respectively, for parallel shift operation. Each of the resistive networks 2525, 2555, 2655, and 2595 have a commonly terminated first resistor of 492 ohms biased by a +5v and a second resistor of 2.2k ohms grounded.

Terminal presets (A–D) and preset (C) of counters 2705 and 2710, respectively, are all grounded for low input or "zero" initialization. Terminal presets (A) and (D) of counter 2710 are adapted to receive a biasing signal on line 2730 from supra-described relative network 2740 for high input or "one" initialization. Additionally, preset terminal B may receive a signal on line 2745 which will normally be biased by a commonly terminated resistive network 2750 having a first resistor of 492 ohms biased by a +5v and a second resistor of 2.2k ohms grounded for 40-byte direct memory access read operation as will be explained infra. It will be noted that alternatively if line 2745 was to be grounded, then a 56-byte direct memory access (DMA) read operation would be accordingly selected. It will also be noted that the switching ground for 56-byte operation on line 2745 is not shown, but may be hardwired within the Host machine 30 itself.

The Count Enable Parallel (CEP) input for counter 2705 is configured to receive a signal on 2725 from supra network 2735, thereby being continuously biased on. A terminal count TC output on counter 2705 as outputed on line 2755 will, when activated, input to the count-enable parallel input terminal for counter 2710, thereby allowing counter 2705 to enable counter 2710 upon completing a desired predetermined count. In lieu of a clock pulse Phase 1 of 2mc on line 220, an output from terminal QA of counter 2705 may be used to clock counter 2710 for the first count of a DMA operation, thereby allowing simultaneous synchronizaton of said counters 2705 and 2710. Output terminals QB, QC and QD of counter 2705 and output terminals QA, QB and QC of counter 2710 correspond to refresh addresses A0 - A5 collectively known hereafter as lines 145 for output to the address bus control 150. The QD output of counter 2710 is used as an end of DMA refresh signal on line 2675 as inputed to the AND gate 2670 mentioned supra.

Figure 17A:
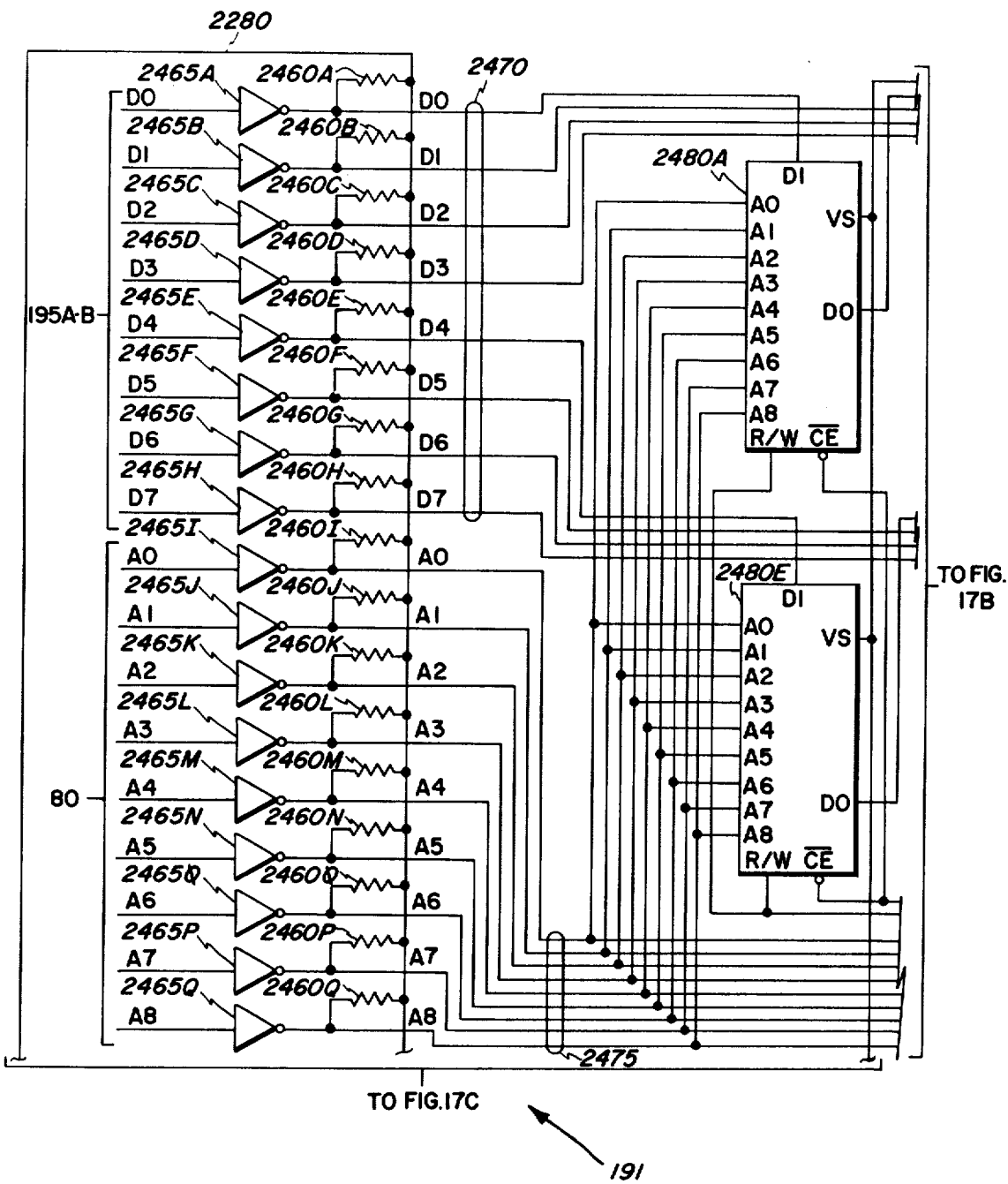
Figure 17B:
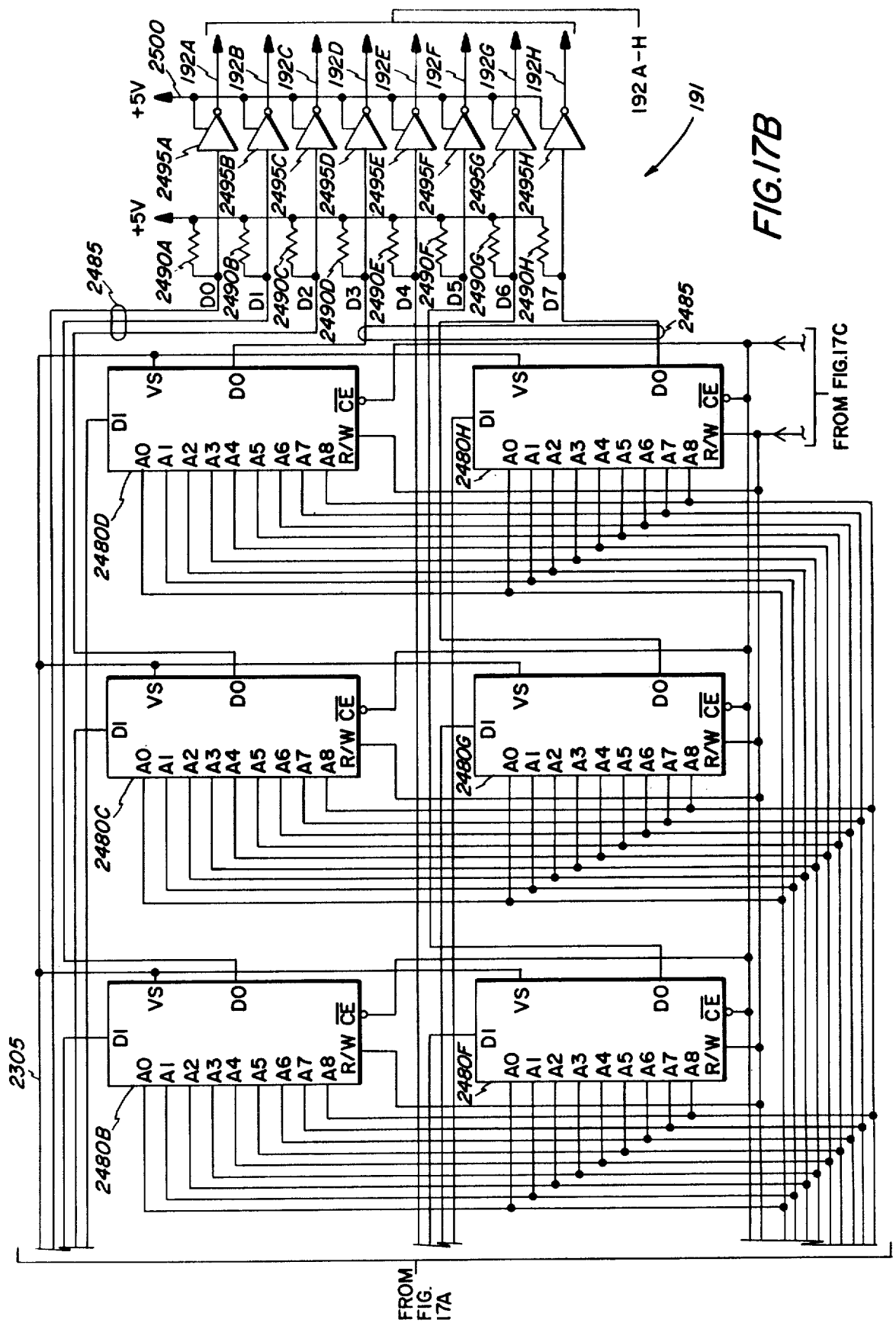
Figure 18:
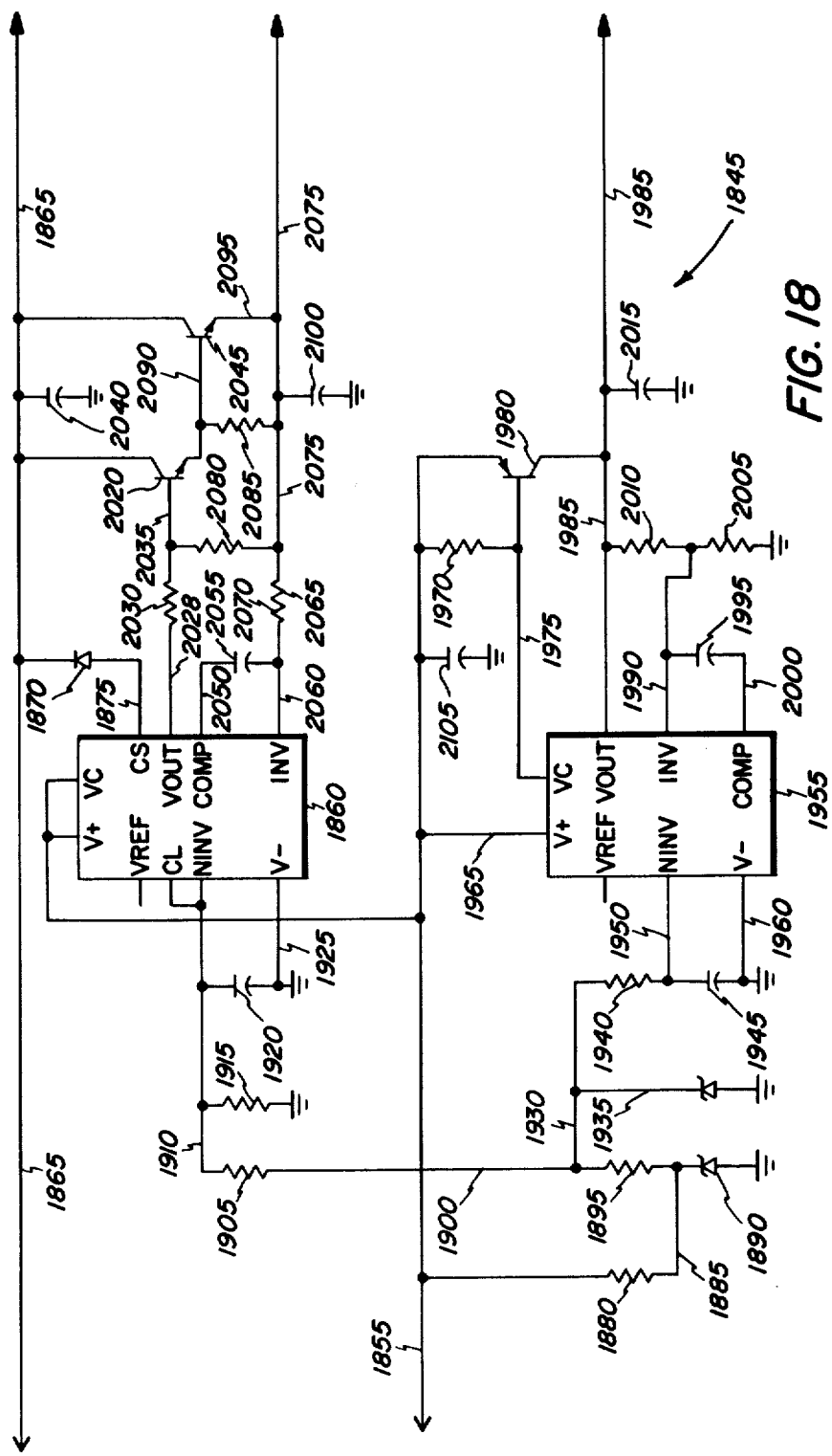
FIG. 18 is a schematic diagram of the Voltage Regulator of FIG. 17.

Providing voltage regulation for the non-volatile memory 191 is a sub-circuit thereof 1845 as shown in FIGS. 17 and 18 which receives d.c. voltage from a bulk power supply source (not shown) in the Host machine 30. Particularly, a 17-volt d.c. supply from the bulk power supply source (not shown) on line 1855 is provided to a voltage regulator module 1860, Model 723C, which is an adjustable positive precision voltage regulator. Accordingly, line 1855 provides bias to the positive voltage terminal v+ and the collector voltage terminal VC of the voltage regulator module 1860. A 9-volt d.c. power line on 1865 is provided from the bulk power supply source (also not shown) through a diode gate 1870 and onto a line 1875 to the current sense terminal "CS" of the voltage regulator 1860. Line 1855 also bifurcates to a dropping resistor 1880 of 562 ohms and from there on line 1885 to a grounded clamping diode 1890, Model 1N5530C.

Line 1885 also bifurcates to a dropping resistor 1895 of 953 ohms to continue on line 1900 to a dropping resistor 1905 of 887 ohms. Resistor 1905 outputs on line 1910 to be commonly terminated with a grounded dropping resistor 1915 of 2.94k ohms and also to a grounded bypass capacitor 1920 having 0.0015 microfarads. Line 1910 inputs to current limit terminal "CL" and non-inverting terminal input "NINV" of voltage regulator 1860. Interposed between capacitor 1920 and its ground is a commonly terminated line 1925 inputing to the negative bias input terminal V- of the voltage regulator 1860. Interposed between the resistors 1895 and resistor 1905 is a line 1930 having common terminations with a grounded clamping diode 1935, Model 1N4577 and a dropping resistor 1940 having 680 ohms. Disposed at the opposite end of the resistor 1940 is a grounded coupling capacitor 1945 having 0.0015 microfarads. Interposively terminated between the resistor 1940 and the capacitor 1945 is a line 1950 inputing to the non-inverting input terminal NINV of the voltage regulator 1955. Terminally interposed between the capacitor 1945 and its ground is a line 1960 inputing to the negative bias, terminal "K" input of the voltage regulator 1955. Line 1855 is also disposed to input to a positive bias terminal V+ of the voltage regulator 1955 on line 1965. Line 1855 is further disposed to connect with a dropping resistor 1970 of 100 ohms, which in turn connects on line 1975 to the terminal collector bias input VC of the voltage regulator 1955. Line 1855 is additionally disposed to connect with a switching PNP transistor 1980, Model 2N3467, at its emitter input. Transistor 1980 further being disposed to receive at its base input the line 1975 which is common to VC of the voltage regulator 1955 and the dropping resistor 1970. Received at transistor 1980's collector input on a line 1985 are regulator power signals from the voltage output terminal VOUT of the voltage regulator 1955.

Inverting input, terminal INV, of the voltage regulator 1955 is operative to be connected to frequency compensation terminal COMP via line 1990 through coupling capacitor 1995 having .01μf and then on to line 2000. Line 1990 is also disposed to commonly terminate with resistor 2005 with grounded dropping resistor 2005 having 1740 ohms and also to dropping resistor 2010 having 1130 ohms. Resistor 2010 being disposed to terminate at its opposite end with line 1985 mentioned supra. Line 1985 is further commonly terminated by grounded bypass capacitor 2015 having 2.2uf. Line 1985 serves as a 10 v.d.c. source for an infra VBATT circuit 227. Line 1865 is disposed to input to the collector of a switching NPN transistor 2020, Model 2N3725, for biasing purposes. A line 2025 proceeds from voltage-out terminal VOUT of the voltage regulator 1860 to a dropping resistor 2030 of 100 ohms on line 2028 and from there on line 2035 to the base of the transistor 2020. Line 1865 further being disposed to terminate with a grounded bypass capacitor 2040 having 2.7uf, and also to a switching NPN transistor 2045 at its collector, Model 2N3772. Line 1864 subsequent to the grounded capacitor 2040 proceeds as a 9 v.d.c. source to the infra power normal (PN) generator 2105. Voltage regulator 1860 is also operative to output at frequency compensation terminal COMP on line 2050 to coupling capacitor 2055 having 0.47uf and from there on line 2060 to the inverting input terminal INV of voltage regulator 1860. Interposed between the terminal INV and the capacitor 2055 is a line 2065 to a dropping resistor 2070 having 680 ohms, which in turn outputs on line 2075 as a +5v d.c. to an infra BPN generator 2165. A dropping resistor 2080 having 1k ohms is disposed to interposably terminate between lines 2035 and 2075. A dropping resistor 2085 having 75 ohms is disposed to interposably connect the emitter of the transistor 2020 to line 2075 also. The emitter of the transistor 2020 is disposed to be connected to the base of the transistor 2045 on line 2090. The emitter of the transistor 2045 is also further disposed to be connected on line 2095 to line 2075. A grounded bypass capacitor 2100 having 3.3uf grounded is disposed to be connected at its opposite end also to line 2075. On line 1855, a grounded bypass capacitor 2105 of 2.7uf for noise supression is provided to commonly terminate to said line.

An additional sub-circuit of non-volatile memory 191 is the power normal (PN) generator 2105 of FIGS. 17 and 19, which is adapted to receive a 9-volt d.c. power supply signal from the voltage regulator 1845 on line 1865 described supra. Said line 1865 bifurcates to a pair of dropping resistors 2110 and 2115 of 10k ohms and 3.3k ohms respectively. The PN generator sub-circuit 2105 also is operative to receive a delayed latchable negated power normal signal from the non-volatile memory's main circuit 191 described infra on line 2120 as received by a diode gate 2125. Diode gate 2125 outputs on line 2130 to the base of a switching NPN transistor 2135, Model 2N2369A. Interposed between the diode gate 2125 and the base of the switching transistor 2135 on line 2130 is the connecting dropping resistor 2110. Switching transistor 2135 is connected through its collector to the dropping resistor 2125 and through its emitter to a diode gate 2140. Diode gate 2140 outputs on line 2145 to grounded dropping bias resistor 2150 having 1k ohms and also to the base of NPN switching transistor 2155, Model 2N2369. Switching transistor 2155 is adapted to have its emitter grounded and its collector outputting a power normal (PN) signal on line 2160 to the non-volatile memory's main circuit 191.

A further sub-circuit of non-volatile memory 191 is the Battery Power Normal (BPN) receiver sub-circuit 2165 of FIGS. 17 and 20. The BPN receiver sub-circuit 2165 is adapted to receive, on a pair of input lines 2170 and 2175, an input power normal signal from the bulk power supply (not shown) in the Host machine 30 indicating that the power condition is within limits relative to a predetermined norm at any given time. Said lines 2170 and 2175 are operative to input to a pair of dropping resistors 2180 and 2185 of 75 ohms each, respectively. These dropping resistors 2180 and 2185 in turn output on lines 2190 and 2195 to the anode and cathode inputs of terminals I1 and I2, respectively, of an optical coupler 2200, Model HP 5082–4361. Said coupler 2200 is a high CMR, high-speed optically coupled gate; the function of coupler 2200 being to eliminate noise transients from the Host machine 30. Lines 2190 and 2195 are cross-connected by a buffer capacitor 2205 of 0.01uf. Also in parallel to said buffer capacitor 2205 is a clamping diode 2210. Bias of +5 v.d.c. for the optical coupler 2200 is provided by line 2075 from the voltage regulator 1845 described supra on supply voltage terminal VC. A ground reference for the optical coupler 2200 is provided at terminal GND on line 2215. A grounded bypass capacitor 2220 having 0.01uf is provided for eliminating transients on line 2075. Optical coupler 2200 outputs on terminal VD on lline 2225 where line 2225 is operative to input to the emitter of a switching transistor 2235 which is a NPN, Model 2N2219A. Line 2230 from the enable input voltage terminal VE of the coupler 2200 is operative to receive bias from a pair of commonly terminated resistors forming a resistive network 2240, the first resistor having 492 ohms biased at its opposite end by +5v and a second resistor of 2.2k ohms grounded at its opposite end. Line 2075 also is adapted to input to dropping resistor 2245 of 3k ohms which, in turn, outputs on line 2250 where line 2250 is used to bias the base of the switching transistor 2235. A negated power normal (PN) control line 2255, as outputed to the non-volatile memory circuit 191 described infra, is received from a pair of commonly terminated lines where the first termination is from a biasing dropping resistor 2260 of 2k ohms and the second termination is the collector of the switching transistor 2235.

Included in the non-volatile memory 191 as a further sub-circuit is the Voltage Battery (VBATT) subcircuit 2270 of FIGS. 17 and 21 operative to function as a stand-alone power supply driven by a conventional rechargable 10 v.d.c. battery (not shown) in a failed power normal line voltage environment. Normal d.c. voltage of 10 volts is supplied from the voltage regulator 1845 on line 1985 through diode gate 2275 to output on line 2280 to the non-volatile memory main circuit 191. Line 2280 is also operative to have terminated thereto a tuned circuit for smoothing out ripple comprising a grounded resistor 2285 having 10k ohms and a grounded capacitor 2290 of 0.01uf. Line 1985 is operative also to bifurcate to line 2295 to diode gate 2300, which, in turn, outputs through line 2304 on line 2305 to the non-volatile main circuit 191 also. Beyond the terminus of line 2325 with line 2304 is a grounded bypass capacitor 2330 of 0.1uf. The battery, mentioned supra (not shown), has its connecting negative terminal V− connected to line 2235 to ground and its connective positive terminal V+ received on line 2240 to interpose between diode gates 2315 and 2320 at a common terminus. As will be detailed infra, the rechargable battery (not shown) is operative to serve in lieu of the bias source on line 1985 in a power-down situation. As such, an alternate limited power supply is available to the non-violatile memory 191 for a predetermined finite period for processing the current access instruction and also saving the contents of NVM 191.

In the non-volatile memory 191 of FIG. 17 characterized here as the main circuit, the negated power normal signal on line 2265 from the BPN receiver 2165 is received by a NAND gate 2345 which is a quad CMOS NAND gate, Model 4011A. NAND gate 2345 being cross-connected with NAND gate 2350 to provide a latch when needed as part of the protection circuit for the non-volatile memory 191 where NAND gate 2350 is identical to 2345, latch gates 2345 and 2350 being provided for processing the current access in a line power going-down situation.

Negated power normal signals on line 2265 are received at the input terminal of NAND gate 2345. A reset enable signal from ready delay sub-circuit 1290 is received on line 1820 to inverter 2355 which, in turn, outputs to inverter 2360 where said inverter 2355 and 2360 collectively buffer the signals from line 1820. Inverter 2360 is operative to output on line 2365 to one of the input terminals of the NAND gate 2350. A 10 v.d.c. power signal is received on line 2305 from the VBATT sub-circuit 2270 for inputing as a control bias for NAND gates 2345, 2350, and 2370. It will be noted that NAND gate 2370 is identical to NAND gate 2345. A continuous signal for enabling non-volatile memory from a switch (not shown) is received whenever non-volatile memory 191 is desired to be in service on line 2375. Signals on line 2375 are inputed to NAND gate 2380 which is identical to NAND gate 2345. NAND gate 2380 is also operative to receive a power supply signal of 10 v.d.c. from line 2305 mentioned supra. A chip-enable (CE) signal from the ready delay sub-circuit 1270 is received on line 1840 for inputing to Hex buffer 2395, Model 7417, which will in turn output on line 2400 to the NAND gate 2380. NAND gate 2380 is operative to output, upon concurrent receipt of the inputs, to inverter 2385 which will in turn output on line 2390 to one of the input terminals of NAND gate 2370.

Cross-connected NAND gates 2345 and 2350, which may act as a latch during abnormal power, are operative to output on line 2405 as an input to NAND gate 2370. Said NANd gate 2345 and 2350 also are operative to bifurcatably output to line 2410 to Tri-State Driver 2415 which, in turn, outputs as a negated delayed latchable version of the supra power normal signal on line 2120 to the PN generator subcircuit 2105. NANd gate 2370 is operative upon concurrent input receipt to output on line 2420 to a Tri-State Driver 2425 which, in turn, outputs to a second Tri-State Driver 2430. Driver 2430 is operative to output on line 2435 as the chip-enable (CE) signal for the non-volatile memory as will be seen infra. A read-enabling signal from the ready delay sub-circuit 1270 on line 1806 is inputed to a buffer 2440, which in turn outputs on line 2445 to a Tri-State Driver 2450. Tri-State Driver 2450 is operative to output on line 2455 as a read-write (R/W) enable signal for the non-volatile memory 191 as will be seen infra. NAND gate 2380, Tri-State Driver 2385, Tri-State Driver 2450, Tri-State Driver 2425, Tri-State Driver 2415, and power input terminal VS of infra RAMs 2480A-H are also operative to receive bias signals on their control lines from line 2305 having a 10 v.d.c. signal in a manner similar, as mentioned for NAND gates 2370, 2345, and 2350 supra. Battery bias on line 2305 is for purposes of receiving sufficient power to save current data in the nonvolatile memory in a power-down condition as will be detailed infra. A separate biasing signal of 10 v.d.c. from the VBATT sub-circuit 2770 is supplid on line 2280 to each of the data bus lines 195A-B to each of the address bus lines 86, and to the supra-mentioned signal lines 1806 and 1845 through a drop resistor 2460A-T or 2k ohms.

Furthermore, during a power outage, bias line 2280 will go down while bias line 2305 will remain up for powering infra RAMs in non-volatile memory 191 as will be detailed infra. Precedent to receiving biasing signals through biasing resistors 2400-Q each of the data bus lines 195A-B and address bus lines 86 input to an inverter 2465-Q which, in turn, output a polarity revised signal on each of the respective output lines where said output lines are 1470 for the data lines 195-B and lines 2475 for the address lines 86. It will be noted that lines 2445, 2400, 2375, and 2365 likewise are biased through 2k ohm resistors 2460R-V. The D0 line of the data bus 2470 proceeds to input terminal D1 of random access memory (RAM) 2480A which is a Model S2222 static RAM. D1 of data bus 2470 proceeds to the input terminal D1 or RAM 2480B, D2 of data bus 2470 proceeds to the input terminal D1 of RAM 2480C, D3 of data bus 2470 proceeds to the input terminal D1 of RAM 2480D, D4 of data bus 2470 proceeds to the input terminal D1 of RAM 2480E, D5 of data bus 2470 proceeds to the input terminal D1 of RAM 2480F, D6 of data bus 2470 proceeds to the input terminal D1 of RAM 2480G, and D7 of data bus 2470 proceeds to the input terminal D1 of RAM 2480H. Address A0 - A8 of address bus 2475 proceed in parallel to each of the RAMs 2480A-H as address line inputs to terminals A0 - A8. Line 2455 from inverter Tri-State Driver 2450, mentioned supra, proceeds to each of the read-write (R/W) input terminals of each of the RAMs 2480-H. Line 2435 from Tri-State Driver 2430, mentioned supra, proceeds to each of the chip-enable (CE) input terminals of each of the RAMs 2480A-H. Data bus outputs on lines 2485 from each of the output terminals D0 of RAMs 2480A-H to data lines D0 - D7 respectively. Biasing each of the data bus lines 2485 is a +5v biased 10k ohms resistor for each of said lines where said resistive network is 2490A-H respectively. Tri-State Drivers serving as buffers 2495A-H receive their continuous bias signal on control line 2500 from a +5v supply (not shown) enabling them to output on data bus lines 192A-H corresponding to data lines D0 - D7 respectively.

Figure 24:
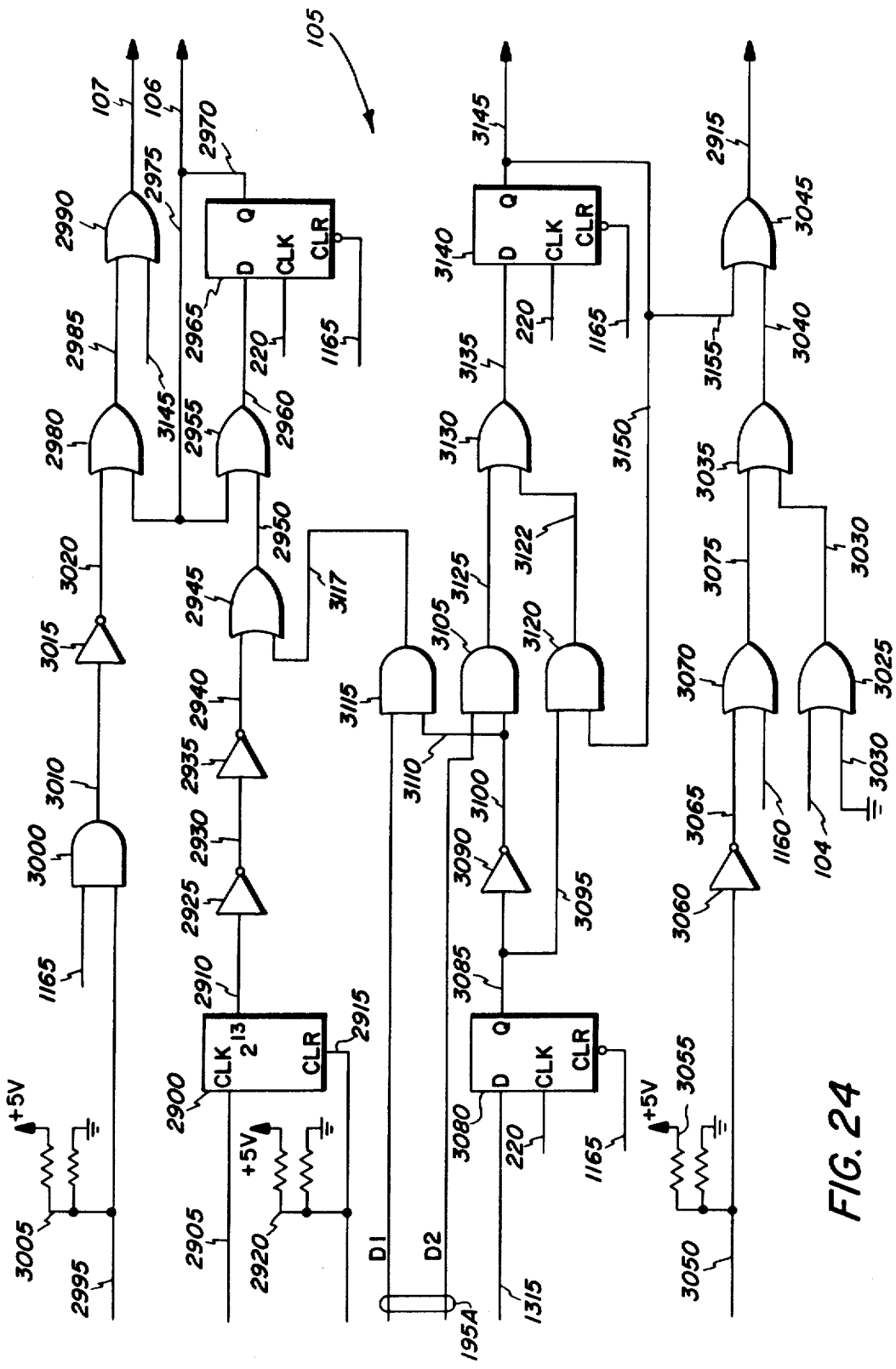
FIG. 24 is a schematic diagram of the Fault Watch Timer of FIG. 3.

The fault watch timer or watch dog timer (WDT) module 105 in the IOPM 90 of FIG. 24 is a diagnostic device for periodically monitoring the operation of the direct memory access apparatus 10 for indications of controller 20 failure or programming error as evidenced in the CPU's 40 functional reading of programming memory 175. The timer for module 105 comprises a binary counter 2900 operative to receive a clock signal of 154kc on 2905 from a source (not shown) at terminal "CLK". The binary counter is a Model 4020A having an output period of 25ms on line 2910 at its "$2^{12}$" output terminal. Counter 2900 is reset at its "CL" terminal by a signal on line 2915 as will be explained infra. Line 2915 is biased by a resistive network 2920 comprising a pair of commonly terminated resistors. In the network 2920, a first resistor of 2.2k ohms is biased by +5v and a second resistor of 490 ohms is grounded. If said binary counter 2900, after being clocked on line 2905, does not receive a reset from line 2915 after 25ms, then it is operative to output a signal on line 2910 to inverter 2925. Inverter 2925 will, in turn, output on line 2930 to inverter 2935 having an output on line 2940. A polarity reversed signal outputed from inverter 2935 on line 2940 is operative to be received by OR gate 2945 for subsequent outputing on line 2950.

Signals on line 2950 are received by OR gate 2955 for throughputting to line 2960. A four-bit bidirectional shift register, Model 74194, used here as a D-type flip-flop 2965 is operative to receive at its D terminal input signals on line 2960 for setting the flip-flop 2965. The flip-flop 2965 acts as a fault flip-flop or latch device whenever the timer or counter 2900 indicates a system fault condition. D-type flip-flop 2965 is adapted to receive at its "CLK" terminal, Phase 1 clock pulses at a 2mc rate on line 220 described supra. Flip-flop 2965 is further operative to be reset at its terminal "CLR" by the system reset signal on line 1165 also described supra. Once set, flip-flop 2965 will output at its terminal Q on line 2970. Line 2975 bifurcates first on line 106 to direct memory access apparatus 10 for activation thereof upon occurrence of a fault as described supra and secondly on line 2975 to an OR gate 2980. Upon receiving an input, OR gate 2980 is operative to send signals on line 2985 through OR gate 2990 to output on line 107 to OOIM 200 described supra for purposes of cycling down the Host machine 30 subsequent to a detected fault condition.

For independent fault set to the Host machine 30 through a control panel switch (not shown), a signal must be received on line 2995 from the control panel switch (not shown) for inputing an AND gate 3000. Line 2995 is biased by a resistive network 3005 identical to network 2920 described supra. Upon concurrent receipt of inputs by AND gate 3000 from control panel line 2995 and system reset line 1165, both supra described, a signal will be outputed as a result thereof on line 2010 to inverter 3015. Inverter 3015 will accordingly output a polarity-reversed signal on line 3020 to supra-described OR gate 2980 whereupon the signal will be processed subsequently in a manner already described.

Binary counter 2900 will be normally reset if there is an absence of fault in the system by receipt of a signal by OR gate 3025 on supra-described line 104 indicating that a normal condition of a direct memory access is currently being performed in apparatus 10. OR gate 3025 also is operative to receive on grounded line 3030 a non-functional and non-activating continuous false signal. OR gate 3025, upon receipt of a true input on line 2660, will send a signal on line 3030 to OR gate 3035 for outputing on line 3040. Line 3040, in turn, is operative to activate OR gate 3045 to output a reset signal on supra-described line 2915 to binary counter 2900. Alternately, an abnormal reset for counter 2900 may be activated as desired by a control panel switch (not shown) through line 3050. Supra line 3050 is operative to have bias provided by a resistive network 3055 identical to the above network 2920. Signals on line 3050 are operative to be received as input by inverter 3060 which will output a polarity-reversed analog thereof on line 3065 to OR gate 3070. Abnormal reset for counter 2900 may also be made by receipt of a CPU 40 command signal from function decode 100 on supra line 1160 to OR gate 3070. Upon alternative receipt of inputs by OR gate 3070, it will output on signal therefrom on line 3075 to supra OR gate 3035 for processing as described before.

Fault flip-flop 2960 may be alternatively set by a CPU 40 command indicating an operating program detected fault. A supra-described status signal from function decode 100 on line 1315 indicating a need for fault flip-flop 2965 set is transmitted to a D-type flip-flop 3080 identical to flip-flop 2965 at its D input terminal for latching thereof. Said flip-flop 3080 being clocked at terminal CLK by a Phase 1, 2mc signal on supra line 220, and a system reset on supra line 1165. Upon being set, flip-flop 3080 will output from terminal "Q" on line 3085 to inverter 3090 and bifurcate to line 3095. Inverter 3090 is operative to output on line 3100 to AND gate 3105 and to bifurcate on line 3110 to AND gate 3115. Signals on line 3095 are further operative to be received by AND gate 3120 for outputing on line 3122 to OR gate 3130. Upon concurrent receipt of data bus 195A, line D1, from data bus control 150 and CPU command signal on line 3110 at supra ANd gate's 3115 inputs, AND gate 3115 will output on line 3117 to supra OR gate 2945 thereby derivatively setting fault flip-flop 2965.

Concurrent receipt of a D0 signal from data bus 195A and a CPU command signal on line 3100 by AND gate 3120 will enable oiutputing thereof on line 3125 thereby putting time 2900 in indefinite reset and locking out fault detection until the data bus D0 signal is removed. OR gate 3100 is operative to alternately receive signals from AND gate 3105 and AND gate 3120 on lines 3125 and 3122, respectively, for outputing on line 3125 to D-type flip-flop 3140 which is identical to flip-flop 3080. Flip-flop 3140 is clocked at terminal CLK by Phase 1, 2mc signal on supra line 220 and system reset at terminal CLR by supra line 1165. Upon setting of flip-flop 3140, it will output from terminal "Q" to trifurcate to supra OR gate 2990, supra OR gate 3045 and supra AND gate 3120 on lines 3145, 3155 and 3150 respectively.

Figure 22:
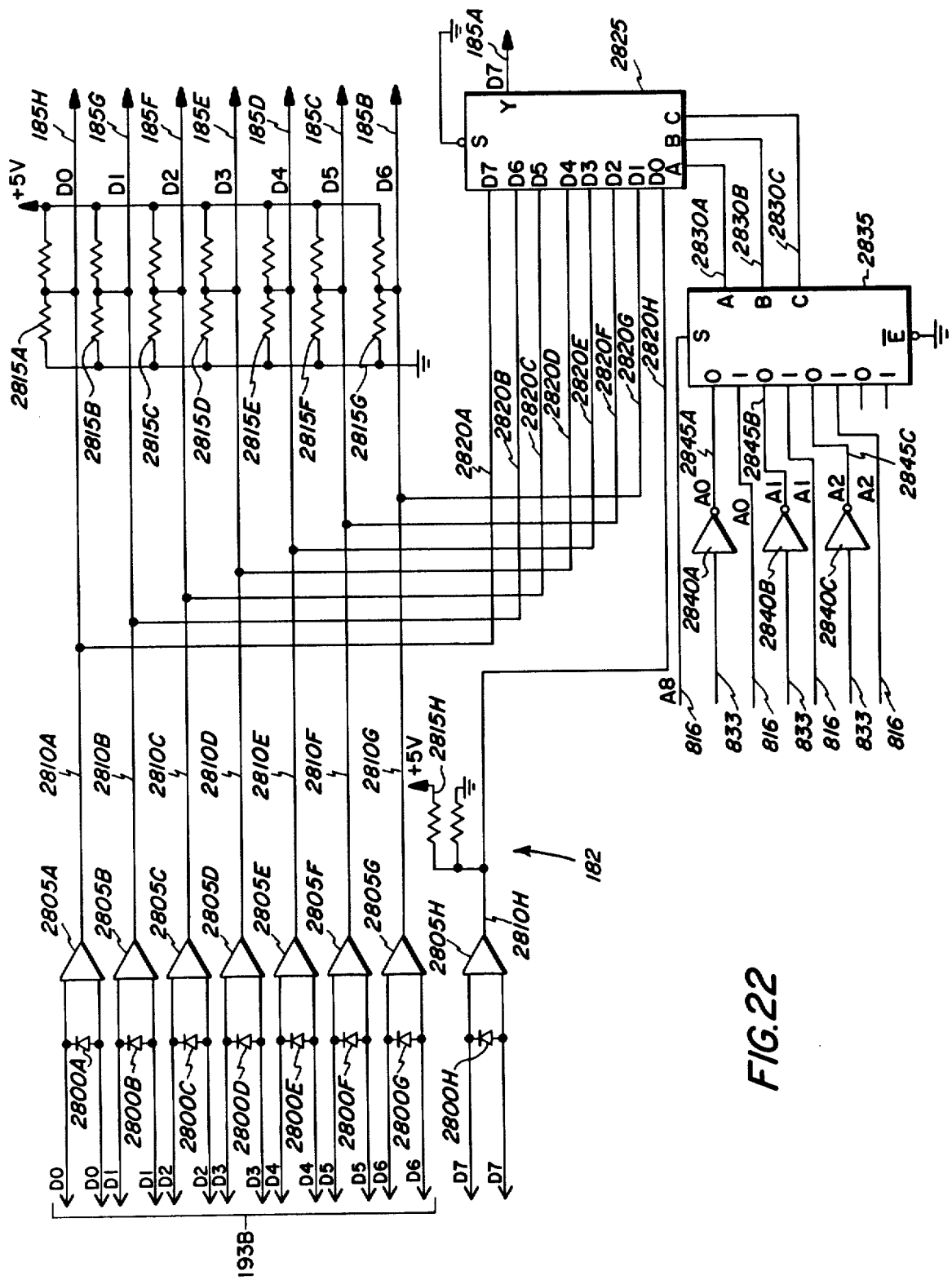
FIG. 22 is a schematic diagram of the Input Optical Isolator Module of FIG. 3.

In the input optical isolator module (IOIM) 182 of the IOPM 90 as shown in FIG. 22, optical coupling is provided for electrical isolation between the electromagnetically shielded or screened controller 20 as receiver and the Host machine 30's control registers (not shown) as transmitter, thereby minimizing and otherwise precluding noise transients from entering the controller 20 protected environment. It will be realized that in an alternative embodiment, a matrix read module could be interposed between the IOIM 182 and the Host machine 30's control registers (not shown) for interfacing therebetween. Data bus signals D0 - D7 are adapted to be received on shielded cable on lines 193B from the spatially remote Host machine 30's control registers (not shown) to the IOIM 182 of the controller 20. It will be further appreciated that the Host machine 30's control registers (not shown) may be adapted to have their output lines, optical isolator driver or transmitter elements (not shown) similar to those described infra in the OOIM 200 as drivers 2860 and resistive networks 2870. Each of the data bus lines 1933 for D0 - D7 comprises loop of two lines which are cross-connected by a forward biased loading diode 2800A-H which marks the spatial beginning of the electromagnetic shielding of controller 20 as to signals inputed to or received by the isolator portion of the IOIM 182. From the point of diode 2800A-H cross-connection of the loopline sets for D0 - D7 proceeds to an optical isolator 2805A-H. Each of the optical isolators 2805A-H being a Model HP5082-4361 which is a high CMR, high-speed optically coupled gate.

The optical isolators 2805A-H, are operative to suppress noise transients from the matrix read module (not shown) interfacing with the Host machine 30's sensors (also not shown) by electrically isolating them in an optic transmissive or reliant environment. Output signals from the optical isolators 2805A-H proceed on data bus lines 2810A-H to commonly terminated resistive networks 2815A-H. Said networks 2815A-H each have at one end a pair of commonly connected resistors where the first resistor of 492 ohms is biased by a +5v and the second resistor of 2.2k ohms is grounded. Data bus signals D0 through D6 subsequently proceed to lines 185H-B, respectively, to the data bus control 150 described supra. Data lines 2810A-H also are operative to bifurcate to lines 2820A-H for D0 - D7. Lines 2820A-H are then received as inputs to terminals D7 - D0, respectively, of multiplexer 2825. Multiplexer 2825 is an eight-to-one input multiplexer, Model 74151. Strobe enable input terminal "S" of multiplexer 2825 is grounded for continuous operation thereof. Multiplexer 2825 is also operative to output on line 185A as a logical negation from terminal "Y" for data bus signal D7. Data select input terminals A, B and C receive inputs from lines 2880A-C, respectively, from output terminals A - C of infra-described multiplexer 2835. It will be noted that multiplexer 2835 is a Model 74157, Quad 2, to 1 input multiplexer. The common select input terminal "S" of multiplexer 2835 receives its input as a presence or absence of address signal A8 on line 816 from address bus control 150. The enable active low input is received at terminal "E" of multiplexer 2835 and is grounded for continuous enabling. Logically negated address signals A0 - A2 from address bus control 150 are received on lines 833 to be inputed to their respective inverters 2840A-C respectively. Polarity-reversed outputs from inverters 2840A-C are sent on lines 2845A-C to the zero or "O" input terminals of multiplexer 2835. Logical non-negated address signals A0 - A2 from address bus control 150 are received on lines 816 to be inputed to the one or "1" terminals of multiplexer 2835.

The mulltiplexers 2825 and 2835 act to select bit or byte logic for data bus inputing to the CPU 40. As such, when multiplexer 2835 receives all true "1" inputs from lines 816 corresponding to addresses A0 - A2, then accordingly the byte mode is selected, otherwise the bit mode is promptly selected. When the byte mode is selected, line 2810H corresponding to data bus signal D7 will be passed through multiplexer 2825 to be outputed accordingly on data bus D7, line 185A. Otherwise, address signals A0 - A2, as interpreted by multiplexer 2835 and as sent to select input A - C of multiplexer 2825, determine which data bus signal D0 - D7 shall be reinterpreted by multiplexer 2825 on line 185A as D7 for bit mode operation.

Figure 23A:
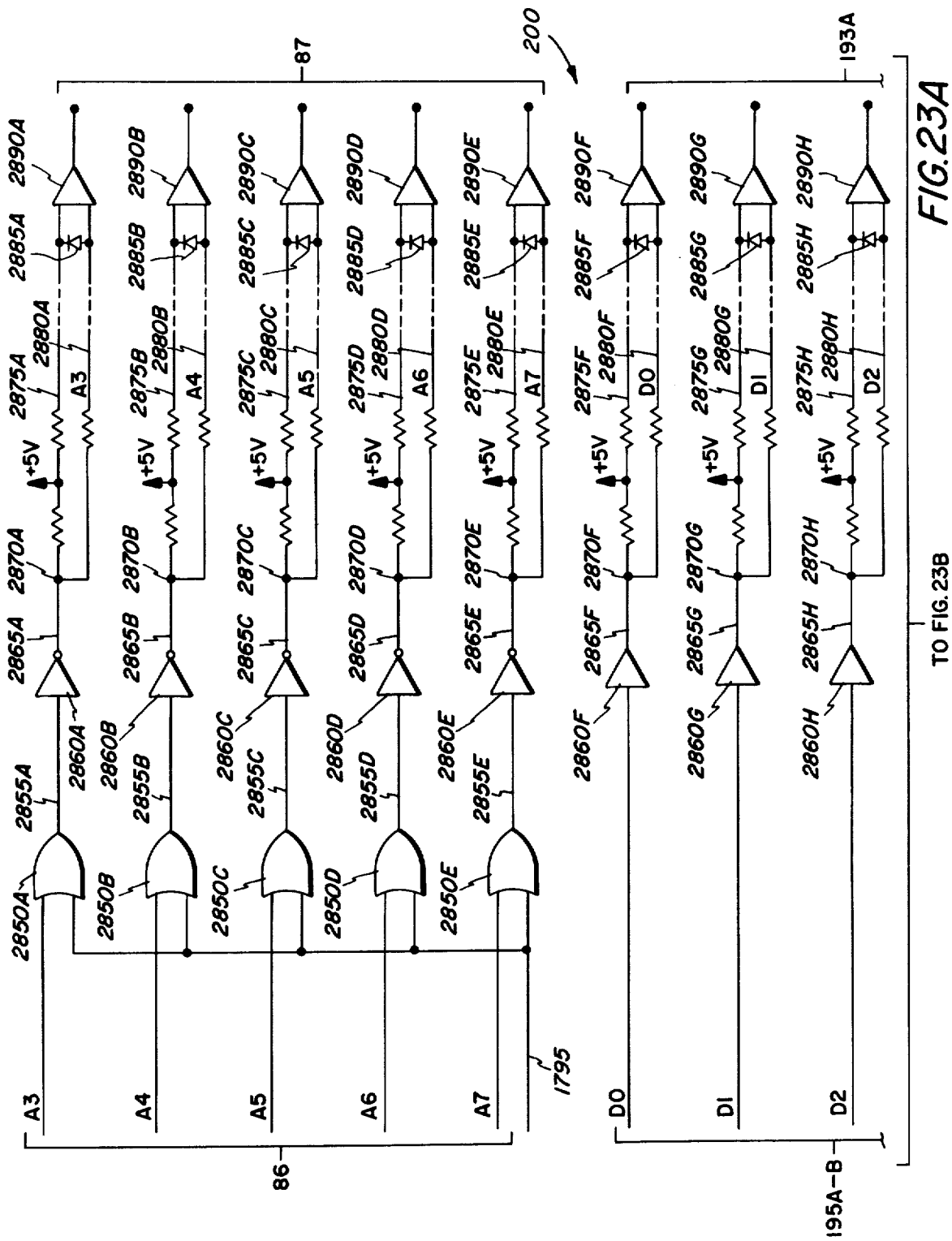
FIGS. 23A-B is a schematic diagram of the Output Optical Isolator Module of FIG. 3.
Figure 23B:
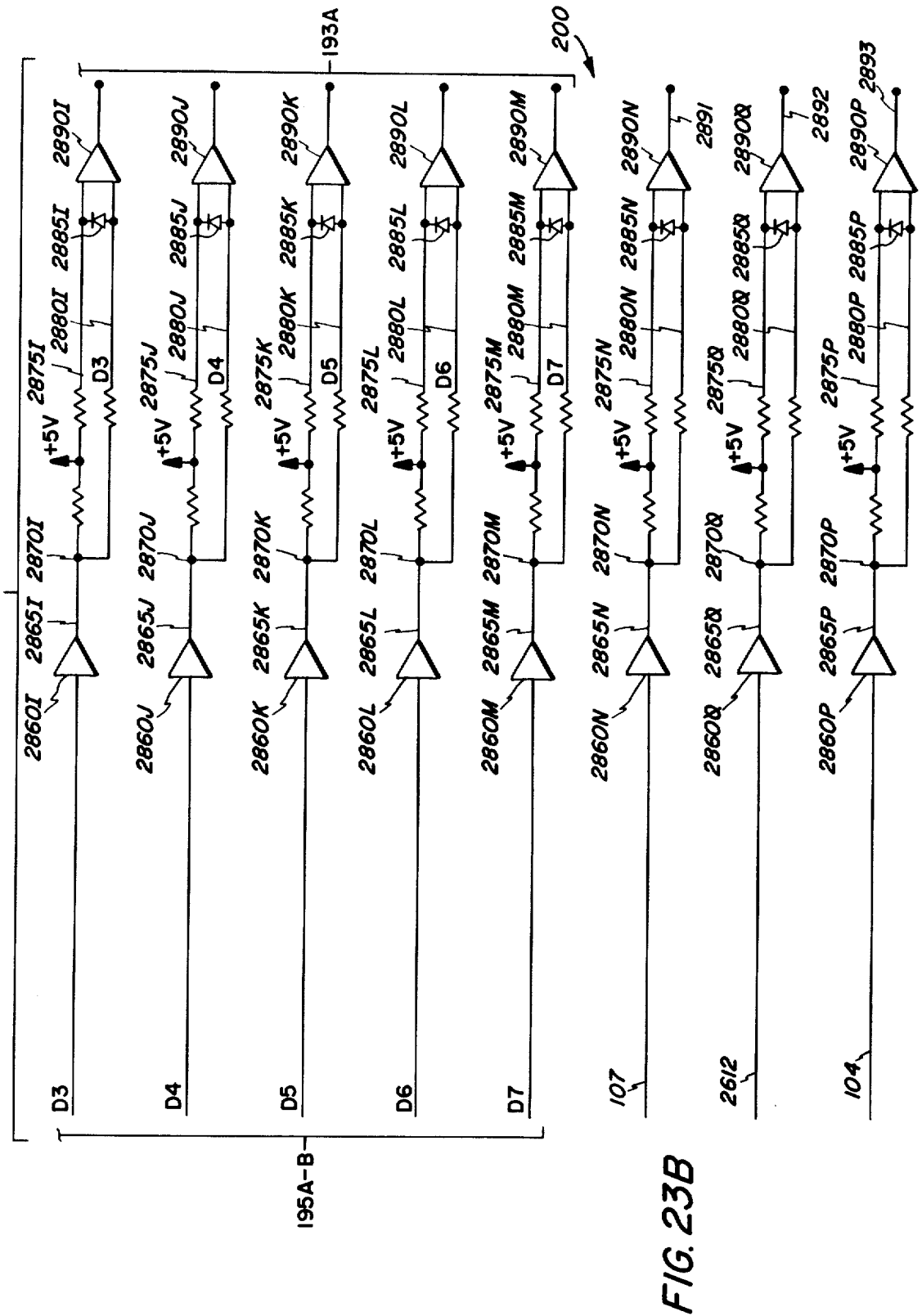

Complementing the IOIM 182 is an output optical isolator module (OOIM) 200, as shown in FIG. 23, and which is provided in the IOPM 90. Optical coupling is provided by OOIM 200 for transmission by the transmitter portion of OOIM 200 described infra of signals through shielded cable by the electromagnetically screened controller 20 and electrically isolated reception of the signals by the receiver or optically isolator portion of the OOIM 200 described infra for transferal to adjacent control registers (not shown) mentioned supra in the Host machine 30, thereby precluding noise transients generated in the Host machine 30 and elsewhere from affecting the otherwise unprotected control registers (not shown). Address bus 86 lines for A3 - A7 are received from address bus control for inputing to respective OR gates 2850A-E indicating what addressed data is to be received from the matrix read module (not shown) during a corresponding read operation.

Also commonly received by OR gates 2850A-E is an alternate input on line 1795 from the ready delay module 1270 as an override signal for indicating that a gross read operation of all addresses of data in the matrix read module (not shown) is required for storage in the non-volatile memory 191. OR gates 2850A-E are operative to output on lines 2855A-E to inverters 2860A-E---inverters 2860A-E each being Hex inverter buffers, Model 7416. Inverters 2860A-E are operative to output a polarity-reversed signal on lines 2865A-E to resistive networks 2870A-E for biasing said lines. Resistive networks 2870A-E are each comprised of a first biasing leg 2875A-E and a second biasing leg 2880A-E. Said first biasing leg 2875A-E has, in series, a first resistor of 2k ohms, a +5v bias, and a second resistor of 220 ohms. The second biasing leg 2880A-E has a resistor of 220 ohms. Said first and second biasing legs 2875A-E, 2880A-E provide a loop signal path for address lines A3 - A7 from the IOPM 90 per se via a shielded cable to a spatially relatively remotely located optical isolator 2890A-H having a diode clamp 2885A-E across its input terminals. Each of the optical isolators 2890A-E is a Model HP5082-4361. The optical isolators 2870A-E are functionally adjacent to supra-mentioned control registers (not shown) in the Host machine 30 for inputing thereto an address bus line 87.

Data bus lines 195A-B for D0 - D7 as received from data bus control 190 are inputed to their respective buffers 2860F-M. Each of the buffers 2860F-M is a Hex buffer, Model 7417. Buffers 2860F-M output on lines 2865F-M to biasing resistive networks 2870F-M that are identical to networks 2870A-E. First and second biasing legs 2875F-M and 2880F-M remotely transmit signals in a manner analogous to legs 2875A-E and 2880A-E to optical isolators 2890F-M. Isolators 2890F-M are adaptable to function as isolators 2890A-E. Isolators 2890F-M additionally are operative to have forward biased leading diodes 2885A-E connected across the input terminals thereof similarly to diodes 2885A-E. Isolators 2890A-E are adapted to output on data bus lines 193A to relatively adjacent control registers (not shown) in Host machine 30 in a manner similarly shown as in regards to isolators 2890A-E.

The watch dog timer circuit 105, as described supra, is adapted to output a control signal on line 107 to buffers 2860N that is similar to buffers 2860F-M. Buffer 2860N will then output on line 2865N to resistive network 2870N which is identical to networks 2870F-M. The first and second legs 2875N and 2880N of network 2870N are operative to carry signals remotely to an optical isolator 2890N that is identical to isolators 2890A-M. Isolator 2890N is further adapted to have a diode 2885N identical to diodes 2885A-M for cross-connection at the input terminals of isolator 2890N. Isolator 2890N, upon receipt of a given input, will transmit on line 2891 a signal to an adjacent control register (not shown) in the Host machine 30 in a manner similar to that described for infra isolators 2890A-M.

The direct memory access apparatus 10, as described supra, is also adapted to output a pair of control signals on lines 2612 and 104 to the OOIM 200 when the first signal is a lmc clock and the second signal is DMA period indicator respectively. Lines 2612 and 2660 are received by drive buffer 2860O and drive inverter 2860P four outputing on lines 2865O and 2865P respectively. Lines 2865O and 2865P are received by resistive networks 2870O and 2870P, respectively, which are identical to supra networks 2870A-N. The first and second legs 2875O and 2880O of network 2870, and the first and second legs 2875P and 2880P of network 2870P are operative to carry signals remotely to their respective optical isolator 2890O and 2890P. Isolators 2890O and 2890P are each identical to isolators 2890A-N. Each of the isolators 2890O and 2890P is further adapted to have a diode 2885O and 2885P, respectively, for cross-connection of each to its respective input terminals of isolators 2890O - 2890P. Diodes 2885O and 2885P are each identical to diodes 2885A-N. Each of the isolators 2890O and 2890P, upon receipt of a given input, will transmit on respective lines 2892 or 2893 a signal to an adjacent control register (not shown) in the Host machine 30 in a manner similar to that described for infra isolators 2890A-N.

OPERATION

The read only direct memory access operation in the controller 20 is activated by a memory reference command from the CPU 40 in the CPU 120 which will initiate a series of direct high-speed data transfers to output refresh the Host machine 30 from data memory 60 also in the CPU 120 under independent control of the DMA apparatus 10 of FIG. 16 in the IOPM 90.

Particularly, during any given machine run where the controller 20 is directing the Host machine, as shown in FIGS. 1 through 3, the CPU 40 in CPUM 120 of the controller 20 as shown in FIG. 4 is operative to sequentially access the controller software sorted in the program or ROM memory 175 of FIG. 10 for directing the activities thereof. Accessed program instructions flow through data bus line 170 to the system bus terminal 50 of FIG. 6 for redirecting via data bus 316 to the data bus interface 41 of FIG. 5 which connects to the CPU 40 on data bus lines 315. The controller software is designed to periodically instruct, relative to the CPU clock 45, the CPU 40 to initiate the direct memory access (DMA)

operation for update-refresh of control registers in the Host machine 30. The controller softwave is further designed to aperiodically instruct the CPU 40 to initiate the DMA operation whenever data received on data bus 315 from the Host machine 30 by CPU 40 indicates a predetermined abnormal or environmental condition. Specifically, a condition capable of blanking the host machine 30. The controller software is further designed to aperiodically instruct the CPU 40 to initiate the DMA operation whenever data received on data bus 315 from the host machine 30 by CPU 40 indicates a predetermined abnormal or environmental condition. Specifically, a condition capable of blanking out or causing erasure of the contents of the control registers in the host machine 30 thereby requiring immediate refresh thereof. Initiation of the DMA operation by CPU 40 is accomplished by the outputting of a binary command signal of "1110011000000010" on address lines A15 through A0 respectively of address bus 79. The DMA binary command is routed from address bus 79 of the CPUM 120 through address bus interface 42 of FIG. 4 to the system bus terminals 50 via address bus 80. From the system bus terminals 50, the DMA initiation signal is routed through connecting address bus lines 85 to the function decoder 400 in the IOPM 900 of FIG. 13 for addresses A9 through A15. Address lines A0 through A1 are received by junction decoder 100 on address bus 86 derivatively from bus 85 via the address bus control 150.

The decoder 1215 is operative to output, upon receipt of a strobe signal that is a gated derivative of a combinational subset of addresses A11–A15 and CPU sync signal line 290, memory read CPU signal line 1225, and select A or B on address lines A9 or A10 respectively, on the 1Y or 2Y ports to strobe and input the decoder 1305. Receipt of a predetermined combination of address A0 or A1 act to select either 1Y or 2Y output ports for decoder 1305. Accordingly, for the given supra A15 through A0 address to the function decoder 100, the decoder 1305 will output a start DMA refresh-update signal on line 1310 to the direct memory access apparatus 10.

Receipt of a start refresh-update signal, indicating that DMA is required, by inverter 2505 on line 1310, will initiate a polarity reversed analog through OR sets 2515 to flip-flop 2525 for latching thereof. Once flip-flop 2525 is clocked to its set on latch position, it will output a logical true representation thereof to AND gate 2670. At system reset time there is outputted, at the QD output of binary counter 2740 a negated "END of DMA refresh" construed here as a logic true signal. Concurrent receipt of true inputs at gate 2670 from counter 2710 and flip-flop 2525 will consequentially allow outputting of a logical true signal through OR gate 2515 thereby completing a feedback loop from the output to the input of flip-flop 2525 for the latching thereof.

Flip-flop 2525, once latched, will also output a logical true signal through OR gate 2560 and inverter 2570 to AND gate 2580. It will be noted here that the DMA operation could also have been initiated by a signal on line 106 from the fault watch timer 105 to OR gate 2560. The other input to AND gate 2580 on the start refresh line 1310 requires a negation of the start refresh for logical true, negated start refresh will always occur a maximum of 0.5 u.s. or 1 clock cycle after termination of the start refresh signal from the function decoder 100. As such, concurrent receipt of true inputs by gate 2580 will enable setting of flip-flop 2590 thereby latching flip-flop 2590 as long as associated flip-flop 2525 also remains latched. Latched output from flip-flop 2590 will transmit a "Hold" request signal on line 450 to CPU 40 for suspension of program execution thereon.

The direct memory access apparatus 10 remains in the supra described logical latched state until a "hold acknowledge" on line 475 is received from CPU 40 indicating that the CPU 40 rests in a suspended state and that the DMA apparatus 10 may assume control of the system bus including all data and address buses in the controller 20 as will be described in Figure. Accordingly, the "hold acknowledge" signal on line 475 will input through inverter 2530 to AND gate 2540. AND gate 2540 will maintain concurrent receipt of its input throughout the DMA operation in so much that hold acknowledge from CPU 40 and latch output from flip-flop 2525 will remain up or set one word DMA. As such, gate 2540 will act to set flip-flop 2555 in a latch condition throughout the DMA period.

Flip-flop 2595 acts as a toggle switch by feeding back a negation via an inverter 2615 from its output to its input thereby allowing the flip-flop's 2595 output frequency to be a time division by two of its clocked frequency. Thus for a phase I clock input of 2Mc, the flip-flop 2595 will output a clock signal at a 1Mc rate, through inverter 2615 and OR gate 2630 to the input of AND gate 2640. Upon concurrent receipt of a latch signal from flip-flop 2555 and an initiating 1Mc clock signal from toggle flip-flop 2595, flip-flop 2555 will be set. A feedback loop from the flip-flop's 2555 output through OR gate 2630 will act to override the 1Mc clock signal thereby latching flip-flop 2655 throughout the DMA operation. The 1MC clock from toggle flip-flop 2590 is also used via OOIM200 to sync the control registers (not shown) in the host machine 30 during the DMA operation.

The latched or load output signal from flip-flop 2655, indicating that the DMA operation has now set, is operative to activate the serially connected binary counters 2705 and 2710 through each of their parallel enable inputs. It is also used via OOIM200 to indicate the period of DMA to the control registers (not shown) in the host machine 30. Binary Counter 2705 has all of its four inputs ground for zero preset. Binary counter 2710 has its third or C input grounded for zero preset and its remaining inputs biased by resistive networks 2735 and 2750 for one preset. Count enable parallel and count enable trickle inputs for counter 2705 are biased for continuous on by supra network 2735. Binary counter 2710 acts to receive its count enable trickle continuously on bias inputs through network 2740, and its count enable parallel input from the terminal count output of counter 2705. Continuous master reset bias signals for both counters 2705 and 2710 are received from network 2720, but are operative to be overriden by preset inputs whenever a parallel enable signal is received. Both counters 2705 and 2710 are clocked at a phase I 2MC rate but are inherently limited by design to output at a 1MC rate. Once counters 2705 and 2710 are enabled as described supra, they will count from their preset point to the top of counter's 2710 range at terminal Qd as represented by the supra end refresh signal on line 2675 to AND gate 2670 thereby unlocking said gate 2670 to terminate the DMA operation by releasing all supra described latched. The output signals on lines 145 from the enabled binary counters 2705 and 2710 serve as DMA refresh-update addresses for direct accessing of data or RAM memory 60 in the CPUM 120. Specifically, to access the 40 byte words dedicated to DMA in RAM memory 60, binary counters 2705 and 2760 must sequentially output predetermined addresses 65896 through 65535 in this embodiment. Alternatively, when the second or B input of counter 2710 is preset to one by grounding out network 2750, a 56 byte word DMA operation may be obtained by accordingly acccessing address 65480 through 65535 from same supra RAM memory 60.

Flip-flop 2555, once latched, will output control inputs to AND gates 2695 and 2700 which, upon concurrent receipt of the 1MC signal and a power normal signal respectively, will act to output enabling signals operative to vest control of the system bus, including all data and address buses of the controller 20, in the direct memory access 10 of the IOPM 90 as will be shown infra.

AND gate 2695, upon concurrent receipt of the DMA set signal from latched flip-flop 2555 and the 1mc clock signal from toggle flip-flop 2595, will output a derivative 1mc DMA strobe signal through OR gates 1690 and 1705 of ready control 1090 to the multiplexer 920 of data bus control 190. The DMA strobe signal is operative to pass through said multiplexer 920 to parallel shift data through the shift registers 197A and 197B. Specifically, at a temporally concurrent point when any given address provided by the binary counters 2705 and 2710 is incremented for the next direct memory access of data memory 60, then shift registers 197A and 197B acting as data input buffer latches will capture the data byte from the current DMA access on data bus 180.

AND gate 2700, upon concurrent receipt of the DMA set signal from latched flip-flop 2555 and the power normal signal from the PN generator 2105 in non-volatile memory 191, will output a continuous bus control signal throughout the DMA period. This will enable the tri-state devices 1470 and 1875 in ready control 1090 to surpress the DBIN and memory read signals on lines 285 and 377 respectively from CPU 40 into a low or logical false state thereby disenabling CPU 40 from receiving DMA accessed data. The bus control signal from AND gate 2700 also is operative to disable tri-state drivers 196 in the data bus control 190 that receive data from multiplexer 186A–D thereby preventing throughputting of external data onto data bus 180 during the DMA operation. Additionally, AND Gate 2700 is operative to output a bus control signal to enable the tri-state driver 825 to assume control in the address bus control 150 thereby allowing the generated refresh-update addresses from the direct memory access apparatus 10 to be main lined into address bus 85. As such, once the bus control signal has acted on the supra tri-state drivers 196 and 825 in the address and data bus controls 150 and 190 respectively, and suppressed the DBIN and memory read control signals from CPU 40, it can be assumed that the direct memory access apparatus 10 in IOPM has assumed effective control over the system bus away from the CPU 40 CPUAO during the DMA operation.

Once the supra DMA operation has been initiated to output refresh update addresses from the direct memory access apparatus 10, transmittal thereof may be had along address bus 145 to the address bus control 150. At control 150, enabled tri-state drivers 825 will redirect the DMA addresses onto the main address bus 85 for operative flow from the IOPM 90 to the CPUM 120. System bus terminals 50 will get to throughput the DMA addresses to address bus 165 for operative receipt by the data memory 50. Particularly, DMA addresses on bus 165 are driven through tri-state drivers to output on lines 595 to each of the respective address inputs of RAM's 495A–H and 500A–I. All of the RAM's of data memory 60 are operative to receive their read/write input from the CPU 40 write command on line 295, and their chip enable input from the moment address decoder 57. The prescribed portions of the DMA initiation address from CPU 40 on address bus 165, comprising address lines A10 through A15, enable decoder 385 while a subset thereof including A10 through A11 are operative to ship enable RAM's 500A–I.

The accessed DMA data will output on lines 655B to the respective tri-state drivers 680 in program memory 175 which has had its control line 490 condoned by the high output of supra described decoder 385 in the memory address decoder 57. The DMA accessed data proceeds from the program memory 175 on data bus 170 through system bus terminal 50 in the CPUM 120 to the IOPM 90 on bus 180. The data bus control 190, once having proscribed other data from being received during DMA, is operative to flow DMA on bus 180 through buffer latches 197A–B to data bus lines 195A–B. The output optical isolator module 200 is operative to optically convert data bus lines 195A–B adjacent to the control registers (not shown) in the host machine 30 to lines 193A inputting to said registers for elimination of noise picked up along remote transmissions of data by said data bus lines 195A–B.

At the end of the DMA function, binary counters 2705 and 2710 of the direct memory access (DMA) apparatus 10 will count out as an end of refresh signal that will unlatch flip-flop 2590. As such, the hold request lines will go low allowing the CPU to power up out of its suspended state as indicated by a low hold acknowledge (HOLDACK) signal to the DMA apparatus 10. Receipt of the negated HOLDACK signal will derivatively act to unlatch flip-flops 2525, 2555 and 2655. This in turn will reenable data flow through the tri-state drivers 196 in data bus 190 from the multiplexers 186A–D into the main data bus lines 180. Likewise, the tri-state drivers 825 in the address bus control 150, at the end of the DMA operation, will also be disabled thereby proscribing refresh addresses from the DMA apparatus 10 from flowing into the main address bus 85. Thus with the tri-state drivers 196 enabled and tri-state drivers 825 dis-enabled at the AND of the DMA period, the CPU 40 may again assume control as before of the system bus including the data and address buses for normal processing of data until the next DMA operation is initiated by processing in the CPU 40.

The non-volatile memory 191 of FIGS. 17 through 21 having random access memories 248A–H is operative to appear to the CPU 40 as part of its read/write data memory complement on data buses 192A–H and 195A–B respectively so that it may be accessed on address bus 86 by the standard CPU 40 memory reference instruction set stored in program memory 475. Power for the non-volatile memory 191 is normally obtained through the voltage regulator submodule 1845, but the contents of the non-volatile memory may be sustained when system power is off by the rechargeable battery in the VBATT circuit 2270. Likewise, a power turn-on or turn-off is operative to be sensed through the BPN receiver 2165, the PN generator 2105 and CMOS protection circuitry in the main circuit of the non-volatile memory 194 itself for insuring the integrity of the controller 20 and the memory contents of the memory 191 during a power up or down sequence.

In the BPN receiver 2165, power normal sensing lines 2170 and 2175 from the host machine 30 are received therein by an optical coupler 2200 for noise immunity, and then are throughputted a transistor switch 2235 for enabling a CMOS protection circuit having latched AND gates 2345 and 2350. An abnormal power normal signal from the BPN receiver 2165 indicating a power down condition will act to condition the AND gates 2345 and 2350 into a latched state for presetting the current instructions being processed by holding the RAM chip enable input high until the end of the instruction thereby guaranteeing the integrity of that instruction relative to the memory 191. The CMOS protection circuit gates 2345 and 2350 also are operative to output a signal to the PN generator 2105 derivatively indicating a power normal or abnormal environment. The PN generator 2105 having serially connected switching transistors 2135 and 2155 respectively is operative to distribute the power normal signal to the DMA apparatus 10 and the ready control submodule 1090 which, as described supra, require an indication thereof.

The VBATT circuit 2270 acting as a submodule of the non-volatile memory 191 will normally act to simply distribute a +10 VDC power signal onto a non-critical power line 2280 that biases the address and data bus lines 195A-B and 86 respectively for the RAM's 2480A-H of the non-volatile memory 191, and a critical power line 2305 that must be maintained for a finite period even during a power up or down interval. The critical power line 2305 is operative to help maintain all of the CMOS protection gates including 2380, 2385, 2370, 2345, 2350, 2450, 2425, 2415 and 2430 through their respective power control input terminals. This in turn derivatively maintains R/W and CE inputs of the RAM 2480A-H particularly during the process of a current instruction. The critical power line 2305 is further adapted to supply power directly to the RAMs 2480A-H even in the event of a power down situation thereby preserving the data contents of the memories. An auxiliary function of the critical power line 2305 of the VBATT circuit 2270 acts to bias the switching transistor 2235 for sensing a normalization of the power normal signal from the host machine 30 indicating a turn-on power-up condition.

Processing a 10VDC critical power signal on line 2305 from the VBATT circuit 2270 involves the normal power condition of trickle charging the rechargeable battery (not shown) through dropping resistor 2310 and forward biased gate diode 2315 from the 10VDC power supplied by the voltage regulator 1845 thereby insuring a fully charged battery.

Once power goes down from the voltage regulator 1845, diode gate will reverse bias as will diode gate 2300 thereby acting as a barrier to any electrical back-up by the rechargeable battery. Without bias from diode 2315, diode gate 2320 becomes foward bias from diode 2315, thereby acting as a barrier to any electrical back-up by the rechargeable battery. Without bias from diode 2315, diode gate 2320 becomes forward bias thereby allowing the rechargeable battery serve as the new source of power for critical power line 2305 during a failed power or power down condition.

The fault watch timer 105 of FIG. 24 is provided to measure the period direct memory access of data from the data memory 60 by the DMA apparatus 10 to the host machine 30 thereby setting up a malfunction flag in the event of an abnormally long period between direct memory accesses. The fault watch timer 105 comprises a free running counter 2900 which under normal circumstances will be reset periodically by a signal indicating that a DMA operation is being performed. If said reset is not forthcoming within 25 ms of the previous one, the fault flip-flop 2965 is latchably set indicating a controller 20 failure or programming error thereby derivatively issuing a machine fault and a CPU 40 fault signal on lines 107 and 106 respectively. The fault signal on line 106 is sent via the OOIM 200 to the control register (not shown) of the host machine 30 for disenabling thereof. The CPU 40 fault signal on line 100 is indirectly operative, through the DMA apparatus 10 to place the CPU 40 in a suspended or hold state. Alternatively, the machine & CPU fault signal on lines 107 and 107 may be indirectly had by receipt of a CPU 40 decoded command control signal on line 1315 from the function decoder 100, and a data line 195A D1 signal from the data bus control 190 for setting flip-flop 3080 and activating AND gate 3115 respectively. Fault flip-flop 2965 may be reset either by a system reset signal on line 160 or via a switch activated control panel (not shown) signal on line 3050 through OR gate 3070. It will be noted that the machine fault signal only on line 107 may be had also by a switch activated control panel (not shown) signal through AND gate 3000. If it is desired to leave the fault watch timer 105 in its reset condition, a data line D2 signal from the data bus control 190 may be received by AND gate 3105 in the absence of a fault command signal from CPU 40 at flip-flop 3080 thereby allowing flip-flop 3140 to be set into a latched condition for continuous outputting of a reset signal to the free running timer 2900.

In the OOIM 200, data bus 195A-B is operative to have signals D0-D7 from data bus control 190 for receipt of host machine 30 control registers, address bus 86 having A3-A7 from address bus control 150 for receipt by the matrix read module (not shown) when said alternative embodiment is used, and fault, 1MC clock and DMA operation control lines 107, 2612, 1104 respectively from the fault watch timer 105 and direct memory access apparatus 10 (twice) respectively for syncing and initializing watch dog timer and direct memory access functions in the control registers of the host machine 30. It will be noted that for test purposes all address bus lines 86 received by the OOIM 200 may be activated simultaneously at OR gate set 2550A-E by a control signal on line 2795 from the ready delay busmodule 1270 of the function decoder 100 upon CPU 40 command. All of the supra described lines each adapted to input to their respective transmitting modules or generic optical isolator drivers comprising drivers 2860A-P and biasing resistive networks 2870A-P. It will be appreciated that the supra generic optical isolator drivers 2860A-P and 2870A-P as part of the IOPM is enclosed together with the CPUM 120 in an electromagnetic shield (not shown) for purposes of noise immunity. Emulating from the generic optical isolators are loop lines 2875A-P and 2880A-P encased in RF shield cable for remote spatial dispersion to associated receiver modules or optical isolator receiver comprising load diodes 2885A-P and optical isolator per se 2890A-P. Said optical isolator 2890A-P is operative to substantially eliminate whatever noise was picked up by driver signals on the loop lines 2875A-P and 2880A-P in spite of the RF cable shielding before inputting to adjacent control registers in the host machine 30.

The IOIM 182 is adapted to function in a substantially identically, but reverse mode of the operation of the OOIM 200. As such, data bus 193B loop lines D0–D7 are received through RF shielded cable from a remote transmitter on generic optical isolator driver having a driver and biasing resistive network (not shown) that obtains its source of signal from adjacent control registers in the host machine 30. Accordingly, data bus 193B is adapted to input to a receipt module or optical isolator receiver having a loading diode 2800A–H and an optical isolator 2805A–H for substantially eliminating noise interference that may be picked up by the RF shielded cable. Signals from the isolators D805A–H are then sent along lines 185B–H to the data bus control 150. It will be apparent that the IOIM 182 is part of the IOPM 90. The IOPM 90 and CPUM 120 are both enclosed by a RF electromagnetic shielded enclosure as mentioned supra.

The IOIM 182 is further functional to determine bit or byte operation depending on the combination of true or false address bus signals on lines 816 and 833 received by the address multiplexer 2835. The positive or negated logical set of said addresses is sent by the address multiplexer 2835 to the data multiplexer 2825 for determining which data bus 2820A–H line D0–D7 from main data bus 2810A–H is to be the encoded representative for bit or byte operation on line 185A to the data bus control 190.

While the above referenced embodiment of the invention has been described in considerable detail with respect to the system, it will be appreciated that other modifications and variations therein may be made by those skilled in the art without departing from the true spirit and scope of the invention.

What is claimed is:

1. A computerized controller having direct memory access data capability for directing control registers of a host machine comprising;
   (a) microprocessor means for manipulating data according to a given program, and for providing the manipulated data and enabling addresses;
   (b) system bus means operative to normally be under the control of said microprocessor means for bidirectionally carrying said manipulated data and enabling addresses from said microprocessor means;
   (c) data memory means coupled to receive the manipulated data from said system bus means for storing and for writing of data that has been stored onto said system bus means; and
   (d) direct memory access means operative to receive a predetermined enabling address on said system bus means from said microprocessor means for issuing a hold signal to said microprocessor means for suspending operation of said microprocessor means for a predetermined time and upon receipt of a hold acknowledgement signal from said microprocessor means for assuming control of said system bus means for outputting active state control signals and predetermined accessing addresses on said system bus means that will directly access said data memory means to obtain data that has been stored to update-refresh the control registers in the host machine, said direct memory access means including: (1) function decoder means operative to receive address bus signals on said system bus means from said microprocessing means for recognition of predetermined addresses, for generating signals for enabling direct memory access, and for controlling writing of said data memory means data into said system bus means; (2) address bus controller means operative to receive update-refresh addresses from said direct memory access means and for merging of the update-refresh addresses onto the respective address bus lines of said system bus means upon receipt of an active state control signal from said direct memory access means; (3) multiplexing means operative to receive multi-source data from the controller for selection of data signals as the current access by a control signal from said function decoder means, and for outputting the selected data signals onto said system bus means; (4) first shift register means adapted to admit the selected data signals from said multiplexing means for buffer latching for providing stabilized data upon receipt of a written control signal from said function decoder means; (5) tri-state driver means disposed to accept the stabilized data from said shift register means for normal flow through said system bus means, and for obstruction thereof upon receipt of an active-state control signal from said direct memory access means; and (6) second shift register means adapted to admit data signals on said system bus means from said microprocessor means and from said tri-state driver means for buffer latching the data signal representing the current access for stabilized data upon receipt of a write control signal from said function decoder means.

2. The computerized controller according to claim 1 wherein said direct memory access means further comprises:
   (a) first bistable means operative to receive the direct memory access enable signal from said function decoder means for clocked latching and for generating a hold initializing signal;
   (b) second bistable means disposed to concurrently accept the hold initializing signal from said first bistable means and the negation of the direct memory access enable signal from said function decoder means for clocked latching and for generating a hold signal to said microprocessor means for operational suspension;
   (c) third bistable means operative to concurrently receive the hold initializing signal from said first bistable means and the hold acknowledgement signal from said microprocesor means for clocked latching, and for generating an active state control signal to said address bus controller means and to said tri-state driver means for control assumption of said system bus means during direct memory access; and
   (d) fourth bistable means triggerably operative upon receipt of the active state control signal from said third bistable means for clocked latching and for generating an address initializing signal.

3. The computerized controller according to claim 2 wherein said direct memory access means further includes binary counter means disposed to be enabled by an initializing signal from said fourth bistable means during the period of direct memory access for clocked generating through a predetermined sequence of update-refresh addresses to said address bus controller means for direct accessing of said data memory means, and for outputting an AND signal when said binary counter means has clocked through its predetermined sequence.

4. The computerized controller according to claim 3 wherein said direct memory access means further includes gating means operative to disenable the hold initializing signal from said first bistable means from feeding back on itself upon receipt of the said signal from said binary counter means for unlatching said first bistable means, and for a generational cessation of the hold initializing signal for derivatively allowing said microprocessor means to again assume control of said system bus means.

5. The computerized controller according to claim 4 wherein said direct memory access means further includes fifth bistable means operative to be toggably latched for generating a period signal to trigger said fourth bistable means into a latched condition.

6. The computerized controller according to claim 3 wherein said binary counter means is a pair of serially connected binary counters.

7. The computerized controller according to claim 6 wherein said pair of serially connected binary counters is operative to count up through a predetermined sequence from a given preset.

8. The computerized controller according to claim 7 wherein said pair of serially connected binary counters is disposed to have a bi-mode preset by selectively grounding a subset of the presets.

9. The computerized controller according to claim 1 wherein said first and second shift register means function in a parallel shift mode.

10. The computerized controller according to claim 1 wherein said second shift register means function in a parallel shift mode.

11. The computerized controller according to claim 2 wherein said first bistable means is a D-type flip-flop.

12. The computerized controller according to claim 2 wherein said second bistable means is a D-type flip-flop.

13. The computerized controller according to claim 2 wherein said third bistable means is a D-type flip-flop.

14. The computerized controller according to claim 2 wherein said fourth bistable means is a D-type flip-flop.

15. A computerized controller having direct memory access data capability for directing control registers of a host machine comprising:
(a) microprocessor means for manipulating data according to a given program, and for providing the manipulated data and enabling addresses;
(b) system bus means operative to normally be under the control of said microprocessor means for bidirectionally carrying said manipulated data and enabling addresses from said microprocessor means;
(c) data memory means coupled to receive the manipulated data from said system bus means for storing and for writing of data that has been stored onto said system bus means; and
(d) direct memory access means operative to receive a predetermined enabling address on said system bus means from said microprocessor means for issuing a hold signal to said microprocessor means for suspending operation of said microprocessor means for a predetermined time, and upon receipt of a hold acknowledgement signal from said microprocessor means for assuming control of said system bus means for outputting active state control signals and predetermined accessing addresses on said system bus means that will directly access said data memory means to obtain data that has been stored to update-refresh the control registers in the host machine, said direct memory access means including: (1) function decoder means operative to receive address bus signals on said system bus means from said microprocessing means for recognition of predetermined addresses, for generating signals for enabling direct memory access, and for controlling writing of said data memory means data into said system bus means; (2) address bus controller means operative to receive update-refresh addresses from said direct memory access means and for merging of the update-refresh addresses onto the respective address bus lines of said system bus means upon receipt of an active state control signal from said direct memory access means; (3) multiplexing means operative to receive multi-source data from the controller for selection of data signals as the current access by a control signal from said function decoder means, and for outputting the selected data signals onto said system bus means; (4) first shift register means adapted to admit the selected data signals from said multiplexing means for buffer latching for providing stabilized data upon receipt of a written control signal from said function decoder means; (5) tri-state driver means disposed to accept the stabilized data from said shift register means for normal flow through said system bus means, and for obstruction thereof upon receipt of an active-state control signal from said direct memory access means; and (6) second shift register means adapted to admit data signals on said system bus means from said microprocessor means and from said tri-state driver means for buffer latching the data signal representing the current access for stabilized data upon receipt of a write control signal from said function decoder means.

16. The computerized controller according to claim 15 wherein said direct memory access means further comprises:
(a) first bistable means operative to receive the direct memory access enable signal from said function decoder means for clocked latching and for generating a hold initializing signal;
(b) second bistable means disposed to concurrently accept the hold initializing signal from said first bistable means and the negation of the direct memory access enable signal from said function decoder means for clocked latching and for generating a hold signal to said microprocessor means for operational suspension;
(c) third bistable means operative to concurrently receive the hold initializing signal from said first bistable means and the holding acknowledgement signal from said microprocessor means for clocked latching, and for generating an active state control signal to said address bus controller means and to said tri-state driver means for control assumption of said system bus means during direct memory access; and
(d) fourth bistable means triggerably operative upon receipt of the active state control signal from said third bistable means for clocked latching and for generating an address initializing signal.

17. The computerized controller according to claim 16 wherein said direct memory access means further includes binary counter means disposed to be enabled by an initializing signal from said fourth bistable means during the period of direct memory access for clocked generating through a predetermined sequence of update-refresh addresses to said address bus controller means for direct accessing of said data memory means, and for outputting an AND signal when said binary counter means has clocked through its predetermined sequence.

18. The computerized controller according to claim 17 wherein said direct memory access means further includes gating means operative to disenable the hold initializing signal from said first bistable means from feeding back on itself upon receipt of said signal from said binary counter means for unlatching said first bistable means, and for a generational cessation of the hold initializing signal for derivatively allowing said microprocessor means to again assume control of said system bus means.

19. The computerized controller according to claim 18 wherein said direct memory access means further includes fifth bistable means operative to be toggably latched for generating a period signal to trigger said fourth bistable means into a latched condition.

20. The computerized controller according to claim 17 wherein said binary counter means is a pair of serially connected binary counters.

21. The computerized controller according to claim 20 wherein said pair of serially connected binary counters is operative to count up through a predetermined sequence from a given preset.

22. The computerized controller according to claim 21 wherein said pair of serially connected binary counters is disposed to have a bi-mode preset by selectively grounding a subset of the presets.

23. The computerized controller according to claim 15 wherein said first and second shift register means function in a parallel shift mode.

24. The computerized controller according to claim 15 wherein said second shift register means function in a parallel shift mode.

25. The computerized controller according to claim 16 wherein said first bistable means is a D-type flip-flop.

26. The computerized controller according to claim 16 wherein said second bistable means is a D-type flip-flop.

27. The computerized controller according to claim 16 wherein said third bistable means is a D-type flip-flop.

28. The computerized controller according to claim 16 wherein said fourth bistable means is a D-type flip-flop.

29. An improved computerized controller having direct memory access data capability for directing control registers of a host machine having microprocessor means for manipulating data according to a given program, and for providing manipulated data and enabling addresses; and system bus means operative to normally be under the control of said microprocessor means for bidirectionally carrying manipulated data and enabling addresses from said microprocessor means and data memory means coupled to receive manipulated data from said system bus means, said system bus means for storing and for writing of data that has been stored onto said system bus means, wherein the improvement comprises: direct memory access means operative to receive a predetermined enabling address on said system bus means from said microprocessor means for issuing a hold signal to said microprocessor means for suspension of operation of said microprocessor means for a predetermined time, and upon receipt of a hold acknowledgement signal from said microprocessor means for assuming control of said system but means for outputting active state control signals and predetermined accessing addresses on said system bus means that will direct access said data memory means to obtain data that has been stored to update-refresh the control registers in the host machine, said direct memory access means further includes:

(1) function decoder means operative to receive address bus signals on said system bus means from said microprocessor means for recognition of predetermined addresses, for generating signals for enabling direct memory access, and for controlling writing of said data memory means data into said system bus means;

(2) address bus controller means operative to receive update-refresh addresses from said direct memory access means and for merging of the update-refresh addresses onto the respective address bus lines of said system bus means upon receipt of an active state control signal from said direct memory access means;

(3) multiplexing means operative to receive multisource data from the controller for selection of data signals as the current access by a control signal from said function decoder means, and for outputting the selected data signals onto said system bus means;

(4) first shift register means adapted to admit the selected data signals from said multiplexing means for buffer latching for providing stabilized data upon receipt of a write control signal from said function decoder means;

(5) tri-state driver means disposed to accept the stabilized data from said shift register means for normal flow through said system bus means, and for obstruction thereof upon receipt of an active-state control signal from said direct memory access means; and (6) second shift register means adapted to admit data signals on said system bus means from said microprocessor means and from said tri-state driver means for buffer latching the data signal representating the current access for stabilized data upon receipt of a write control signal from said function decoder means.

* * * * *